US012250108B2

(12) United States Patent
Li et al.

(10) Patent No.: US 12,250,108 B2
(45) Date of Patent: *Mar. 11, 2025

(54) AUTOMATIC DIAGNOSTICS ALERTS FOR STREAMING CONTENT ENCODED BY MULTIPLE ENTITIES

(71) Applicant: Conviva Inc., Foster City, CA (US)

(72) Inventors: Yan Li, Foster City, CA (US); Rui Zhang, San Mateo, CA (US); Henry Milner, Berkeley, CA (US); Jibin Zhan, Foster City, CA (US)

(73) Assignee: Conviva Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/687,469

(22) Filed: Mar. 4, 2022

(65) Prior Publication Data
US 2022/0191085 A1    Jun. 16, 2022

Related U.S. Application Data

(63) Continuation of application No. 16/427,051, filed on May 30, 2019, now Pat. No. 11,336,506.

(60) Provisional application No. 62/678,916, filed on May 31, 2018.

(51) Int. Cl.
*H04L 41/0631* (2022.01)
*H04N 21/24* (2011.01)

(52) U.S. Cl.
CPC ..... *H04L 41/0631* (2013.01); *H04N 21/2402* (2013.01)

(58) Field of Classification Search
CPC ........... G06Q 30/0277; G06Q 30/0241; G06Q 30/027; G06Q 30/0242; G06Q 30/0272; H04N 21/812; H04N 21/4331; H04N 21/23424; H04N 21/2402; H04L 41/0631; G06F 15/16

See application file for complete search history.

(56) References Cited

U.S. PATENT DOCUMENTS 7,536,396 B2    5/2009  Johnson
8,762,564 B1 *  6/2014  Philpott ........... H04N 21/64322
                                                      709/219
9,451,306 B2    9/2016  Sarukkai
(Continued)

OTHER PUBLICATIONS

A. K. Pinnaka, D. Tharashasank and V. S. K. Reddy, "Cost performance analysis of intrusion detection system in mobile wireless ad-hoc network," 2013 3rd IEEE International Advance Computing Conference (IACC), Ghaziabad, India, 2013, pp. 536-541 (Year: 2013).*

(Continued)

*Primary Examiner* — Messeret F Gebre
(74) *Attorney, Agent, or Firm* — Van Pelt, Yi & James LLP

(57) ABSTRACT

Automatic diagnostics alerts for streaming multiple types of content is disclosed. At a first time, a set of metrics for a plurality of groups of streaming sessions is computed. A streaming session in a group is associated with streaming of a piece of content encoded by an entity. The streaming of the piece of content encoded by the entity is associated with streaming of another piece of content. An anomaly is identified at least in part by performing anomaly detection using the set of metrics. A cause of the identified anomaly is diagnosed. An alert is generated based at least in part on the diagnosis.

16 Claims, 26 Drawing Sheets

(56) References Cited

U.S. PATENT DOCUMENTS

| | | |
|---|---|---|
| 9,509,710 B1 | 11/2016 | Barry |
| 10,791,367 B1 | 9/2020 | Ganjam |
| 11,375,273 B2 | 6/2022 | Ganjam |
| 2003/0187986 A1 | 10/2003 | Sundqvist |
| 2004/0078470 A1 | 4/2004 | Baumeister |
| 2005/0083844 A1 | 4/2005 | Zhu |
| 2006/0282225 A1 | 12/2006 | Sunshine |
| 2007/0002897 A1 | 1/2007 | Goshen |
| 2007/0263984 A1 | 11/2007 | Sterner |
| 2007/0288518 A1 | 12/2007 | Crigler |
| 2008/0225706 A1 | 9/2008 | Lange |
| 2009/0054074 A1 | 2/2009 | Aaron |
| 2010/0161417 A1 | 6/2010 | Mitsui |
| 2010/0161424 A1 | 6/2010 | Sylvain |
| 2011/0225608 A1 | 9/2011 | Lopatecki |
| 2012/0150639 A1* | 6/2012 | Li .................... G06Q 30/0251 705/14.49 |
| 2012/0278331 A1 | 11/2012 | Campbell |
| 2012/0311126 A1 | 12/2012 | Jadallah |
| 2013/0014137 A1 | 1/2013 | Bhatia |
| 2013/0080264 A1* | 3/2013 | Umeda ................. G06Q 30/02 705/14.69 |
| 2013/0227648 A1 | 8/2013 | Ricci |
| 2014/0040020 A1 | 2/2014 | Kumar |
| 2014/0160941 A1 | 6/2014 | Hui |
| 2014/0321311 A1 | 10/2014 | Groenendijk |
| 2014/0337871 A1 | 11/2014 | Garcia De Blas |
| 2014/0351840 A1 | 11/2014 | Andrade |
| 2015/0170196 A1 | 6/2015 | Meir |
| 2015/0195126 A1 | 7/2015 | Vasseur |
| 2016/0062950 A1* | 3/2016 | Brodersen .............. G06F 17/18 702/181 |
| 2016/0112894 A1 | 4/2016 | Lau |
| 2016/0156520 A1 | 6/2016 | Scully |
| 2016/0164761 A1 | 6/2016 | Sathyanarayana |
| 2016/0170818 A1 | 6/2016 | Zhu |
| 2016/0232538 A1 | 8/2016 | Papakostas |
| 2016/0241927 A1 | 8/2016 | Kilar |
| 2017/0126476 A1 | 5/2017 | Curtin |
| 2017/0127108 A1 | 5/2017 | Kar |
| 2017/0171252 A1 | 6/2017 | Xue |
| 2017/0188094 A1 | 6/2017 | Ionescu |
| 2017/0223036 A1 | 8/2017 | Muddu |
| 2017/0244777 A1 | 8/2017 | Ouyang |
| 2017/0250882 A1 | 8/2017 | Kellicker |
| 2017/0323326 A1 | 11/2017 | Kim |
| 2018/0100784 A1* | 4/2018 | Patil .................... G05B 23/0281 |
| 2018/0278487 A1 | 9/2018 | Mermoud |
| 2018/0288461 A1 | 10/2018 | Funk |
| 2019/0045235 A1 | 2/2019 | Giladi |
| 2019/0102553 A1* | 4/2019 | Herwadkar ............ G06N 20/00 |
| 2019/0308509 A1 | 10/2019 | Herman |

OTHER PUBLICATIONS

Yu-Kung Ke, & Copeland, J. A. (2000). "Scalability of routing advertisement for QoS routing in an IP network with guaranteed" (Year : 2000).*

A. Ahmed, Z. Shafiq, H. Bedi and A. Khakpour, "Suffering from buffering? Detecting QoE impairments in live video streams," 2017 IEEE 25th International Conference on Network Protocols (ICNP), Toronto, ON, Canada, 2017, pp. 1-10 (Year: 2017).*

Ahmed et al., Suffering from Buffering? Detecting QoE Impairments in Live Video Streams, 2017 IEEE 25th International Conference on Network Protocols (ICNP), 2017.

Krishnan et al. Understanding the effectiveness of video ads: A measurement study. Proceedings of the ACM SIGCOMM Internet Measurement Conference, IMC. 149-162. 10.1145/2504730.25047 48. (Year: 2013).

Li et al., A Modified Inhomogeneity Measure in Spatial Distribution, 2013 Seventh International Conference on Innovative Mobile and Internet Services in Ubiquitous Computing, 2013, pp. 371-374 (Year: 2013).

Manferdini et al., Cross-Check of Analysis Modules and Reasoner Interactions, Oct. 30, 2014.

Padmapriya et al., Impact of malicious node on secure incentive based advertisement distribution (SI BAD) in VAN ET doi:http://dx.doi.org/10.1109/IACC.2017 (Year: 2017).

Xing et al., Face Tracking Based Advertisement Effect Evaluation, 2009 2nd International Congress on Image and Signal Processing, 2009, pp. 1-4 (Year: 2009).

Zhang et al., Bus-Ads: Bus Trajectory-Based Advertisement Distribution in VANETs Using Coalition Formation Games, IEEE Systems Journal, vol. 11, No. 3, pp. 1259-1268 (Year: 2017).

* cited by examiner

Alerts

| Manual | AI Alerts | | | |
|---|---|---|---|---|
| Alerts 802 | | 806 | Sensitivity Controls 808 Enter timezone | e.g. Average Bitrate 🔍 |
| Metrics | Value 804 | Root Cause | Cumulative Impacted Unique Devices | ▼ Time Alert Fired |
| Rebuffering Ratio | 4.4% | iphone and AKAMAI and Live | 202 | 19:21, May 07 2018 |
| Rebuffering Ratio | 5.2% | Flash and Unknown CDN and Live | 343 | 19:21, May 07 2018 |
| Exits Before Video Start | 32.2% | AKAMAI and Live | 723 | 19:13, May 07 2018 |
| Rebuffering Ratio | 4.6% | AKAMAI at Philadelphia | 147 | 18:56, May 07 2018 |
| Rebuffering Ratio | 5.9% | Verizon | 191 | 18:54, May 07 2018 |
| Rebuffering Ratio | 6.0% | T-mobile | 207 | 18:48, May 07 2018 |
| Rebuffering Ratio | 1.8% | Live | 1.32k | 18:21, May 07 2018 |
| Rebuffering Ratio | 2.8% | iphone and AKAMAI and Live | 450 | 18:18, May 07 2018 |
| Rebuffering Ratio | 3.4% | Flash | 445 | 18:17, May 07 2018 |
| Rebuffering Ratio | 3.3% | Flash and Unknown CDN | 245 | 18:16, May 07 2018 |
| Rebuffering Ratio | 6.9% | Android and AKAMAI | 282 | 18:14, May 07 2018 |
| Video Start Failures | 61.9% | All Traffic | 1 | 16:25, May 07 2018 |
| Video Start Failures | 3.1% | Android and AKAMAI and Live | 19 | 22:32, May 06 2018 |

AUTOMATIC DIAGNOSTICS ALERTS FOR STREAMING CONTENT ENCODED BY MULTIPLE ENTITIES

CROSS REFERENCE TO OTHER APPLICATIONS

This application is a continuation of U.S. patent application Ser. No. 16/427,051, entitled AUTOMATIC DIAGNOSTICS ALERTS FOR STREAMING CONTENT ENCODED BY MULTIPLE ENTITIES filed May 30, 2019 which is incorporated herein by reference for all purposes, which claims priority to U.S. Provisional Application No. 62/678,916, entitled AUTOMATIC DIAGNOSTICS ALERTS filed May 31, 2018 which is incorporated herein by reference for all purposes.

BACKGROUND OF THE INVENTION

Over the top, online video streaming (OTT) over the Internet has been rapidly growing. For example, in addition to mediums such as traditional cable television, many content publishers are placing their videos online. In some cases, some content may only be watched online. The growth of OTT video streaming has increased to the point that online video traffic now consumes a large portion of global Internet traffic.

The content presented to a viewer may be encoded and served by different content providers. For example, while from the viewer's perspective, the playing of requested content and any accompanying advertisements may appear to be a single stream, the content requested by a viewer may be served by a content publisher, while the advertisements played in conjunction with the requested content are often served by third parties, and not directly by the content publisher. However, even though the advertisements are not under the control of the content publisher, issues with the advertisements may impact the viewer's satisfaction with the requested content provided by the content publisher. Thus, it would be beneficial if content publishers could better understand when failures or issues with respect to third party advertisements occur.

BRIEF DESCRIPTION OF THE DRAWINGS

Various embodiments of the invention are disclosed in the following detailed description and the accompanying drawings.

FIG. 8 illustrates an embodiment of a reporting interface for a particular content publisher.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment.

The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
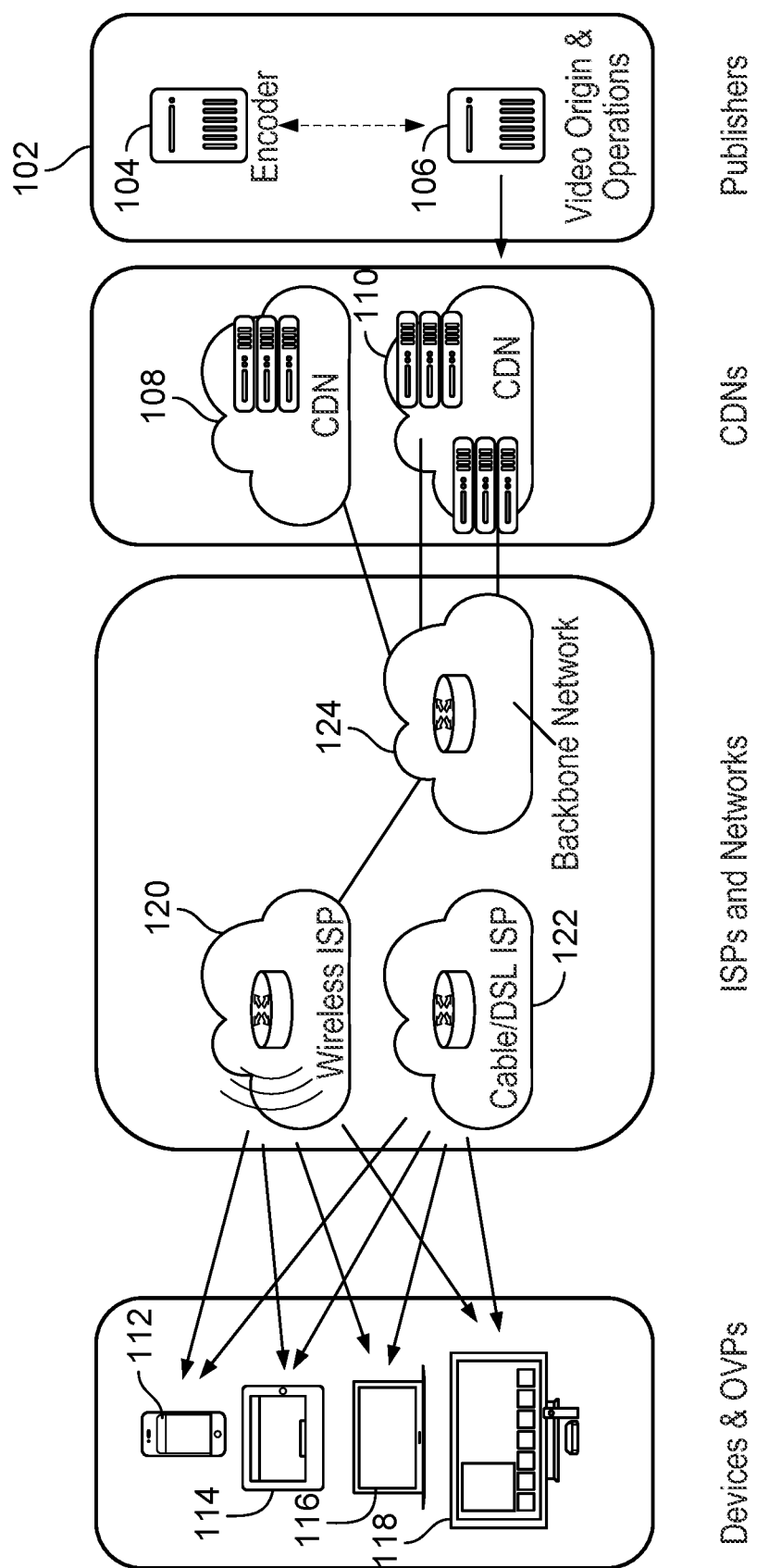
FIG. 1 illustrates an embodiment of a video streaming pipeline.

FIG. 1 illustrates an embodiment of a video streaming pipeline. Content delivery may involve many parties and many paths, with no single end-to-end owner. An example of a simplified streaming pipeline (that does not include entities such as content management systems (CMS), digital rights management (DRM), or ads) is shown in FIG. 1. Publishers 102 produce data (e.g., raw content) and encode the data (e.g., using encoder 104). The encoded versions of the raw content are then placed on origin servers (106), which are typically owned by the publisher.

Edge servers of content delivery networks (CDNs 108 and 110), which act as a form of a cache layer for the content, then pull content from the origin servers if an edge server receives a request from a content player, but does not have the requested content item.

On the client side, a variety of devices, such as smartphone 112, tablet 114, laptop 116, and set top box 118 may be used to play the video content. Other types of devices such as gaming consoles and smart televisions may also be used to play video content. The player on each device sends requests to the CDN server through different Internet service providers (ISPs), such as wireless ISP 120 and Cable/DSL ISP 122, in order to stream the content. The requested content is fetched from the edge servers, passes through backbone network 124 and the ISPs, and is ultimately delivered to the client devices to be played.

As shown in the example of FIG. 1, there are many entities and many paths, with no single end-to-end owner of the entire content distribution pipeline. Any entity in the pipeline could fail at any time, directly causing degradation in the quality of the video experience of the end users of the client devices.

For example, suppose that the video player of a device has a bug which causes many viewers using the device to buffer for a long period of time in the middle of video playback. In this scenario, if it can be determined that only the iPhone is the issue, and not any other device or entity in the delivery pipeline, then the device player can be debugged and the issue resolved.

Typically, however, issues may occur on many entities along the streaming pipeline. For example, consider the scenario in which users are watching a live event on different devices—smartphones, desktops, and set top boxes. The devices stream from multiple CDNs, where each CDN has its own live encoder. Suppose that the encoding for a first CDN, CDN 108, has an issue and no more data can be pushed to CDN 108 after a certain point, causing all devices streaming from CDN 108 to buffer for an extended period of time. In this case, a high buffering ratio would be observed on CDN 108, as well as on many types of devices.

As described above, there is no single end-to-end owner of the content delivery pipeline. The various parties and entities involved in the content delivery pipeline typically are separate and do not work with each other. If there are any issues that occur in the content delivery pipeline, this fragmentation of the ownership of the pipeline makes issues difficult to debug, and even more difficult to fix. For example, even if an ISP in a certain region observes that there is bandwidth congestion, the ISP issue would not be visible to the publisher. The publisher, who is concerned with the experience of end viewers, would have no idea the cause of issues with end viewers whose streaming experiences are suffering due to the ISP congestion problem.

Thus, it is challenging to detect and determine the root cause of the issues in a content delivery pipeline. Viewing quality has a large impact on viewer engagement. For example, a 1% increase in rebuffering ratio (the percentage of time a user spends in buffering, after the video starts) can cause viewers to spend less time watching content, as well as causing increased churn (which will continue to increase as viewers' expectations continue to increase). Without detecting issues and determining their root cause, effective actions cannot be taken, and the quality of viewers' experiences will continue to suffer while the issues remain unidentified, and therefore, unresolved.

Using the techniques described herein, anomalies or issues along the streaming pipeline are detected, and the root cause of the detected anomalies is identified. A single issue may manifest itself in multiple, different areas. For example, a problem with video encoding may trigger issues at the CDN level, the device level, etc., resulting in multiple anomalies arising in different components in the streaming pipeline, even though the video encoding is the actual, single root cause of all the issues that are seen across the various components. Thus, even if anomalies can be detected, it can be difficult to understand where the true cause of the issue lies so that appropriate actions can be taken to resolve the issue. Using the root cause diagnosis techniques described herein, even if multiple anomalies are detected, the anomalies may be reconciled, and a single root cause of the anomalies may be determined. The detected anomalies and their diagnosed root causes may then be reported to various entities in the streaming pipeline, informing them of detected problems and where the source of the problems is.

Further, using the techniques described herein, the anomaly detection and root cause diagnosis is performed in near-real time (e.g., at minute granularity). Detecting quality issues in the viewing experience of many viewers, diagnosing the root cause among the many entities in the content delivery pipeline, and providing rich supporting metadata to aid in troubleshooting (e.g., by sampling impacted views with rich metadata and using time series of aggregated metrics) in near-real time allow for issues and their causes to be identified quickly, ensuring good viewing experiences and maximizing viewer engagement.

While example embodiments in a video streaming (e.g., live and on-demand streaming) ecosystem are described below, the techniques described herein can variously be adapted to accommodate any type of audiovisual or multimedia content distribution, as applicable. The techniques described herein may also be applied to detecting anomalies and diagnosing root causes of issues in advertisements.

Figure 2A:
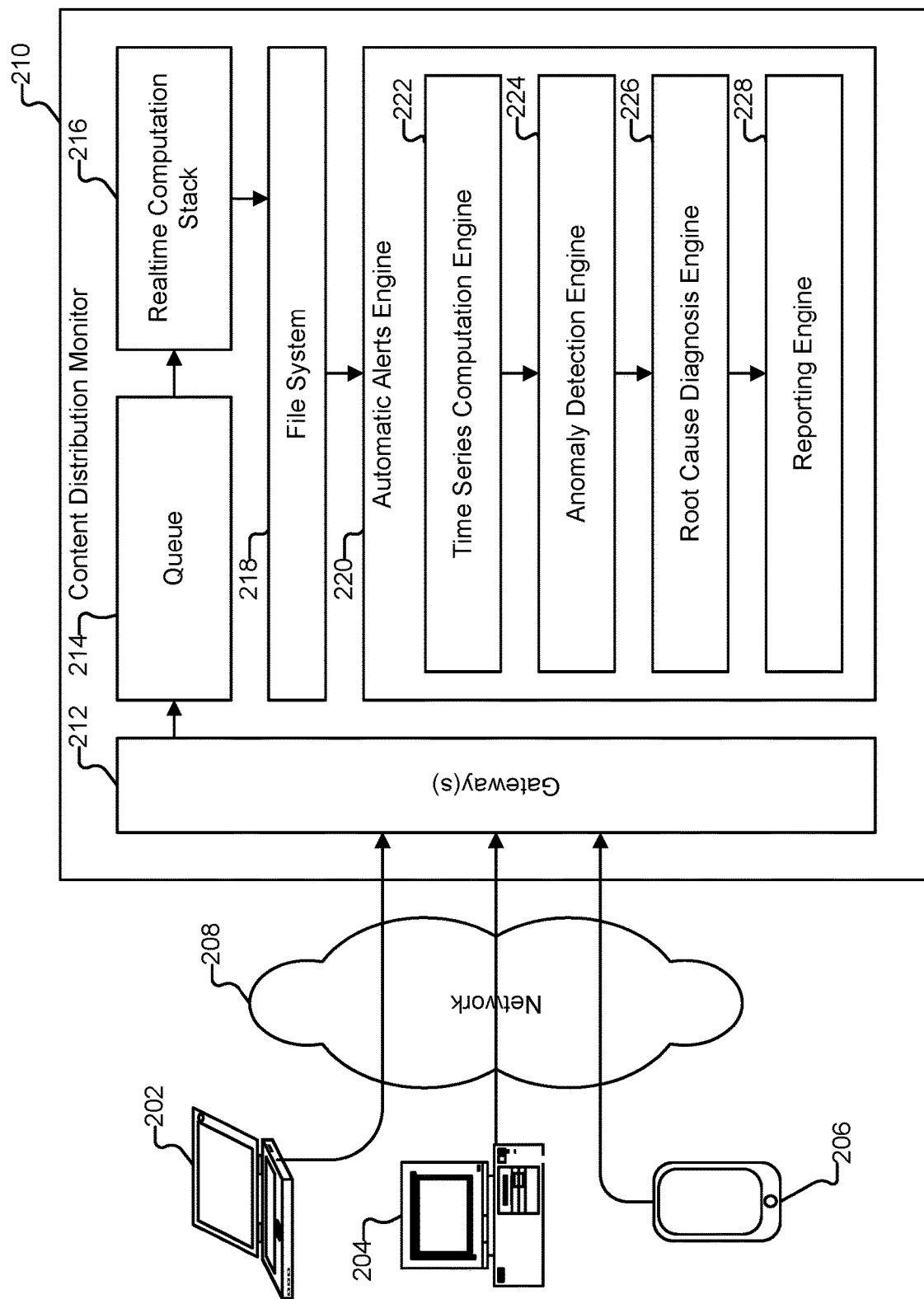
FIG. 2A illustrates an embodiment of an environment in which anomalies in a video streaming pipeline are identified and the root causes of the identified anomalies are diagnosed.

FIG. 2A illustrates an embodiment of an environment in which anomalies in a video streaming pipeline are identified and the root causes of the identified anomalies are diagnosed. In this example, devices 202-206 include video players used to play streaming content (e.g., whether live or video on demand (VoD)). Each player has running a sensor. The sensors continuously monitor the quality of the viewing experience for individual video sessions and send the measurements periodically back to content distribution monitor 210 (e.g., over network 208, such as the Internet). In this example, the quality of experience (QoE) measurements are sent in the form of heartbeats. The heartbeats may be sent periodically to the content distribution monitor (e.g., every 20 seconds).

In various embodiments, a heartbeat includes a session identifier (of the session for which the measurements are taken). The heartbeat also includes raw measurement data. The raw measurement data is used to compute QoE metrics, such as rebuffering ratio, video startup failure, exit before video start, etc. For example, a heartbeat may contain buffering time and playing time measurements, which are then used to compute the rebuffering ratio metric. The heartbeat also includes metadata about the session, such as the client device type (e.g., iPhone, Android, desktop, laptop, etc.), the operating system of the client device, the version of the operating system, the asset being played during the session, whether the content is live or VoD, the CDN (e.g., Akamai, Level3, etc.) from which the asset is being streamed, and an Internet Protocol (IP) address of the client device. In some embodiments, the Internet service provider (ISP) (e.g., Comcast, AT&T, Verizon, etc.) used by the client device is derived from the IP address of the client device.

Content distribution monitor 210 is configured to monitor the quality of the viewing experience of the video sessions, optimize the quality of the viewing experience, and maximize the viewer experience. Various entities may utilize the services of the content distribution monitor. For example, ISPs, CDNs, Publishers, etc. may be customers that consume the services provided by the content distribution monitor.

As shown in this example, the heartbeats transmitted from the various devices are received by gateway(s) 212. As one example, a gateway is implemented as a hypertext transfer protocol (HTTP) gateway server. The heartbeats are then placed on queue 214. In one embodiment, queue 214 is implemented as a Kafka queue.

The queued heartbeats are then passed from queue 214 to real-time computation stack 216 (also referred to herein as the "live" stack). The real-time computation stack is configured to summarize the incoming measurements on a per-video session basis (i.e., generate summarized session data per session—as identified by a session identifier in a heartbeat). In some embodiments, monitor 210 includes a second stack for handling historical information (e.g., previously captured session information).

The summaries are then written to a file system 218. In one example, file system 218 is implemented as a distributed file system such as the Hadoop Distributed File System (HDFS), where the summaries are to be consumed by other applications and processes.

In one example embodiment, the summarized heartbeat entries are stored in files in HDFS. Each file stored in HDFS contains a list of sessions for a specific minute. The session in a file may have various attributes including metadata and quality metrics, such as the following example metadata and quality metrics:

Metadata:
- Identifiers about the viewer: Viewer ID, Device ID (Client ID), Session ID
- Metadata about the video such as the name of the video asset, stream URL (Uniform Resource Locator), etc.
- Device metadata, such as the name/version of the device used to play the video, the name/version of the operating system, the name/version of the player, etc.
- Geographic ("Geo") information: Country, state, DMA, city, longitude, latitude, public IP address of the devices, ISP, ASN, etc.
- CDN(s) used to play the video
- Custom metadata: for example, tags set by customers of the services provided by the content distribution monitor.

Quality Metrics
- Startup state: indicates whether the video just started within the specific minute, the player is waiting for data to start playback, the session ended without playing any data, etc.
- Lifetime metrics: metrics that are measured since the start of the session such as total playing time, total buffering time, video startup time, average bitrate played since the start of the session, session start time, session end time, etc.
- Interval metrics: metrics measured within the corresponding minute such as playing time within the minute, buffering time within the minute, average bitrate played within the minute, etc.
- Errors encountered In this example, the summaries are consumed by automatic alerts engine 220. Automatic alerts engine 220 is configured to automatically detect and diagnose issues in (near) real-time. Automatic alerts engine 220 further includes time series computation engine 222, anomaly detection engine 224, root cause diagnosis engine 226, and reporting engine 228. Automatic alerts engine 220 is configured to detect anomalies (and decide when to fire alerts), diagnose the root cause of the detected anomalies, and report the detected anomalies/diagnosed root causes. In some embodiments, the processing performed by automatic alerts engine 220 is repeated or performed on a time-driven basis (e.g., every minute).

The root cause of the detected issue may be a single dimension or a combination of several dimensions by which sessions may be grouped. The root cause that is identified may be a specific grouping of entities (or a single entity) in the content delivery pipeline that is determined to be the source of the issue. For example, the root cause could be diagnosed as the iPhone device type under the device dimension. As another example, the root cause could be diagnosed as the group of sessions using iPhones that streamed from the Akamai CDN.

The anomalies are detected with respect to the time series of various predefined QoE metrics, such as rebuffering ratio, video start failures (VSF), exits before video start (EBVS), and video startup time (VST) (i.e., it is detected whether there are anomalies in the behavior of those QoE metrics). In this example, for every grouping of sessions, all of the metrics are computed. The root cause of the detected anomaly is diagnosed to determine which specific group of entities (e.g., some specific device or some specific combination of device and CDN) is the source of the issue (which is determined for each QoE metric). The detected issues and identified root cause are then reported. For example, alerts are sent out.

An example of the processing performed by issue detection and the diagnosis engine is as follows. The processing described herein is performed with respect to each predefined QoE metric of interest.

At each minute (or any other temporal granularity, as appropriate), time series computation engine 222 is configured to load, from file system 218, all of the session summaries from the last minute. Time series computation engine 222 continuously computes (e.g., at each minute) the set of Quality of Experience (QoE) metrics such as video start failure (VSF), exits before video start (EBVS), video startup time (VST), rebuffering ratio, etc., as described above. The aforementioned example metrics may be used to aggregate the quality experience from a large amount of collected video session data, which may be sent directly by software sensors integrated in client devices, as described above.

The aggregated QoE metrics are computed for groups of sessions at varying levels of granularity. The groups may correspond to sets of predefined dimensional attributes by which the sessions are grouped; for example, in various embodiments, sessions may be grouped according to their geo-locations (e.g., state, city, or Designated Market Area (DMA) in the United States), device type, as well as combinations of geo-location and device type. Other examples of dimensions that may be used for grouping sessions include: the name of a video asset that was played; the CDN from which the video data is streamed; whether the content is live or VoD (Video on Demand); and a user's or viewer's Internet Service Provider (ISP), or Autonomous System Number (ASN) within a given ISP.

The following is an example of dimensions and groupings.

Dimensions:
  CDN
  Device
  Live or VOD
  Asset
  ISP
  City
  CDN, Device
  CDN, Live or VOD
  Device, Live or VOD
  CDN, Device, Live or VOD
  CDN, City
  ISP, City
  CDN, ISP, City Groupings (there may be many groups per dimensions, and several examples are listed below per dimension, without limitation)
  CDN: Akamai, Level 3, Limelight, Edgecast, etc.
  Device: iPhone, iPad, FireTV, Roku, xBox, PlayStation, etc.
  Live or VOD: Live, VOD
  Asset: Game of Throne, The Americans, etc.
  ISP: Comcast, AT&T, RoadRunner, etc.
  City: San Francisco, New York, London, etc.
  CDN, Device: (Akamai, Roku), (Akamai, xBox), etc.
  CDN, Live or VOD: (Akamai, Live, Roku), (Akamai, VOD, xBox), etc.
  Device, Live or VOD: (Roku, VOD), (iPhone, Live), etc.
  CDN, Device, Live or VOD: (Akamai, Roku, Live), (Level3, iPhone, VOD), etc.
  CDN, City: (Akamai, San Francisco), (Level3, Chicago), (Akamai, Darmstadt), etc.
  ISP, City: (Comcast, Denver), (Verizon, Boston), etc.
  CDN, ISP, City: (Fastly, Verizon, Baltimore), (Akamai, Verizon, Boston), (Akamai, AT&T, San Diego), etc.

The various groupings are performed because issues may occur with respect to any of these groups, and any of these groups may be the source of the issue. The session data for the last minute may be grouped by the predefined dimensions, as shown above. For example, suppose that only the three dimensions CDN, Device, and ASN are under consideration. The different types of ways in which the session may be grouped by (also referred to herein as "groupby types") would then be <ALL> (representing the group of all sessions/traffic), <CDN>, <DEVICE>, <ASN>, <CDN, Device>, <CDN, ASN>, <Device, ASN>, and <CDN, Device, ASN>, resulting in a total of 2^3=8 types. Each type has the detailed dimension values or attributes filled in. As shown above, each dimension may have many different attributes or values.

As described above, in this example, at each minute, time series computation engine 222 computes the aggregated (e.g., average) QoE metrics per group from the numerous video sessions collected in the last minute. The computed QoE metrics for the minute are then combined (e.g., joined) with the QoE metrics computed for previous minutes to construct the time series per metric per group. A time series per group is also referred to herein as a "groupby" time series, as it is a time series computed for a subset or group of sessions that has been filtered according to a combination of dimension values or attributes. As one example, the QoE metrics computed for the minute are combined with the QoE metrics computed for the past 60 minutes, which have been cached (i.e., as historical information).

In some embodiments, smoothing of the time series is performed to eliminate noisy spikes caused by low attempts instead of real issues. The window size is made adaptive to the volume of attempts. To encode logic, an attempts threshold is set (e.g., 100) and a look back is done from the current minute until the threshold is met. When the attempts volume is large, the smoothing logic will not be triggered because each minute has enough attempts (exceeding the threshold).

Anomaly Detection

The time series constructed per metric per group (e.g., the time series constructed for rebuffering ratio for the group of <ALL> traffic, the time series constructed for rebuffering ratio for the group of sessions under <iPhone, Akamai>, etc.) are provided as input to anomaly detection engine 224. Anomaly detection engine 224 is configured to determine whether there is an anomaly detected in a time series for a metric for a group. For example, based on the evaluation of the time series for the rebuffering ratio metric for the group <iPhone, Akamai>, it is determined whether the group <iPhone, Akamai> is anomalous (i.e., the behavior of the buffering ratio metrics appear anomalous for sessions played on iPhone devices obtaining content from the Akamai CDN).

Statistical analysis may be performed on the constructed time series of the metrics to detect anomalies. One example of a technique for anomaly detection includes determining and using a baseline and threshold. A second example of a technique for anomaly detection includes using the Hidden Markov Model. The first approach using baselines and thresholds is described here. Further details regarding anomaly detection using the HMM will be described below.

Anomaly Detection Using Baselines and Thresholds

The QoE metrics may oscillate around a stable or stationary baseline over time. The time series may be modeled as a constant mean plus random noise. Whenever the noise portion exceeds a certain level, an issue is claimed to be detected, that is, an anomaly refers to a non-trivial spike in the time series of a quality metric.

In some embodiments, anomaly detection includes computing a baseline and deviation threshold for each QoE metric per group, for example, by aggregating QoE metrics for an extended period of time in which the metric appeared normal (e.g., as compared to a threshold value, such as video startup failure rate (VSF %)<0.5%). In one example embodiment, the baseline is the mean of the aggregated QoE metrics (per group) within the time period and the threshold is computed as a multiple of the standard deviation plus the baseline value.

In one embodiment, the mean of the QoE metric, per group, is computed using sessions (that are under the group) within a sliding window (e.g., last 40 hours) as a baseline. For example, the trending mean (or moving average) is used to compute a baseline for each metric on each group. In some embodiments, the values of the QoE metric of the time series are biased towards more recent data. For example, when computing the moving average, a high weight is assigned to the current minute. The weight is then decayed (e.g., exponentially) for the previous minutes (i.e., older data has less weight). As one example, an exponential decay rate of 0.998 is used, while maintaining a sliding window of 40 hours, $0.998^{(40*60)}$.

In some embodiments, a tolerance bandwidth is computed based on the computed standard deviation of the metric. For example, the tolerance bandwidth is computed as a multiple of the computed standard deviation. The tolerance bandwidth may be used to control alert sensitivity. In some embodiments, the tolerance bandwidth is configurable as a per customer parameter, as different customers may have different expectations and actions on alerts.

A tolerance threshold under which the metrics are considered normal is then also computed, where the tolerance threshold is computed based on the baseline and the tolerance bandwidth. In one embodiment, the tolerance threshold is the tolerance bandwidth above the baseline.

In some embodiments, when an issue is detected, the baseline and tolerance threshold are not updated, because they are used to capture the natural vibrations of metrics without issues occurring.

The deviation threshold (also referred to herein as an "issue detection threshold") is then used to detect issues for each QoE metric and group. The issue detection threshold may be based on the distribution of area above and below the tolerance threshold under normal situations. As one example, the area is configured based on the standard deviation and typical issue observation time. For example, the area threshold can be set to be 2*deviation*10 min. Both the height (number of standard deviations) and width (issue observation time) of the area can be adjusted.

A group is then marked or labeled as anomalous or "bad" if the metric at the current minute exceeds the tolerance threshold (e.g., there is a spike in rebuffering ratio that goes above the tolerance threshold). In some embodiments, a starting and ending time point of the issue is determined. Both starting and ending points are the cross points between the tolerance threshold and metric time series.

In some embodiments, the metric for the group having crossed or exceeded the threshold does not automatically trigger the labeling of the group as anomalous. For example, other factors are considered before the group is labeled as bad. For example, the impact of the detected event (crossing of the metric over the threshold) is computed. For example, the impact of the detected event may be computed in terms of time and the number of sessions that are impacted. Based on the impact, the group may then be labeled (or not labeled) as a true anomaly. The impact threshold for designating a detected event as a true anomaly is tunable. For example, different customers may tune their impact thresholds differently. One customer may decide that although the metric exceeds the threshold, only a small group of users are impacted, and the small impact is not significant enough for the event to be labeled or classified as an anomaly.

As one example, of taking into account the impact of an anomaly, if the QoE metric of the corresponding group at the current interval (e.g., one minute interval), or within a short period of time (e.g., 10 minutes) is above the deviation threshold for at least a configurable (threshold) time interval (e.g., 5 minutes), and there are at least a configurable (threshold) number of sessions (e.g., 100) considered "impacted" (i.e., the sessions for which the QoE metrics exceed the baseline+/−a multiple of the standard deviation) within that interval (5 minutes), the QoE metric of the corresponding group is labeled as anomalous, In some embodiments, the impact is used to determine whether an alert should be sent for an anomaly (e.g., if the impact is below a threshold, then no alert is sent). The frequency for detecting anomalies is configurable. The alerts may have different severity levels (e.g., "warning" and "critical"). The sensitivity of detecting anomalies and sending alerts may also be configurable.

An example of anomaly detection using baselines/thresholds is described in further detail below in conjunction with FIG. 3.

Anomaly Detection Using the Hidden Markov Model

A second example technique for anomaly detection is based on a hidden Markov model (HMM), an example of a Bayesian method for modeling time series. HMMs may be used to detect anomalies in metrics time series. HMMs may be used to determine the probability that an anomaly is happening within a particular group of sessions at any point in time.

In some embodiments, a separate HMM is used for each, per group, QoE metric. In this example, an HMM is a chain of states, one per interval (e.g., once per minute), with an associated metric observation for each interval. In this example, the state for the interval is a label to be inferred by the algorithm, either "ordinary" or "anomalous." These states are unknown (i.e., "hidden"), and the model may be used to infer these states using the observations (of QoE metric values). The states may be distinguished by the model for observations, which, in some embodiments, makes different predictions for metrics observed under the ordinary and anomalous states. If observations appear incompatible with the ordinary state for some stretch of time (e.g., the observations are extremely unlikely to happen under the ordinary state), the model finds a high probability that the group is in the anomalous state for that period. Inference may be performed on an interval (e.g., once per minute) using, for example, an algorithm such as the forward-backward algorithm.

One example of a model parameter is the distribution of observations (metrics) under the ordinary state (when there is no anomaly) and the anomalous state. In some embodiments, the ordinary distribution of metric values for each QoE metric and group is approximated as a Gaussian distribution. As one example, the mean of the Gaussian may be continuously re-estimated as an exponentially weighted moving average of previous metric observations when the group was in the ordinary state with high probability. The standard deviation may be approximated under a worst-case assumption by bounding the metric above and below. In some embodiments, the distribution of the metric in the anomalous state is taken to be a fixed Gaussian with a very large standard deviation. Another input to the model includes the probability of an anomaly.

In some embodiments, the use of HMM allows for the reporting of when an anomaly started (versus reporting that the anomaly happened when the detection happened).

The following is an example of an HMM model for anomaly detection. Take a group of sessions as an example (e.g., all sessions for a customer, or any group of sessions under some group-by). Consider the metric, rebuffering ratio. In each minute, the average rebuffering ratio is observed for the sessions. The HMM is used to determine the "hidden" state—whether there is an anomaly. The HMM may be used to determine the probability that there is an anomaly at a certain time. An anomaly can then be reported if that probability exceeds some threshold (e.g., 0.5, 0.99, or 0.999). The HMM connects the observations of metrics and the hidden states. The HMM may also be used to determine the probability that an anomaly happened in each past time period, not just the current time period (e.g., current minute).

State Transitions

The following is an example of a Markov model for the hidden states at each time interval. Each state depends only on the previous state. The model is to be used to determine the probability that the metric at the current minute is anomalous given the state of the previous minute. In order to do so, two parameters are determined: (1) the probability that the current state is anomalous given that the previous state was ordinary; and (2) the probability that the current state is anomalous given that the previous state was anomalous. As one example, probability (1) is 0.0001 and probability (2) is 0.99, respectively. This would encode the assumption that there is an anomaly on average every 10,000 minutes, and that anomalies last on average 100 minutes.

Emissions

A model for the observed metrics, also referred to herein as "emissions," is also determined. For example, the metric (e.g., buffering ratio) is modeled as depending only on the current state. The distribution of the metric in the ordinary state and the distribution of the metric in the anomalous state are obtained. In one embodiment, because the ordinary state is common, the rebuffering ratio distribution when in the ordinary state may be estimated from recent session data. As described above, the metric's distribution in the ordinary state may be modeled as a Gaussian distribution. With respect to the anomalous state, in one embodiment, the metric is modeled as a uniform distribution, where any average rebuffering ratio is equally likely to occur.

Starting State

In some embodiments, because the anomaly detection is performed every minute (or at any other interval, as appropriate), the initial starting state may be set to the anomaly probability that was calculated for that time slice the previous time anomaly detection was run. The very first time that the HMM-based anomaly detection is run, the starting state (e.g., probability that the starting state was anomalous) can be set to a small number (e.g., 0.0001).

After detection of anomalies, root cause detection may then be performed. In one embodiment, the HMM anomaly detection approach produces anomaly probabilities for each group of sessions independently. The root cause detection may then use the anomaly probabilities as input.

While two example techniques for detecting anomalies were described above, other anomaly detection techniques may be used. For example, the baseline may be non-stationary, with "seasonal" changes, if a model of the baseline is used that supports the capture of such information. (This means, for example, that the normal value of the baseline changes based on time. For example, the model may capture the fact that there are typically many more people watching TV at primetime than in the early morning hours.) Other predictive algorithms (e.g., autoregressive-moving-average) may be used to predict the normal values and deviations for any specific time intervals and specific metrics based on the nature of the metrics.

Handling Groups with Small Numbers of Sessions

In some cases, small groups (groups with a small number of sessions) may not have enough traffic to reliably detect issues/anomalies (i.e., it may not be clear whether a small group has an anomaly or not because, for example, the group has very little traffic with a very spiky time series). This can impact the subsequent diagnosis processing.

In one example of anomaly detection, as described above, statistics are used to compute the baseline and threshold for detecting anomalies. However, for small groups that are not of a sufficient sample size, the threshold may be extremely large, and it is possible that anomalies may not even be able to be detected.

In some embodiments, the anomaly detection described above is limited to those groups that have sufficient traffic (e.g., where the number of sessions in the group exceeds a threshold) to make a reliable anomaly detection determination.

In another embodiment, machine learning is used to compensate for the lack of traffic data for a "small" group. As one example, a machine learning module is included in anomaly detection engine 224 to assist or aid in estimating the performance (e.g., average of a QoE metric) for such small groups for a given time interval (e.g., one minute interval).

Figure 2B:
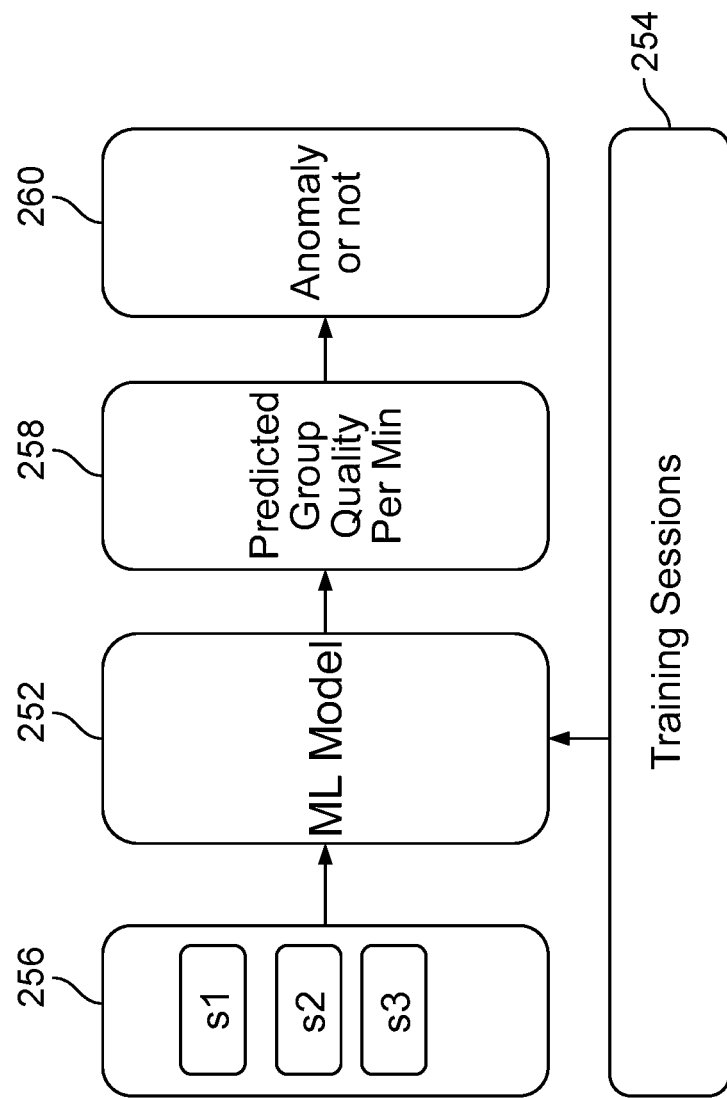
FIG. 2B illustrates an embodiment of a machine learning module for facilitating anomaly detection.

FIG. 2B illustrates an embodiment of a machine learning module for facilitating anomaly detection. In some embodiments, the machine learning module of FIG. 2B is a portion of anomaly detection engine 224. The machine learning module is used to determine the aggregate metrics for a "small" group (e.g., that includes less than a threshold number of sessions). In this example, a machine learning model 252 is trained based on all video sessions 254. At each minute (or any other interval of time, as appropriate), all of the sessions from the "small" group (256) are fed into the machine learning model to obtain an estimate of the group's performance (indicated by a QoE metric value), as shown at 258. In this example, this results, minute by minute, in time series of the quality metrics for the "small" group. Thus, a time series of the metrics for this "small" group is generated/constructed. The anomaly detection techniques described above may then be used on the constructed time series to detect anomalies at 260.

Thus, information is pooled between smaller and larger groups. Similar sessions in large groups are used to assist in estimating the performance of the sessions in small groups. In some cases, the simpler average performance for a small group may be a poor estimate of the true average performance for that group at any one time. In these cases, machine learning techniques such as linear regression may be used to improve these estimates by partially pooling information between smaller and larger groups. Thus, similar sessions in a large group are used to estimate the performance of the sessions in the small group.

Root Cause Diagnosis

Root cause diagnosis engine 226 is configured to diagnose the root cause of the anomalies detected by anomaly detection engine 224. As described above, for a given time series metric, such as rebuffering ratio, the QoE metric is computed for every grouping. Anomalies may be detected in multiple groupings (i.e., spikes in rebuffering ratio may be detected in the time series of many groups), even if only one group is the source of the issue. This is because a single issue may manifest anomalies in multiple groups. That is, an issue in one component of the video delivery system may affect the aggregate metrics of multiple groups of video sessions. For example, an issue across an ISP that causes increased rebuffering may also cause increased rebuffering for every ASN, and an issue in a single ASN may potentially cause a noticeable increase in rebuffering for the entire ISP. Root cause diagnosis engine 226 is configured to solve this causal inference problem, finding the "root cause" of the detected anomalies, as will be described in further detail below.

As described above, the different groupings (ways to group sessions) are constructed as different combinations of dimensions (examples of which are described above), where different groupings are groupings of different numbers of dimensions. The different groupings have a hierarchical, parent/child relationship. For example, suppose that only the dimensions Device, CDN, and IsLive? (i.e., true if live, false if not live (e.g., VOD)) are considered. The possible combinations of these dimensions are:

Zero: <ALL>
Single: <CDN>, <Device>, <IsLive>
Double: <CDN, Device>, <CDN, IsLive>, <Device, IsLive>
Triple: <CDN, Device, IsLive>

In terms of levels of granularity and filtering of sessions by dimension(s), the single dimension groupings are children of all traffic. The double dimension groupings are the children of the single dimension level (e.g., <CDN, Device> and <CDN, IsLive> are children of <CDN>). The triple dimension grouping is a child of the double dimension level.

In some embodiments, when performing root cause diagnosis, a graph (also referred to herein as a "diagnosis graph") including the different groupings is constructed based on the parent/child relationship of the groupings, as described above. The root cause group is the one whose children are all bad or anomalous. In some embodiments, if the diagnosis is to be performed on behalf of a specific customer (e.g., publisher), then the diagnosis graph is constructed using only the traffic of that customer.

As one example, a directed acyclic graph (DAG) is constructed, where each node in the graph represents a group. The graph is constructed out of all of the groups based on the parent-child relationship between the groups. A group, as referred to in the example herein, represents the collection of video sessions defined by the dimensions of that group. Domain specific knowledge of the OTT video delivery ecosystem may be used to construct and prune the graph. For example, a group (CDN:Akamai, Device:AppleTV) may be constructed to represent all the video sessions that are playing video on an Apple TV device type and obtaining video from the Akamai CDN. In some embodiments, a group "A" is considered a parent of group "B" if "B" contains and matches all the dimensions of group "A" and has one more dimension than "A." For example, (CDN:Akamai, Device:AppleTV) is a parent of (CDN:Akamai, Device:AppleTV, ContentType:Live).

As one example of a graph, at the root is <ALL> traffic (i.e., the group containing all traffic in that minute, unfiltered by any dimensions). The next level is single dimension groupings. The next level is double dimension groupings. The next level is triple dimension groupings, and so forth. In the above example of three dimensions, there were eight combinations of patterns. If N dimensions are considered, the number of combination patterns would be $2^N$. In some embodiments, for scalability, certain dimensions, such as <Asset>, <DMA>, <ISP>, and <Asset, CDN>, are excluded from the groupings used to generate the graph. As another example, certain dimensions are excluded from being combined with other dimensions to generate group-bys.

The following is an example of a process for performing root cause diagnosis by traversing or searching the diagnosis graph. First, the search of the graph is performed from left to right (i.e., using a breadth first search (BFS)) for the groups with issues/anomalies detected (with depth bound or group bound).

Next, whenever one such group is detected, a depth first search (DFS) is performed recursively (starting with the group) for all of its sub-groups to look for the root cause.

Next, in each DFS run, for each child group, the contribution (aggregated metrics) of all children to the parent is computed in both a normal period (e.g., the last 30 minutes without issue, which may be configurable) and during the issue period. If a child's issue period contribution is much larger than its normal period contribution (e.g., 0.1, which may also be configurable), then the child is considered as one of the root causes. If none such child exists (i.e., the contribution difference vibrates around zero), then the parent is the root cause. Here, the increase of contribution indicates root cause, instead of absolute contribution.

In an alternative embodiment of determining when to stop the DFS search, instead of computing contribution before and after an anomaly is detected, the detection flag set by the previous BFS issue detection stage is used. If all children groups with significant amounts of traffic are marked as anomalous, then the parent is returned as the root cause. That is, if a group is claimed to be the root cause of an issue, then all of its children should be anomalous. For example, if <dimension_1, dimension_2, . . . , dimension_m> is the cause of the issue, all combinations such as <dimension_1, dimension_2, . . . , dimension_m, any other dimensions> would have the same issue. In another embodiment, the node itself is labeled as a root cause if more than a configurable (threshold) percentage (e.g., 80%) of children is labeled as anomalous as well. If a node satisfies the criteria, then the node is labeled as a root cause and the search moves forward to the next node on the BFS path. Otherwise, if the node is anomalous but does not meet the children criteria, then each individual child is recursively drilled down into using a DFS search. In a merging stage across different children groups, the child with maximum depth is selected as the root cause.

Next, in the DFS search, after all of the root causes of all the children groups are computed, the root causes are merged. If all children groups agree that the parent is the root cause, then the parent is returned as the root cause. Otherwise, the union of all children root causes without parent is returned, and the root causes are merged based on the parent-children relationships. In some embodiments, a single node child is blamed before the parent is blamed. For example, if <ALL> is diagnosed as the root cause and the customer uses a single CDN, then the algorithm should return the CDN as the root cause.

Next, all sub-groups searched in the DFS search are marked as "searched" so that the BFS search does not revisit these groups. In this way, each group would be visited exactly once by BFS (but may be visited multiple times by DFS).

In some embodiments, verification of the root cause diagnosis is performed. For example, after the cause of an issue is identified, the root cause group's performance can be replaced with its past good average to see if this resolves the issue.

Further details and examples of root cause diagnosis are described below.

Based on the anomaly detection and root cause diagnosis performed by anomaly detection engine 224 and root cause diagnosis engine 226, respectively, reporting engine 228 is configured to generate outputs such as alerts. As one example implementation, generated alerts are written to Phoenix to be pulled by a data application programming interface (API) for external usage. A push API can also be called to push the alerts to customers. Examples of alerts include emails or pages that are sent to customers or users.

As one example, an alert includes a link that when clicked on, provides details about the alert (e.g., by pointing back to the content distribution monitor). Various information is then provided, such as the detected anomaly, the identified root cause, as well as additional information that may be used for troubleshooting, such as information/metadata for a subset of sessions that are affected by the detected/diagnosed issue.

The provided information may also include a representation (e.g., plot) of the time series for the metrics in which anomalies were found (e.g., two hours of data—one hour before the alert was fired, and one hour after). This would allow the user to see when a metric begins to degrade, as well as the severity of the degradation. Users can then also view what the numerical value of the metric was when the alert was fired.

The cumulative impact of an issue may also be presented, for example, by displaying the number of sessions or unique devices that were impacted since the issue was detected. For example, a threshold may be set to quantify the impacted users in normal situations (without alerts/anomalies), suppose $95^{th}$ percentile (defining only 5% of users are impacted). The $95^{th}$ percentile is then used as a threshold to analyze how many users exceed the threshold when an alert happens (an anomaly is detected).

The determination of what sessions are impacted may vary depending on the QoE metric. For example, for metrics such as EBVS and VSF, the impacted session is defined as any session with EBVS or VSF. In one embodiment, for rebuffering ratio and video startup time, the impacted session is defined as a session whose rebuffering ratio or video startup time exceeds a tolerance threshold (as described above). In some embodiments, if the tolerance threshold is not known when computing distribution buckets in groups, a linear interpolation is performed to approximate the percentage impacted. For example, suppose a tolerance threshold of a rebuffering ratio is 3%, which falls within the bucket (2%, 5%) with corresponding percent (80%, 50%), then the percent impacted is 50%+(3%−2%)*((80%−50%)/(5%−2%))=60%.

Rich metadata for at least some of the affected or impacted devices may also be shown. For example, metadata for a random subset of the affected devices may be presented. The additional details provided in the metadata can be used to facilitate troubleshooting.

For example, while the dimensional attributes of the group that was identified as the root cause are provided, the user may also wish to see what specific assets (e.g., pieces of video content) were being streamed at the time, what the streaming URL was, or what were the versions of a specific device in the identified root cause group (e.g., to see if there is a certain plugin that is affecting video streaming). Another example of additional metadata that may be provided is the IP address of CDN edge servers. This information would allow a customer that is a publisher to alert the CDN of the IP addresses that are problematic. The CDN provider may then use the information to correlate from their side if there are any issues with their edge servers.

The alert may also include a severity rating, which may be based on how many people were impacted by the issue, as well as how long the issue lasted. For example, the severity may be specified at different levels, such as critical, warning, or information. This allows the user to have greater insight into the detected anomaly so that the appropriate actions may be taken.

Additional examples of output, such as reports and interfaces, are described in further detail below.

The issue detection/diagnosis (per metric per group) processing described above is performed on a periodic basis (e.g., every minute, or any other appropriate granularity) to provide near real-time fault detection and diagnosis. At each interval, the processing is performed with respect to each of the QoE metrics. For example, at the next minute, new summarized session data is received from the live stack. All the metrics are computed for all the groups for that next minute, where they are then combined with the cached QoE metrics computed for the previous minutes to generate updated time series per metric per group. Anomaly detection and root cause diagnosis are then performed on the updated time series. This may result in new issues and/or new root causes being determined every minute.

Thus, if there is an issue in the content delivery pipeline, there is a one minute latency to detect the issue and report the detected issue. This provides immediate, near real-time issue detection, diagnosis, and reporting, which allows for the customer of the service to be notified of the issues with as little latency as possible so that the issues can be fixed as soon as possible. This is beneficial for the streaming environment, where any issues can cause loss in viewer engagement.

The time granularity may be adjusted. For example, if an ISP is a customer utilizing the services provided by the automatic alerts engine, the time series granularity may be changed from one minute to one hour.

An example illustrating how the near real-time processing is performed using the distributed computing platform Spark is described in further detail below.

Further details and examples of Anomaly Detection
Example Anomaly Detection

Figure 3:
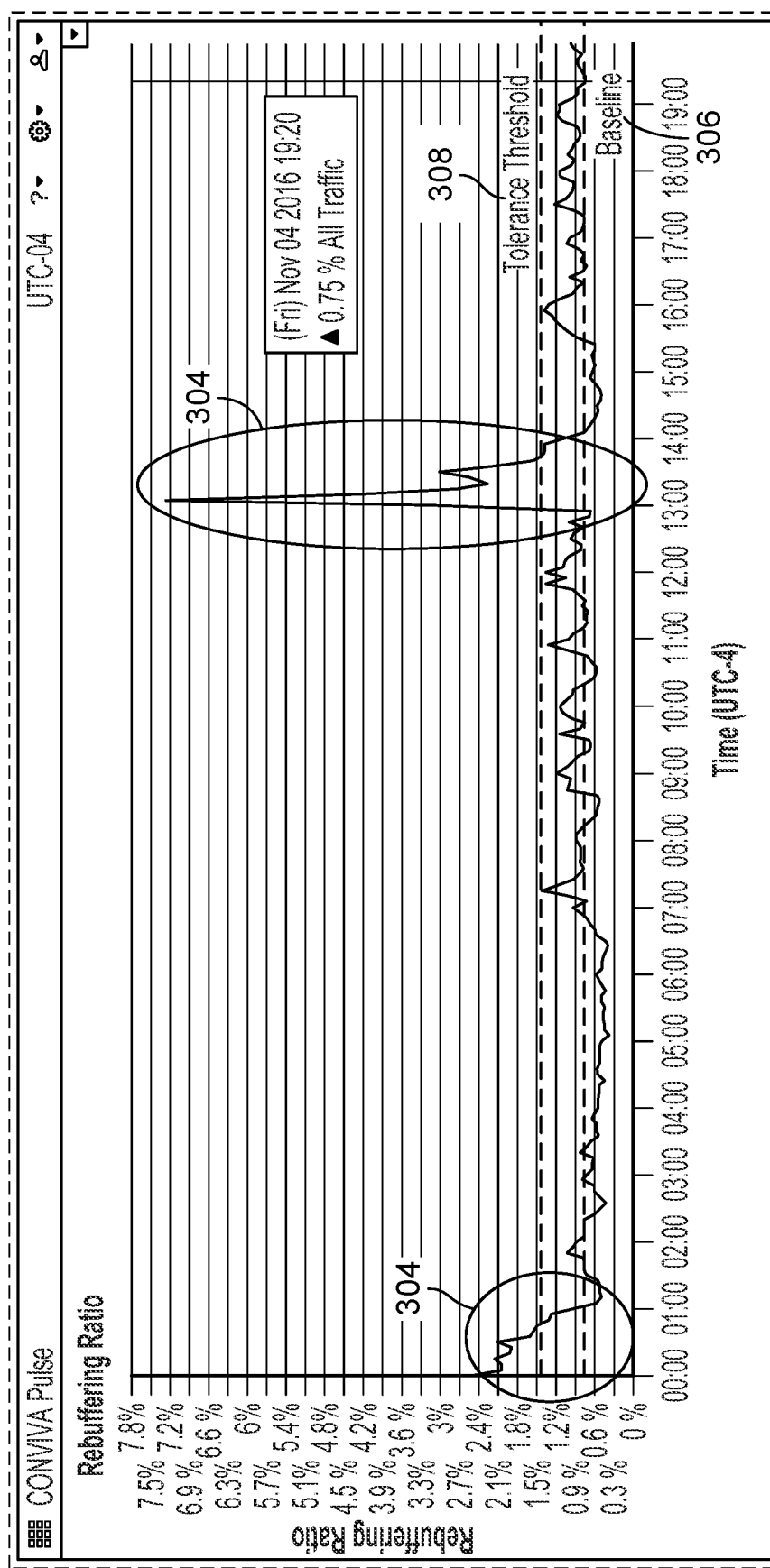
FIG. 3 illustrates an embodiment of detecting an anomaly.

FIG. 3 illustrates an embodiment of detecting an anomaly. In this example, a time series of the rebuffering ratio QoE metric for the group of all traffic is shown. At 302 and 304, two spikes are shown, a smaller spike (302) and a larger spike (304). The larger spike at 304 has a larger impact on video quality, as compared to the small spike at 302. In this example, the spikes are captured/detected as anomalies using the baseline/threshold anomaly detection technique described above.

First, a baseline 306 is computed. As described above, the baseline is computed based on the trending mean of past historical data. Then, above the baseline, a tolerance threshold (308) is computed. In this example, the tolerance threshold is computed as being several standard deviations above the baseline, as described above. The rebuffering ratio is considered as "normal" (or not anomalous) when it is beneath or under the tolerance threshold.

Next, above the tolerance threshold, the area of each spike is computed to determine the impact of the issue. In this example, the computed area is an integration over the time dimension and the metric dimension, where both dimensions are used to characterize the impact. For example, while a spike may be small in height (small in terms of rebuffering ratio value), it may last for a prolonged period of time, resulting in an overall large impact on video quality. On the other hand, a spike that is short in time duration may still have a high peak rebuffering ratio, also resulting in a large impact. Thus, the area under the spike is used to reflect the impact.

In this example, if the computed area exceeds an area threshold, then the spike is determined to be an anomaly. In some embodiments, the area threshold is user-configurable. This allows users to configure and control how alerts are generated/transmitted. For example, the user can make adjustments to have more alerts, or to only capture the most serious anomalies (e.g., those that have the largest impact, or an impact that exceeds a configurable threshold). This control may be delegated to customers because the determination of whether a spike is anomalous or not depends on the customers' definition of impact. For example, one customer may choose to only define the large spike at 304 to be anomalous, because the small spike 302 has a trivial impact on their video quality. On the other hand, a different customer may wish to capture both small spike 302 and large spike 304 as anomalies.

Further Details and Examples of Root Cause Analysis

As described above, content delivery issues may occur at any dimension, or any combination of several dimensions. If only anomaly detection were performed, many anomalies might be detected (since issues may manifest in many groups), without identifying which group is actually at the root of the detected anomalies.

Figure 4:
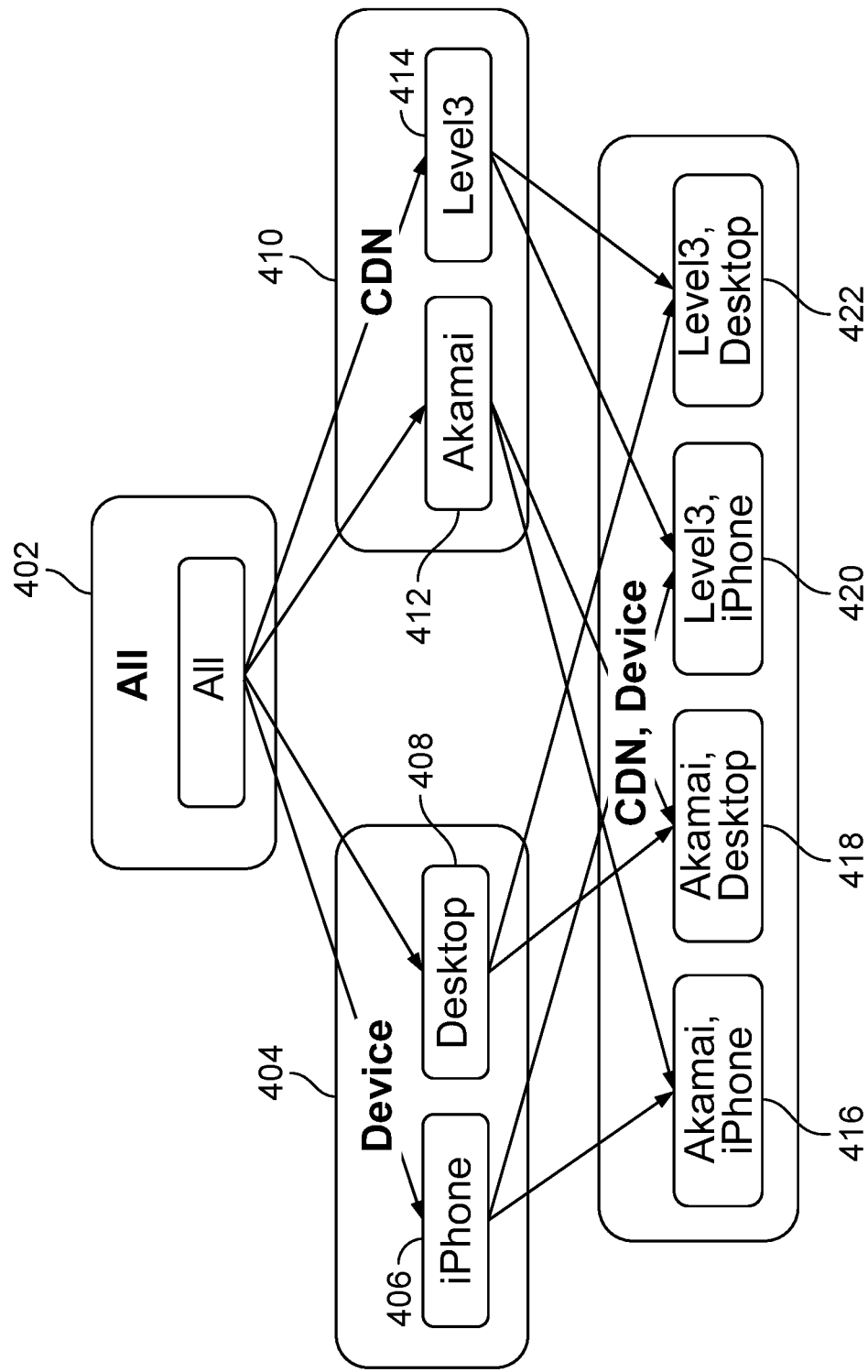
FIG. 4 illustrates an embodiment of diagnosing a root cause of detected anomalies.

FIG. 4 illustrates an embodiment of diagnosing a root cause of detected anomalies. Shown in this example is a diagnosis graph that is constructed based on anomaly detection. At the root 402 of the graph is the "zero" dimension level representing all traffic.

The next level is the groupings of sessions that are grouped by single dimensions. For example, at this level are the device dimension groupings 404 and CDN dimension groupings 410. Within the device dimension are two groupings by specific devices (attributes of the device dimension), one for the grouping/filtering of sessions by iPhone (406), and one for the group of desktop sessions (408). The CDN dimension includes two groupings, one for the group of sessions streaming from Akamai (412), and one for the group of sessions obtaining content from the Level3 CDN (414). The groupings at the single dimension level are children of the all group at 402.

The next deeper level includes groupings by two dimensions. In particular, in this example, this level includes groupings of sessions that are grouped by both CDN and Device dimensions. The groupings <Akamai, iPhone> (416), <Akamai, Desktop> (418), <Level3, iPhone> (420), and <Level3, Desktop> (422) are the pairs/combinations of devices (406-408) and CDNs (412-414). Each grouping at this level is a child of two parents (one device and one CDN).

Thus, as shown in this example, when performing root cause diagnosis, a diagnosis graph (e.g., directed acyclic graph) is constructed, where each node represents a group (grouping of sessions), such as <iPhone> or <Akamai, iPhone>. The group <Akamai, iPhone> represents the group of traffic that uses iPhones and streams from Akamai, and is the intersection of the sessions that use iPhones and the sessions that stream from Akamai. The links between the nodes indicate a parent-child relationship. A parent group is split into multiple subgroups. The split may be performed according to various dimensions. For example, the group <iPhone> is split into the subgroups <Akamai, iPhone> and <Level3, iPhone> by the CDN dimension. In this example, this split indicates that among all the video sessions that are played on the iPhone, some of them stream from Akamai, and the remainder stream from Level 3. The parent group is the union of all its child subgroups.

In the example shown, the groupings <iPhone> 406, <Akamai, iPhone> 416, and <Level3, iPhone> 420 have been detected as anomalous using the anomaly detection techniques described herein.

If the iPhone device has issues, it may affect all the CDNs from which iPhone devices stream from. For example, both groups <Akamai, iPhone> and <Level3, iPhone> are affected. Although anomalies are detected in both these two groups, these two groups should not be blamed or diagnosed as the root cause. Instead, the iPhone device should be blamed or diagnosed as the root cause (because in this example, both of its children were anomalous).

In this example, when performing diagnosis, among all the groups that are detected as having anomalies, only the group whose subgroups are all "bad" (such as iPhone in this example) is diagnosed as being the root cause (and the source of the issue). The other groups 416 and 420 are merely affected by the issue with iPhones, and are not the root cause.

The following describes an example systematic approach of the root cause diagnosis performed by evaluating or traversing the diagnosis graph of FIG. 4. The diagnosis graph is constructed. The graph provides the searching structure for the root cause diagnosis.

After the graph is built, root cause analysis is performed for all groups in the graph independently. Those groups that are detected as having an anomaly (e.g., detected as described above using baselines/thresholds, HMM, etc.) are marked as anomalous or "bad" (e.g., the groups 404, 416, and 420 in the graph).

After marking the groups that are anomalous, a search is performed from the top level to the bottom of the graph. Whenever an anomalous group is visited, a recursive drill down is performed to search for the root cause. The search ends when a group is identified whose subgroups are all bad. That group is then returned as the root cause. In the example of FIG. 4, all subgroups of iPhone are bad, and thus the group <iPhone> is diagnosed as the root cause.

Figure 5:
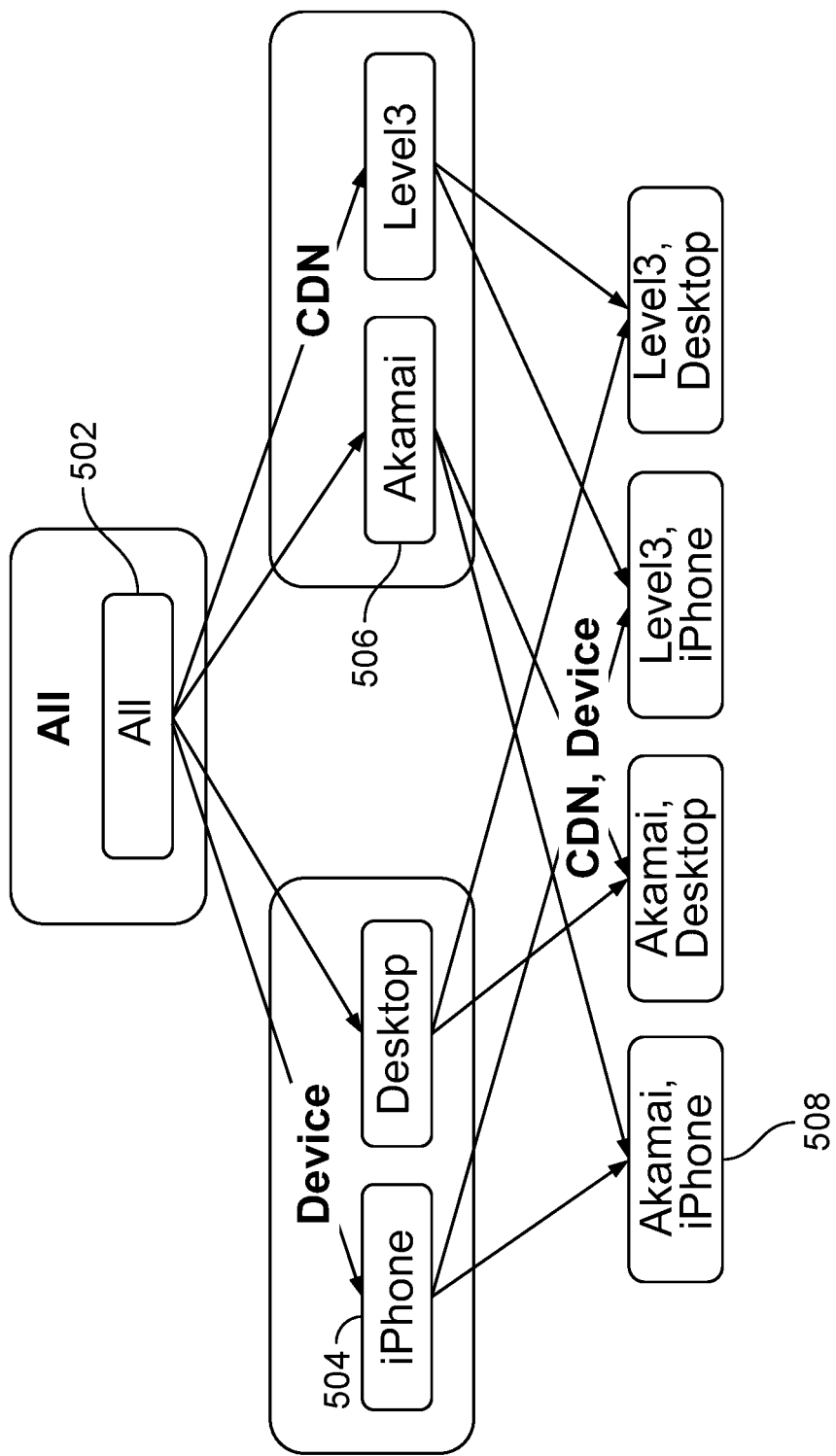
FIG. 5 illustrates an embodiment of diagnosing a root cause of detected anomalies.

FIG. 5 illustrates an embodiment of diagnosing a root cause of detected anomalies. An example of a diagnosis graph is shown in FIG. 5, which includes the same nodes as the graph shown in FIG. 4. In this example, different groups have been found to be anomalous. In this example, an anomaly has been detected in the <All> group (502) at the top level (i.e., anomalies were found in the group of all traffic/streaming sessions). A search is performed on the diagnosis graph of FIG. 5 to determine a root cause of the detected anomalies.

Since the anomaly was detected in the <All> group, a recursive drill down of the <All> group is performed. At the next level, for each dimension (single dimension group-bys at this level) Device and CDN, the groups within each of the dimensions are evaluated to determine how many of the groups within a given dimension are anomalous. As part of the drill down, anomalies in the subgroups <iPhone> (504) and <Akamai> (506) are found in the dimensions Device and CDN, respectively. However, not all of the devices and not all of the CDNs were anomalous. Thus, the <All> group is not the root cause (otherwise all of the groups within a dimension would have been anomalous, since their union would cover all traffic).

The search then forks, and recursive drill downs are performed on both <iPhone> and <Akamai>. Both <iPhone> and <Akamai> point to their common subgroup <Akamai, iPhone> (508), for which an anomaly has also been detected. That is, both search paths ended at the same node. Thus, the group <iPhone, Akamai> is determined to be root cause. In this example, the <All> group was flagged as anomalous because of the large proportion of traffic being streamed by iPhones, which would have a large impact on the average rebuffering ratio that is computed across all traffic.

If <Akamai> were the root cause, then the group <Akamai, Desktop> should also have been detected as anomalous, which is not the case in this example. Likewise the group <iPhone> is not the root cause either, otherwise the group <Level3, iPhone> would also have been anomalous, which is also not the case.

Further Details Regarding Constructing the Diagnosis Graph

From the examples of FIGS. 4 and 5, it can be seen that the diagnosis result depends on the structure of the diagnosis graph (e.g., what nodes are included in the graph). In other scenarios, there may be many more dimensions and combinations of dimensions to consider, resulting in a more complex searching structure.

In some embodiments, the diagnosis graph that is constructed is not a full graph that includes all possible nodes and all possible combinations of dimensions, as the size of the graph would make the diagnosis traversal difficult to compute. In some embodiments, pruning is performed to boost performance. For example, not every dimension is considered when constructing the graph. Not every combination of dimensions is necessarily considered, as well. For example, while combinations of <device, CDN>, <City, ISP>, and <CDN, City> may be considered (the combination of City with ISP and CDN may be used to help localize ISP and CDN issues to certain geographical cities/regions), other combinations such as <device, ISP> and <device, city> are not combined to form further subgroups because those combinations are not as meaningful when diagnosing an issue. As another example, the combination of the asset dimension with other dimensions is not computed, due to scalability and complexity issues (because of the numerous different pieces of content that could be streamed), when generating the diagnosis graph. In some embodiments, what dimensions/combinations of dimensions are considered when constructing the diagnosis graph is predefined/configurable.

In some embodiments, the graph is constructed starting from groups identified as anomalous. In one embodiment, each group is represented or defined or identified by a group identifier (group ID). The group ID acts as a key for the session data for a group. (The group ID will also be used to provide various performance enhancements, as will be described in further detail below.) The group ID, which in one embodiment is a hash of the dimension attributes/groups to which the session belongs, also indicates the relationship among the groups. As described in the examples of above, the root of the graph is all traffic for the customer. Starting from the anomaly groups, a connected graph that connects the anomalous groups is constructed. For example, the anomaly groups are first gathered. The parents of the anomaly groups that are required for the graph to be connected are obtained to construct the graph.

Merging Multiple Identified Root Causes

In the example of FIG. 5, both search paths gave the same unique root cause. In some cases, multiple search paths may result in multiple, different root causes being returned (this may be an artifact or consequence of an incomplete graph being constructed and used for diagnosis for efficiency/complexity reasons). However, this is potentially the same issue manifesting itself in multiple places.

Various techniques may be used to resolve the multiple identified root causes. As one example, the group at the end of the longest search path is returned as the root cause. In some embodiments, a similarity analysis is performed between identified root causes to determine whether they can be merged and a single root cause can be identified. As one example, the similarity is determined by checking, for each of the root cause groups, the similarity of the unique impacted sessions for those groups.

As one example, a count of the impacted unique devices by each issue is computed (e.g., by using hyperloglog (HLL)). The amount of overlap between the different identified root causes is evaluated to determine whether the root causes may be merged or one root cause can be excluded (in the example of FIG. 5, both search paths were the same length but returned the same subgroup—i.e., same group of sessions—therefore, that subgroup was returned as the single root cause group). In some embodiments, the times of detected issues are determined to combine multiple root causes. In some cases, the metric time series of the identified root causes is compared to determine the similarity of those root causes. The determined similarity is then used to decide if the root causes should be combined or excluded.

Example Spark Implementation of Automatic Alerts

In one embodiment, automatic alerts engine 220 is implemented on the Apache Spark distributed computing framework (e.g., using a Spark cluster). For example, the processing performed by the automatic alerts engine is performed on a Spark cluster of computing nodes to achieve high scalability.

For example, the QoE metrics computed per group per minute are computed in a distributed manner. However, while the diagnosis is performed on a per-customer basis (e.g., when constructing the diagnosis graph), the QoE metrics computed per group are not computed on a per customer basis. Thus, shuffling will need to be performed at some point. Shuffling is an expensive action to take in Spark computations. Described herein are optimizations that may be performed to reduce the shuffling.

Figure 6A:
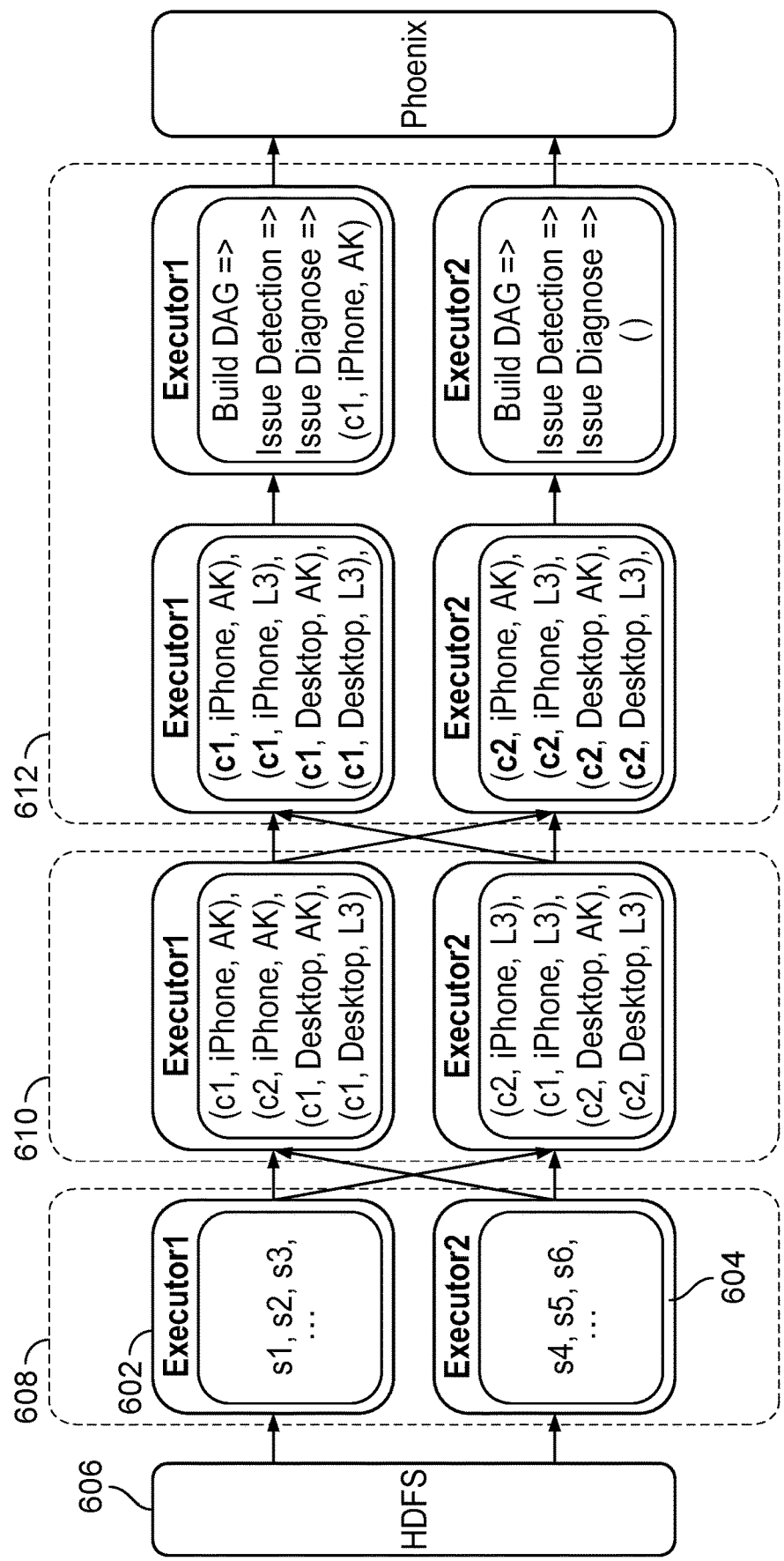
FIG. 6A illustrates an embodiment of a distributed anomaly detection and root cause diagnosis processing pipeline.

FIG. 6A illustrates an embodiment of a distributed anomaly detection and root cause diagnosis processing pipeline. In the example of FIG. 6A, a distributed version of the anomaly detection and root cause diagnosis processes described above is shown using the Spark framework. In some embodiments, the processing described in conjunction with FIG. 6A is used to implement automatic alerts engine 220.

In this example, suppose that there are two executors, 602 and 604. The executors are included in worker machines of a Spark cluster (also referred to herein as "worker nodes"). In one embodiment, the executors are implemented as java virtual machines (JVMs) within the machines. Each worker node may have several executors running at the same time.

In this example, each executor is associated with a set of CPU (central processing unit) cores. For example, each executor is assigned three cores. Suppose a machine/worker node has 16 processing cores. The worker node may have five executors (using 15 of the 16 cores), where the 16$^{th}$ core is reserved for other tasks, such as input/output (I/O). Other configurations may be implemented. The number of machines/worker nodes (and therefore executors) in the cluster is scalable and configurable.

In this example, at stage 608 of the processing pipeline, each executor reads/loads video sessions from HDFS 606

(e.g., file system 218). HDFS 606 holds all of the summarized session data for the last minute. As described above, the summarized session data is stored in files (where each entry in a file corresponds to the summarized session data for a given session in the last minute), where the summarized session data for the last minute may be partitioned across multiple files in HDFS. As described above, each file stored in HDFS contains a list of sessions (and their corresponding summarized session data) for a specific minute, where the session in a file may have various attributes such as metadata and quality metrics.

In some embodiments the summarized session data for the sessions observed in the last minute are distributed randomly among the files in HDFS. For example, the summarized session data is distributed according to a client identifier that was randomly assigned to client devices (where the client identifier identifies a specific device). For example, summarized session data is distributed to the files of HDFS based on a hash of the client ID. In some embodiments, the number of files into which the summarized session data is distributed is fixed. If data for more sessions is received in a certain minute, then each file becomes larger and includes more entries. The number of files into which to distribute summarized heartbeat data may also be configurable.

In this example, at stage 608, each core/executor receives a partition of data. For example, each core fetches data from HDFS 606. This includes loading files into the cores. In some embodiments, in order for all cores to load data at the same time (e.g., to increase parallelism), files may be split (e.g., entries in a single file may be loaded onto different cores). Each partition is computed/processed by a task assigned to a core of a machine, which is decided by the Spark scheduler.

At this stage, the predefined QoE metrics are computed on a per session basis. That is, for each session, a given session's summarized heartbeat data is used to compute video start failure, exit before video start, buffering ratio, and video startup time for that individual session. The individual session metrics will be used to compute aggregate group level metrics.

In order to do so, a group identifier (group ID) is determined for each session. The groups by which sessions are grouped are based on a defined list of dimensions for the groups, such as [CDN, ISP, City]. The sessions are then assigned group IDs that are based on the group attributes which correspond to the list of dimensions defined for the group. For example, if a group is defined by the dimensions [CDN, ISP, City], then the attributes used to define a specific group and create a group ID would be, for example, [Akamai, AT&T, San Francisco].

Thus, each session is assigned or mapped to a group ID based on its dimensional attributes. For each session, the set of predefined QoE metrics is also computed.

At this stage, the sessions are randomly distributed, and thus a single partition may have sessions with many different group IDs. In order to compute group level metrics, it would be beneficial to have all sessions in the same group (e.g., with the same group ID) aggregated into the same partition.

In order to do so, the randomly distributed sessions are shuffled so that sessions of the same group are collocated or stored in the same partition. In some embodiments, the group ID is used as a key to determine which partition a session is stored in. Thus, after computing the individual session metrics, the sessions are then grouped together into the same partitions according to the group ID key. As one example, a hash partitioner is used in Spark to determine the partition for each session, where the hash partitioner computes the hash of the Group ID for the session, and the function "hashcode mod numPartitions" is used as the partition id of the session/element.

In some embodiments, prior to the shuffling, a local reduce may be performed to merge together (e.g., average) the metrics for sessions in the same group that happened to be in the same partition. The local reduce reduces the amount of data that will be transferred during shuffling.

Once the sessions are shuffled so that sessions within the same group are stored in the same partitions, the group level metrics are then computed at stage 610. This includes merging the metrics of those sessions that belong to the same group. For example, if there were ten sessions in a group being processed in a partition, those ten sessions are merged into a single entry (e.g., corresponding to the group ID that the ten sessions belong to), where the individual metrics of the ten sessions are, for example, averaged to determine an aggregate QoE metric that is assigned to the group ID. Thus, each group ID is associated with a set of aggregate/merged metrics for the corresponding group. In some embodiments, the QoE metrics are computed for all groups defined in the diagnosis graph.

With sessions in the same groups collocated in the same partitions and merged together to determine per-group aggregate QoE metrics, time series are also constructed per group, per-metric. For example, the group level metrics computed for the current minute are joined with the group level metrics of the previous 60 minutes to generate the time series.

After the time series is constructed using the aggregate metrics, anomaly detection and root cause diagnosis are performed. In one embodiment, the anomaly detection and root cause analysis are performed on a per-customer basis. When determining the aggregate metrics, the partitions included data from the same groups (that had previously been grouped by group ID). However, some groups stored in the same partition may be associated with different customers.

In this example, before performing the per-customer anomaly detection and root cause analysis, the aggregate group level metrics, which are distributed into partitions based on group ID, are reshuffled according to customer identifier (ID) (e.g., the identifier of a publisher utilizing the services of content distribution monitor 210). The customer identifiers are indicated by "c1" and "c2" in the example of FIG. 6A. This second shuffle is performed to place together, in the same partition, aggregate group-level metrics/time series that belong to the same customer. For example, all groups from the same video publisher are placed in the same executor.

Anomaly detection and root cause diagnosis are then performed on the reshuffled data, where, as shown in this example at stage 612, each executor processes data specific to a certain customer (e.g., executor 1 processes data for customer 1 ("c1"), while executor 2 processes data for customer 2 ("c2")). The processing performed by the executors at this stage includes performing anomaly detection as described above. The root cause analysis includes generating diagnosis graphs and traversing the graphs to identify root causes of detected issues, as described above. The results of the anomaly detection and root cause analysis are then persisted, for example, into a database (e.g., Phoenix).

In some embodiments, as described above, when constructing the diagnosis graph, the full graph including all possible combinations of dimensions is not constructed. Rather, some dimensions are excluded (or excluded from being combined with other dimensions), and only those groups needed to construct the graph and perform the diagnosis are used. This makes the root cause diagnosis/analysis more lightweight (by reducing the size of the graph that needs to be traversed). This allows for the more efficient construction of the multiple graphs that are created for each of the predefined QoE metrics at each minute for each group.

In one embodiment, the graph building, anomaly detection, and root cause diagnosis are wrapped into a map function. In this example, the entire pipeline is a job that is fired at each minute (or any other temporal granularity, as appropriate) to provide near real-time anomaly detection and root cause diagnosis.

Generating Groups in Spark

In one embodiment, groups are computed in Spark and stored in RDDs (resilient distributed dataset), a data structure of Spark. The element of the Group RDD is the tuple of (Group ID, Group), where Group ID is used as the key to determine which partition the element should be stored in. In one embodiment, as described above, Spark uses a hash partitioner to determine the partition for each element, where the partitioner computes the hash of the Group ID of the tuple and uses "hashcode mod numPartitions" as the partition identifier of the element.

An example data structure for Group ID is defined as the following pseudo code:

```
GroupId {
    GroupBy mGroupBy;
    Object[ ] mAttributes;
}
``` where "mGroupBy" defines the list of dimensions for the group, such as [CDN, ISP, City], and "mAttributes" is the list of group attributes which correspond to dimensions defined in "mGroupBy." For example, if "mGroupBy" is [CDN, ISP, City], "mAttributes" could be [Akamai, AT&T, San Francisco].

Figure 6B:
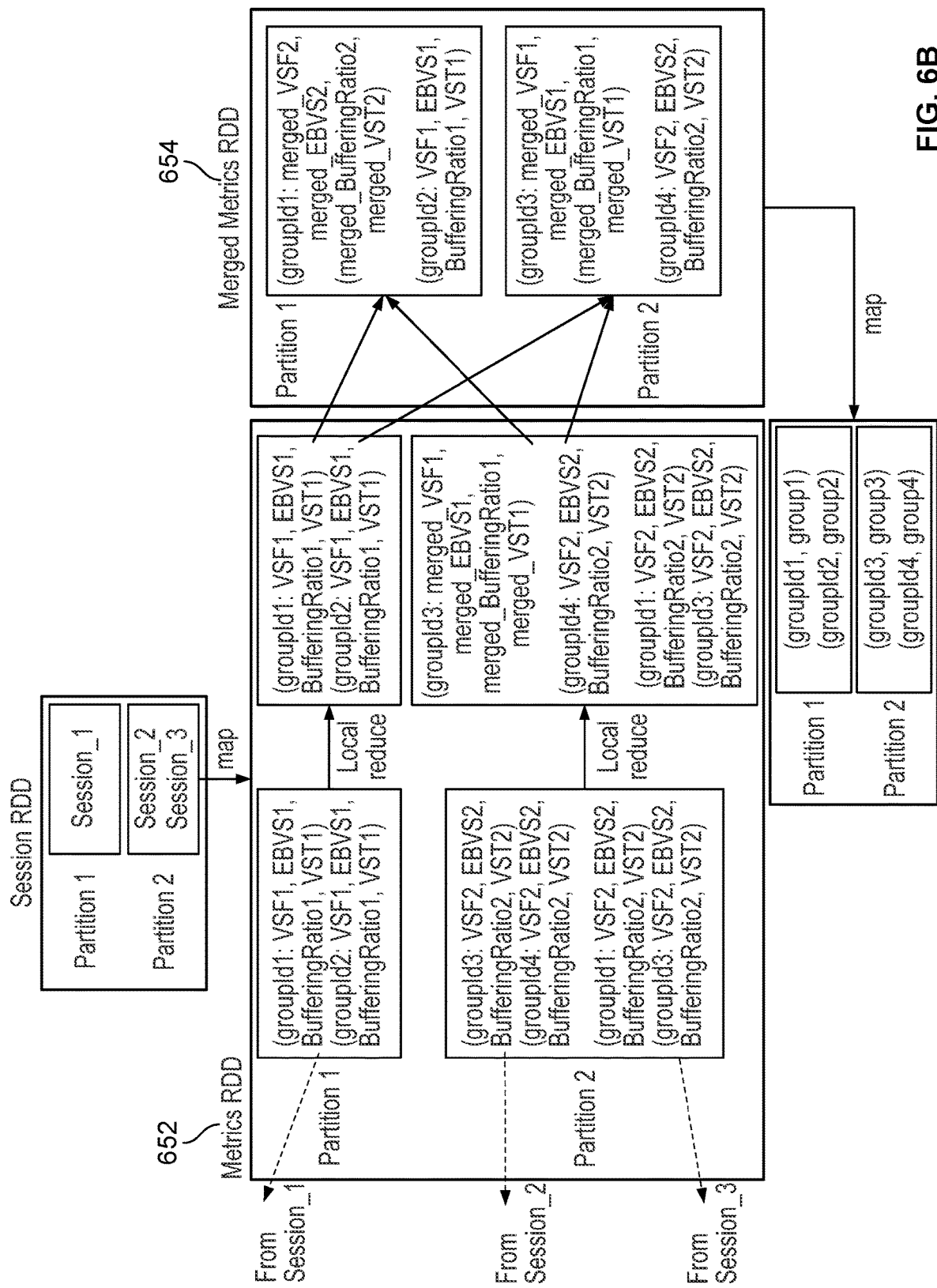
FIG. 6B illustrates an embodiment of determining group level metrics.

FIG. 6B illustrates an embodiment of determining group level metrics. In some embodiments, the processing described in FIG. 6B is used to implement stages 608-610 of FIG. 6A. In the example of FIG. 6B, an example of how Group RDD is generated is shown, as well as shuffling. In some embodiments, as described above, each partition is computed/processed by a task, which is assigned to a core of a machine, as decided by the Spark scheduler.

As illustrated in the example of FIG. 6B, each metric (e.g., video start failures (VSF), Exits Before Video Start (EBVS), Video Startup Time (VST), and Rebuffering Ratio (RBR)) per group is computed as follows. All metrics are computed per session per group (for that session) first (Metrics RDD 652). Then the metrics are shuffled based on the group ID and are merged for the same group, which generates the group-level metrics (Merged metrics RDD 654). The last step is to transform the merged metrics per group ID to groups.

Figure 6C:
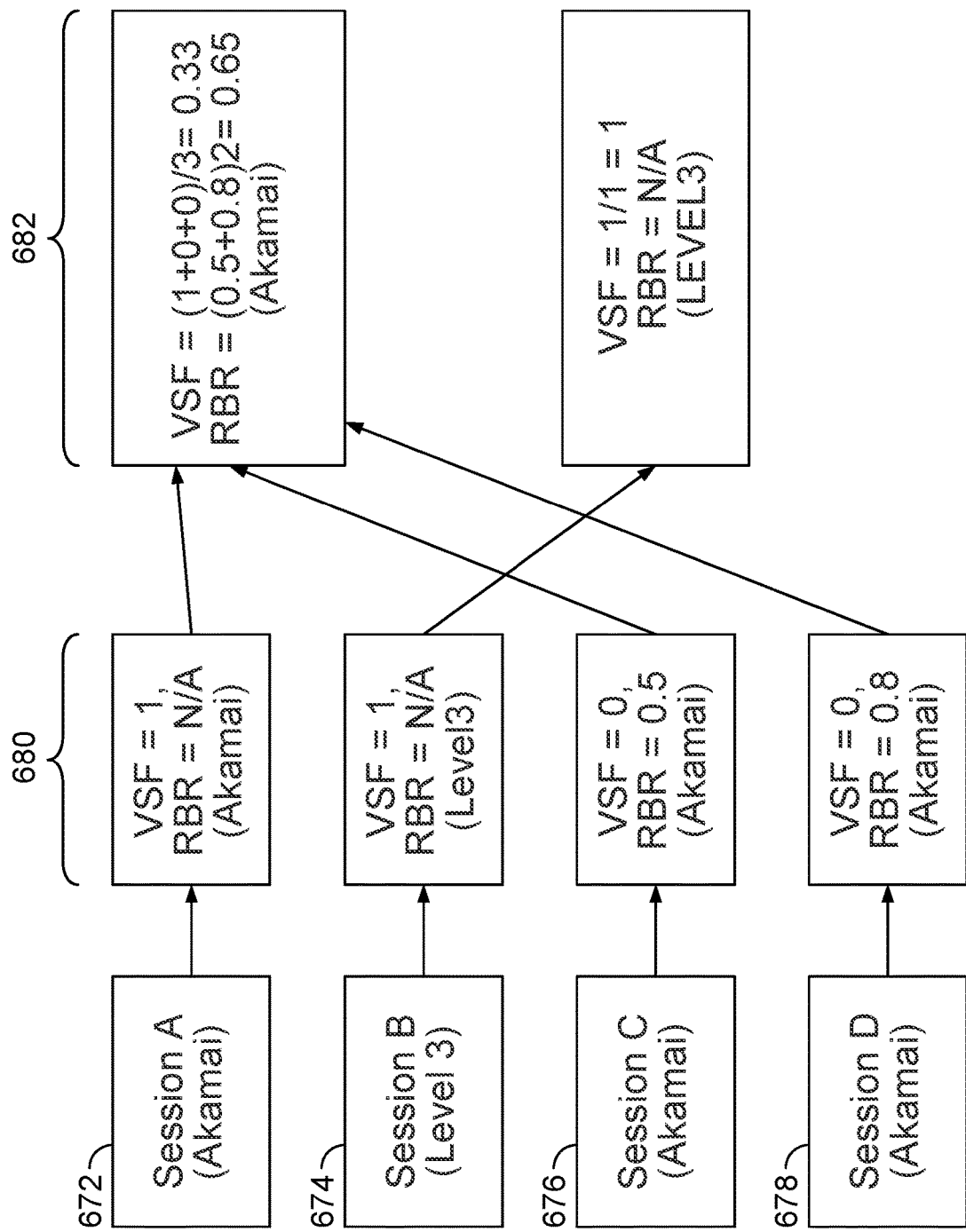
FIG. 6C illustrates an embodiment of determining aggregate QoE metrics on a dimension.

FIG. 6C illustrates an embodiment of determining aggregate QoE metrics on a dimension. In this example, VSF and rebuffering ratio (RBR) are computed on the CDN dimension. In this example, at stage 680, the individual VSF and RBR metrics for each of sessions 672-678 are computed. A mapping of the session to a CDN group (either <Akamai> or <Level3>) is also performed. At stage 682, the individual session metrics are shuffled and stored together according to which CDN they belong to. The individual session metrics for a given CDN are then merged together to compute aggregate VSF and RBR across the sessions that streamed from the given CDN.

Example Alerts Reporting and Investigation Interfaces

Various reports may be provided by reporting engine 228 in response to the detection of anomalies and the diagnosis of a root cause of anomalies. Examples of reports and investigation interfaces are described in further detail below.

Figure 7:
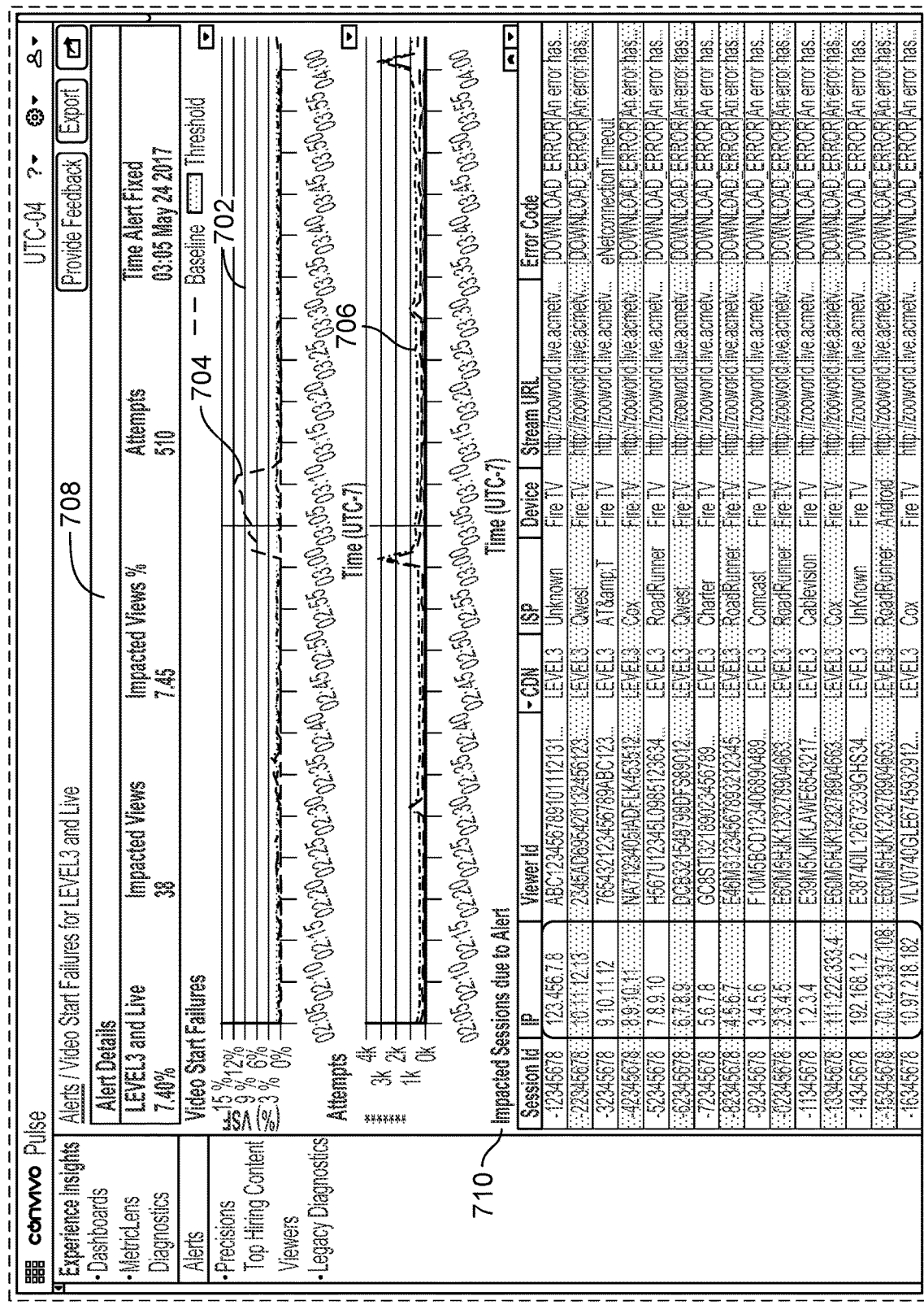
FIG. 7 illustrates an embodiment of an interface for reporting anomalies and root causes.

FIG. 7 illustrates an embodiment of an interface for reporting anomalies and root causes. In this example, a CDN issue was identified in the live traffic of the Level3 CDN for a video publisher. The plot 702 is the time series of the group identified as the root cause. There is a spike in the middle at 704, which indicates an anomaly was detected in video start failures.

As shown in this example, all traffic excluding the root cause group can also be shown. The second line (706) is the time series of other traffic, which as shown in this example, at the time of the anomaly 704, is smooth, without any spikes. This indicates that the root cause of the issue has been clearly identified, otherwise the second line (706) would also show spikes or anomalies at the time of the anomaly 704.

In this example report of FIG. 7, the amount of traffic (e.g., number of views or streaming sessions) for the root cause group is also shown at (708) to indicate the impact of the issue. A sample list of sessions impacted by the issue is also shown at 710, which allows the video publisher to identify the Internet Protocol (IP address), region, streamURL, as well as other attributes on which the user or publisher can take action.

FIG. 8 illustrates an embodiment of a reporting interface for a particular content publisher. In this example, alerts for metrics are shown at column 802. The value for each metric for each alert is shown at column 804. The root cause identified for each alert for the metric is shown at column 806. The cumulative impacted unique device for each detected issue is shown at 808. The time that alerts were fired is shown at 810.

Figure 9A:
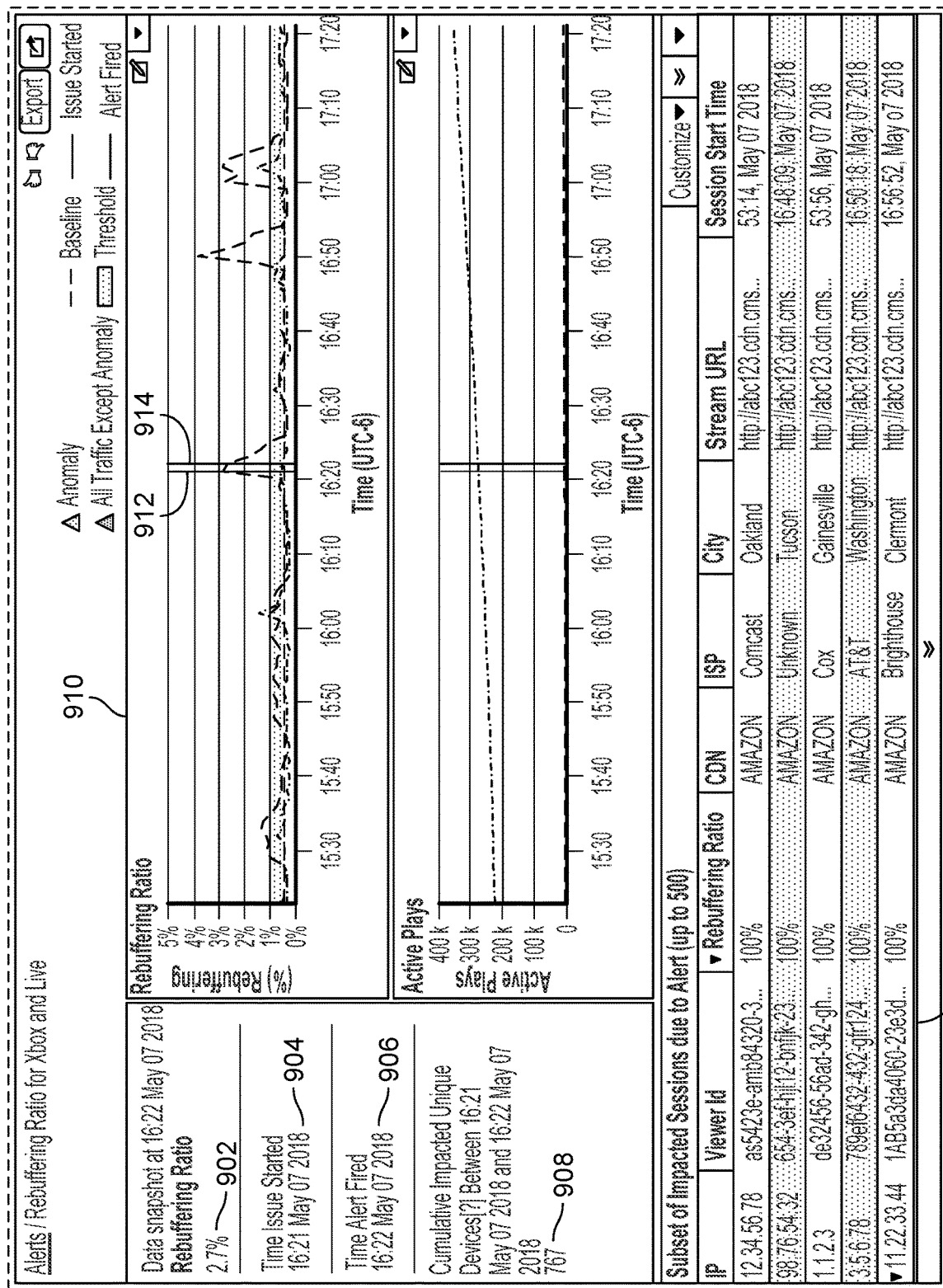
FIG. 9A illustrates an embodiment of a diagnosis interface.

FIG. 9A illustrates an embodiment of a diagnosis interface. Shown in this example is an alert for a rebuffering ratio for Xbox (type of device) and Live (type of content). The rebuffering ratio of the detected anomaly is shown at 902. The time at which the issue started is shown at 904. The time at which the alert was fired is shown at 906. The cumulative number of impacted devices between the time the issue started and when the alert was fired is shown at 908. Portion 910 of the reporting interface includes a plot of the time series of the rebuffering ratio for the identified root cause group <Xbox, Live>, as well as a plot of the time series of all traffic except the anomaly root cause group. Graphical representations of the time at which the issue started and when the alert was fired are also shown at 912 and 914, respectively. Portion 910 also includes a plot of the baseline and threshold. At 916, information about a subset of impacted sessions due to the alert/identified issue is presented.

Figure 9B:
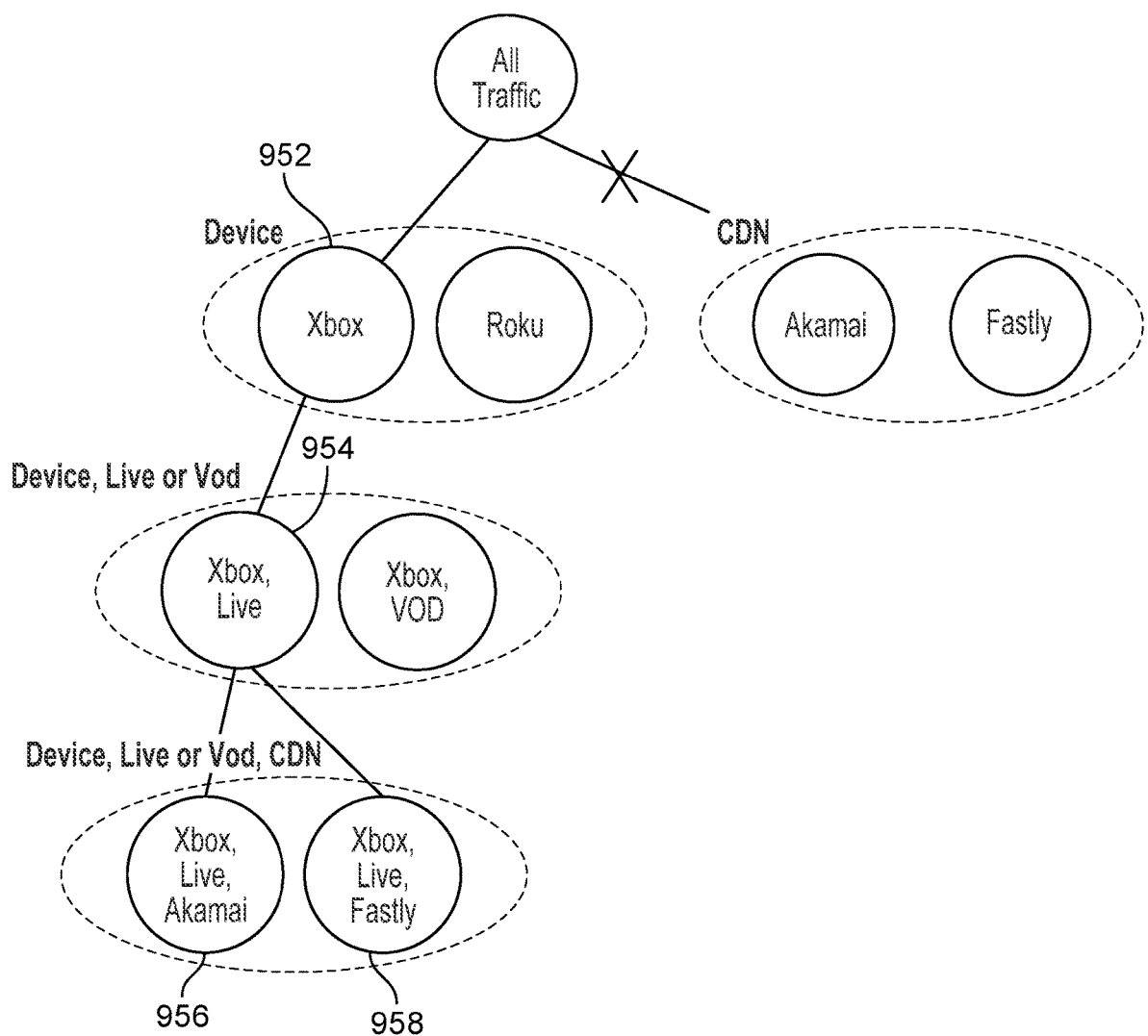
FIG. 9B illustrates an embodiment of a portion of a diagnosis graph.

FIG. 9B illustrates an embodiment of a diagnosis graph. The (partial) diagnosis graph of FIG. 9B was traversed, as described above, to determine the root cause group of <Xbox, Live> reported in the interface of FIG. 9A. In this example, anomalies were detected at nodes 952, 954, 956, and 958 in the diagnosis graph of FIG. 9B (note that the graph of FIG. 9B does not show the complete graph for diagnosis; it only shows the anomaly groups in corresponding dimensions). In this example, the root cause was determined (based on a traversal of the graph, as described above)

to be <Xbox, Live> (954) because all of its subgroups (956 and 958) were anomalous as well.

Figure 10A:
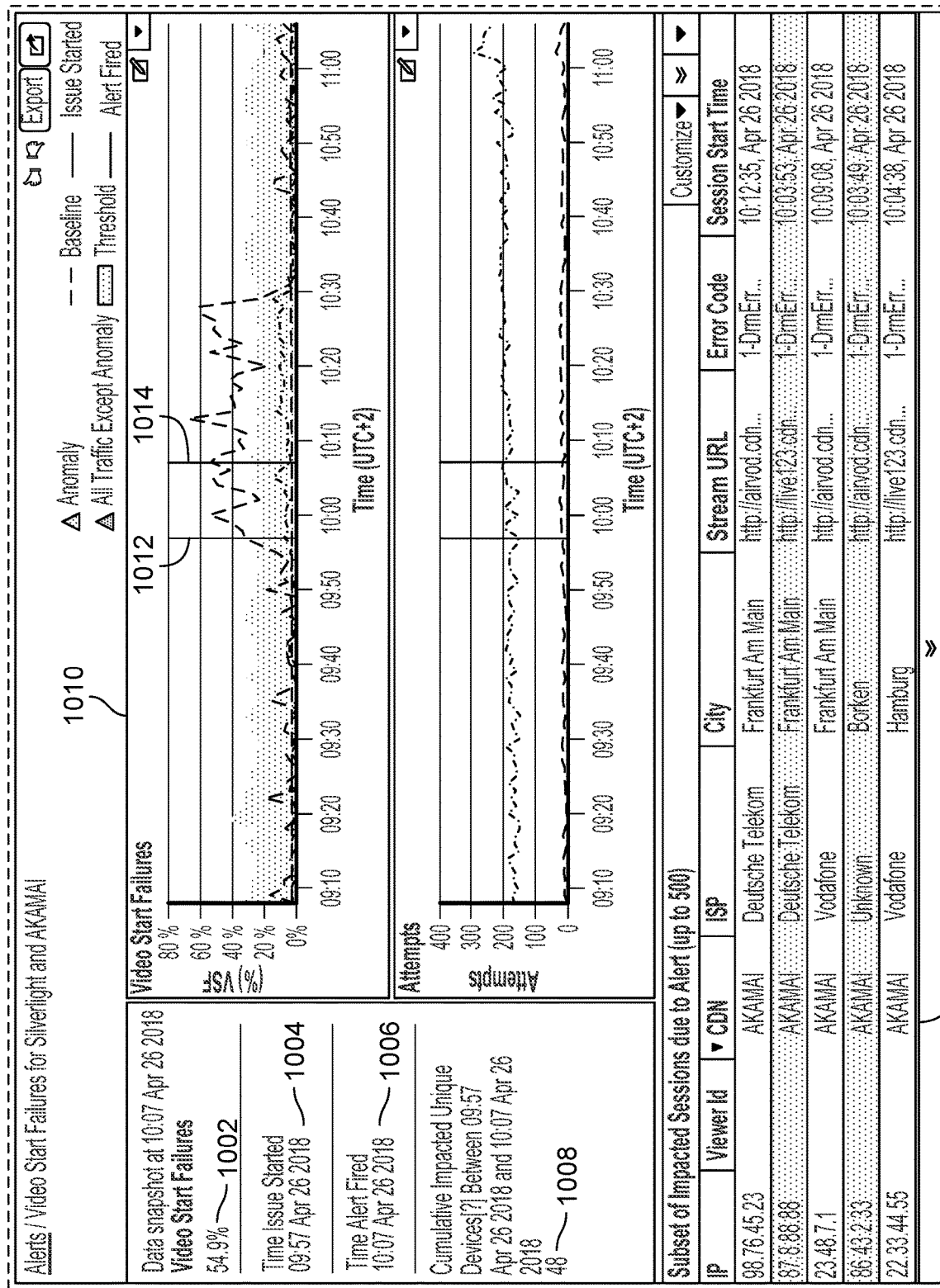
FIG. 10A illustrates an embodiment of a diagnosis interface.

FIG. 10A illustrates an embodiment of a diagnosis interface. Shown in this example is an alert for video start failures for Silverlight (type of device) and Akamai (type of CDN). The percentage of video start failures of the detected anomaly is shown at 1002. The time at which the issue started is shown at 1004. The time at which the alert was fired is shown at 1006. The cumulative number of impacted devices between the time the issue started and when the alert was fired is shown at 1008. Portion 1010 of the reporting interface includes a plot of the time series of the rebuffering ratio for the identified root cause group <Silverlight, Akamai>, as well as a plot of the time series of all traffic except the anomaly root cause group. Graphical representations of the time at which the issue started and when the alert was fired are also shown at 1012 and 1014, respectively. Portion 1010 also includes a plot of the baseline and threshold. At 1016, information about a subset of impacted sessions due to the alert/identified issue is presented.

Figure 10B:
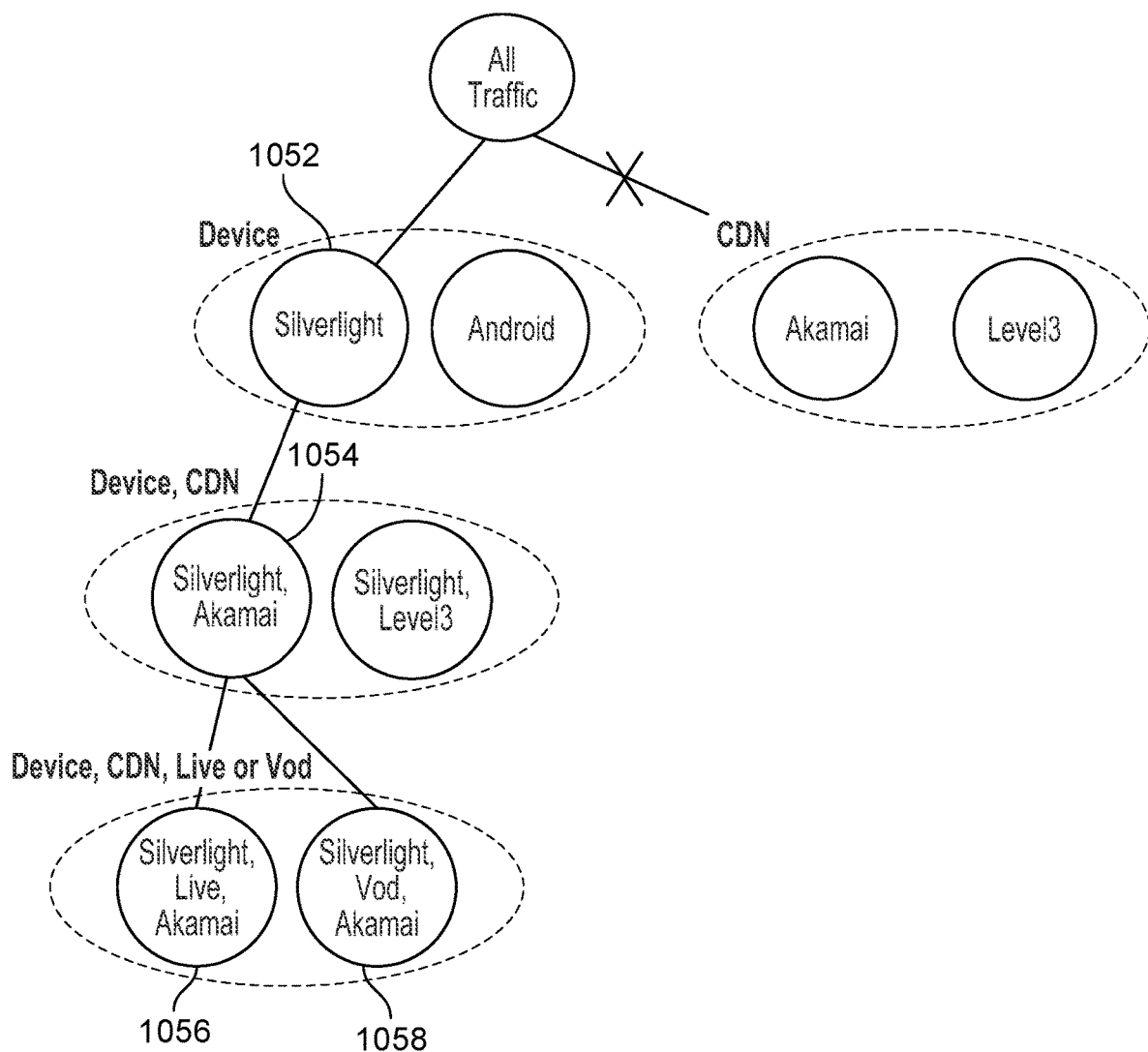
FIG. 10B illustrates an embodiment of a diagnosis graph.

FIG. 10B illustrates an embodiment of a diagnosis graph. The (partial) diagnosis graph of FIG. 10B was traversed, as described above, to determine the root cause group of <Silverlight, Akamai> reported in the interface of FIG. 10A. In this example anomalies were detected at nodes 1052, 1054, 1056, and 1058 in the diagnosis graph of FIG. 10B (note that the graph of FIG. 10B does not show the complete graph for diagnosis; it only shows the anomaly groups in corresponding dimensions). In this example, the root cause was determined (based on a traversal of the graph, as described above) to be <Silverlight, Akamai> (1054) because all of its subgroups (1056 and 1058) were anomalous as well.

Figure 11:
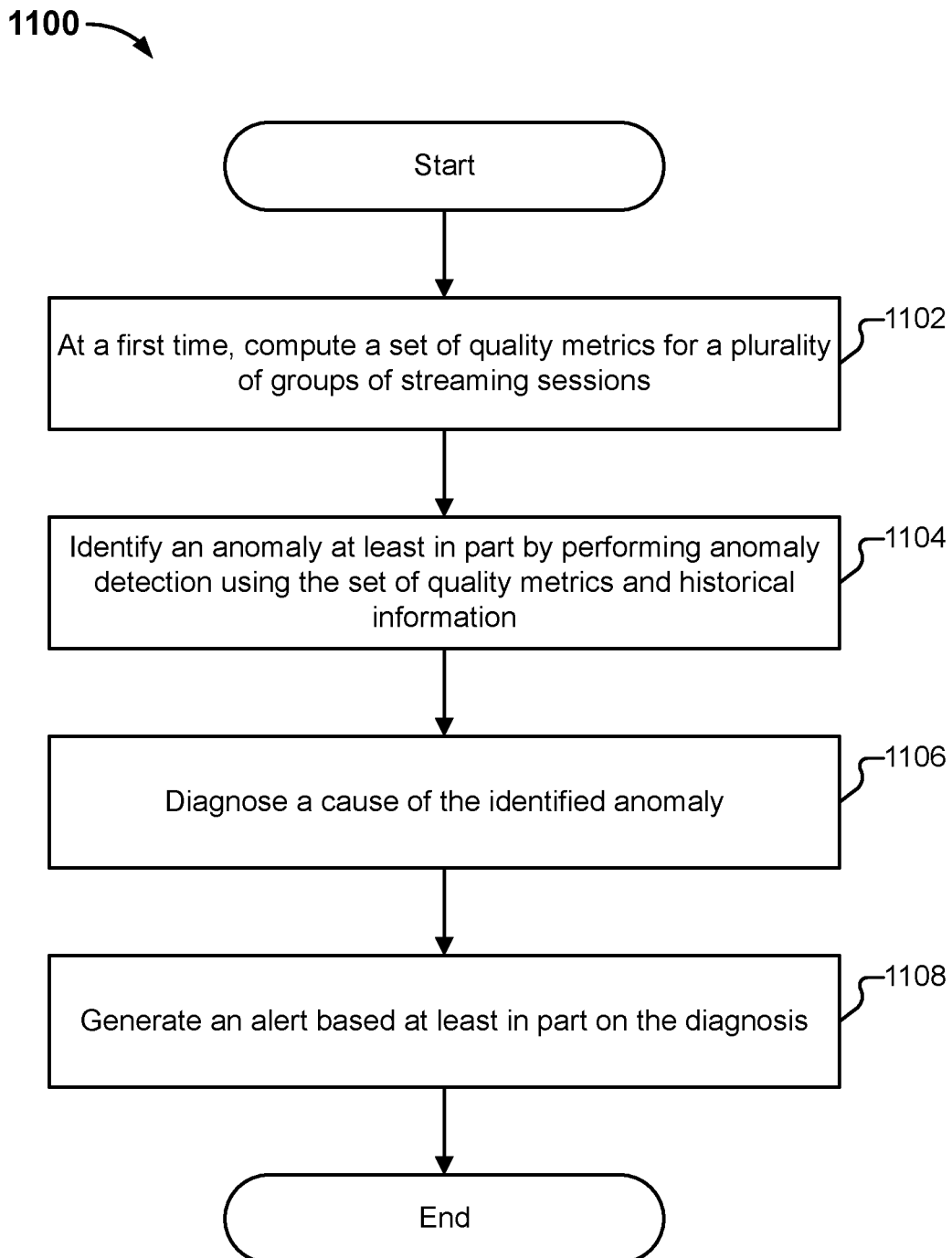
FIG. 11 is a flow diagram illustrating an embodiment of a process for anomaly detection and root cause diagnosis.

FIG. 11 is a flow diagram illustrating an embodiment of a process for anomaly detection and root cause diagnosis. In some embodiments, process 1100 is executed by automatic alerts engine 220 of FIG. 2A. The process begins at 1102 when, at a first time, a set of quality metrics are computed for a plurality of groups (of streaming sessions). For example, a set of Quality of Experience (QoE) metrics such as video start failure, exits before video start, video startup time, rebuffering ratio, etc. are computed continuously (e.g., at each minute or any other interval/granularity of time, as appropriate) for various groupings of streaming sessions. The example QoE metrics are used to aggregate the quality of experience from collected video session data (data collected in the last minute), which is sent by monitoring sensors integrated in client devices requesting and playing content. The metrics are computed for various groups of sessions, where the sessions are grouped at varying levels of granularity according to various combinations of dimensional attributes. For example, in various embodiments, sessions may be grouped according to their geo-locations (e.g., state, city, or Designated Market Area (DMA) in the United States), device type, as well as combinations of geo-location and device type. Other examples of dimensions that may be used for grouping sessions include: the name of a video asset that was played; the CDN from which the video data is streamed; whether the content is live or VoD (Video on Demand); and a user's or viewer's Internet Service Provider (ISP), or Autonomous System Number (ASN) within a given ISP.

At 1104, an anomaly is identified at least in part by performing anomaly detection using the computed set of quality metrics and historical information. In some embodiments, the QoE metric computed for the current minute is joined with historical aggregate values for the metric to construct a time series, where the time series per metric per group is evaluated to detect anomalies in the behavior of the time series. Anomalies may be identified in the time series of multiple groups. In one embodiment, a baseline and threshold are used to detect anomalies. For example, a baseline and deviation/tolerance threshold is computed for each QoE metric and group, for example, by aggregating QoE metrics from an extended period of time in which the metric appeared "normal" (e.g., as compared to some threshold value for a metric). As one example, the baseline is the mean of the aggregated QoE metrics within the time period and the threshold is computed as a multiple of the standard deviation plus the baseline value.

The deviation/tolerance threshold is then used to detect issues or anomalies for each QoE metric (time series) and group. For example, if the QoE metric of the corresponding group at the current interval, or aggregated within a short period of time, is above the tolerance threshold for a threshold amount of time, then the metric for the group is labeled as anomalous. In some embodiments, the impact (e.g., the number of sessions impacted by the anomaly) of the issue is also used as a criteria for determining if the metric for a group is anomalous. For example, in addition to the metric exceeding the tolerance threshold for the threshold amount of time, the metric for the group is labeled as anomalous if a threshold number of sessions are impacted by the issue.

In another embodiment of anomaly detection, a hidden Markov model (HMM) is used to detect whether a metric for a group is anomalous at the current time. In some embodiments, a separate HMM is used for each QoE metric and group. In this example, an HMM is a chain of states, one per interval (e.g., each minute), with an associated metric observation for each interval. The state for the interval is a label to be inferred by the HMM as either "anomalous" or "ordinary" (not anomalous). These states are hidden, and the HMM is used to infer these states using the observations of the metrics. The states are distinguished by the model for observations, which makes different predictions for metrics observed under the ordinary and anomalous states. If observations appear incompatible with the ordinary state for some stretch of time (e.g., the observations are extremely unlikely to happen under the ordinary state), the model finds a high probability that the group is in the anomalous state for that period, and thus the metric for the group is labeled as anomalous.

At 1106, a cause of the identified anomaly is diagnosed. In some embodiments, a graph (e.g., directed acyclic graph (DAG)) is constructed out of all of the groups based on the parent/child relationship between the groups. A group represents the collection of video sessions defined by the dimension for that group. For example, a group (CDN: Akamai, Device:AppleTV) may be constructed to represent all the video sessions that are playing video on an Apple TV device type and obtaining video from the Akamai CDN. In some embodiments, a group "A" is considered a parent of group "B" if "B" contains and matches all the dimensions of group "A" and has one or more dimensions than "A." For example, (CDN:Akamai, Device:AppleTV) is a parent of (CDN:Akamai, Device:AppleTV, ContentType:Live). Other examples of dimensions and groupings are described above. In some embodiments, the graph is constructed using a subset of the groups, where certain dimensions/combinations of dimensions are excluded to reduce the complexity of the diagnosis graph and its evaluation.

The root cause is diagnosed by performing a traversal of the constructed graph. For example, a Breadth First Search (BFS) traversal of the graph is started to look for root causes. One example criteria for a node to be a root cause is that the node itself is labeled as anomalous (e.g., using the issue detection algorithms described above), and more than a configurable (threshold) percentage (e.g., 80%) of children are labeled as anomalous as well. In some embodiments, if a node satisfies the criteria, the system labels the node as a root cause and moves forward to the next node on the BFS path. In some embodiments, if a node is anomalous but does not meet the criteria (e.g., the threshold percentage of children that are labeled as anomalous is not met), the system starts Depth First Search (DFS) traversal from that node through its children until a root cause is identified using the same criteria.

At 1108, an alert is generated based at least in part on the diagnosis. For example, the metric and group that are diagnosed as the root cause is provided. A list of impacted video sessions may also be provided. Other examples of alerts and reports are described above.

Thus, using the techniques described herein, content publishers (or any other entity in the OTT ecosystem/pipeline, as appropriate) may be automatically alerted, in real-time and near real-time, to any issues in viewing quality, as well as be provided the root causes of the detected issues. This provides automatic alerting on problems affecting viewing experience, which has become increasingly important to content publishers due to the rapid growth of video streaming over the Internet (e.g., over-the-top content (OTT)). Existing solutions typically leave the diagnosis of an issue's root cause to content publishers. This is a difficult and time consuming task, since the issue can be at any component in the streaming pipeline (for which there is no single end-to-end owner), and can cause significant delay in finding the root cause and resolving the issue.

Anomaly Detection and Diagnosis Through Fault Isolation Modeling and Quality Impacts In the examples above, anomaly detection and root cause diagnosis were performed based on the aggregate (e.g., average) QoE metrics of groups. In an alternative embodiment, preprocessing is performed on metrics (e.g., prior to anomaly detection and diagnosis), such that the detection and diagnosis are run on a model-estimated quality impact of each group. As will be described in further detail below, in some embodiments, this allows a determination of whether a problem with a first group explains all of the increase in the average metric for another group.

The model-estimated quality impact of each group may be determined using machine learning models. In one embodiment, linear regression (e.g., using one-hot encoded categorical features) is used to model the relationship between a session's quality and the impact on the session's quality by different groups. For example, each group is assigned a quality contribution, where each session's quality is a sum of its groups' quality contributions (to the session's overall or total quality), in addition to an unexplained variation. Thus, the quality metric for each session is modeled as a linear combination of a set of features, where the features are the group-bys (dimensions or combinations of dimensions by which sessions may be grouped, as described above).

For example, if a session in San Francisco (City dimension) uses Akamai (CDN dimension), and (<City>, <City, CDN>, <CDN>) are used as group-bys and the features for the model, then its rebuffering ratio (RBR) (QoE metric) at time t may be modeled as:

$$\text{buffering}_i^{(t)} = \vartheta_{[SF]}^{(t)} \vartheta_{[AK,SF]}^{(t)} + \vartheta_{[AK]}^{(t)} + \_i$$

where the thetas are interpreted in this example as the quality contributions for each group.

In this example, by performing linear regression, the contribution of each individual group-by to the observed buffering ratio for the session may be estimated or otherwise determined. For example, if the session has a 2% buffering ratio for the current minute, the linear regression modeling may be used to determine what percentage of the total session buffering ratio was contributed by or due to streaming from a certain CDN, and what percentage of the total session buffering ratio is contributed to by a specific city. Thus, the total session quality metric may be broken down into contributions from individual group-bys.

In one embodiment, attributing blame (contribution to a session's overall quality) to groups begins with each group's average quality metric, where the averages are modified to reduce double-blaming. For example, suppose that the average rebuffering ratio for Akamai is 10%, but this is because all of the Akamai in SF sessions have 20% rebuffering ratio (and all other sessions have 2%). If each group's average is taken as its blame, then a prediction would be made that an <Akamai, New York> session would have 12% buffering and an <Akamai, San Francisco> session would have 30%. If Akamai's blame were instead reduced to 2%, <Akamai, San Francisco>'s blame to 18%, and <Akamai, New York>'s blame to 0%, then there would be a perfect prediction.

If such blame numbers are used, then it can be correctly determined that <Akamai, New York> has no contribution to quality. If the problem in <Akamai, San Francisco> started in the current minute, then previously all of the <Akamai, City X> groups had 0 blame (zero contribution or impact on session quality), then nothing has changed for <Akamai> or <Akamai, New York>, but <Akamai, San Francisco> has gone from 0 blame to 18% BR (buffering ratio) blame.

Linear regression is used to perform such optimal blame allocation, since linear regression attributes blame to each group, minimizing the (squared) unexplained variation. In one embodiment, the linear regression is used to determine the coefficients or weights for each group-by in the summation.

The modeling of session quality as a function of quality impacts/contributions of individual groups may be used to address diagnosis issues where multiple groups appear to have problems, but if the real root cause group's traffic was removed from all others, this removal would also remove the issues that manifest in the other groups. Linear regression may also be used to resolve issues where the diagnosis is uncertain, as the linear regression will estimate the uncertainty in each group's blame.

Linear regression may be further used to resolve start- and end-of-issue diagnosis jitter. As metrics decline for a true anomaly group, its subgroups will also see declines, but at different rates. This may cause some subgroups to be blamed for an anomaly, by random change. Jointly estimating blame and its uncertainty addresses this issue. Linear regression may also be used to reconcile multiple plausible explanations for an anomaly in different parts of a diagnosis tree.

In some embodiments, feature engineering is performed to ensure that the appropriate features (dimensions) and combinations of features are used to capture an issue. For example, if a region has a problem, it will assign blame to each impacted city, as well as potentially other partially overlapping features (or the whole customer).

Anomaly Detection Based on Quality Contribution

In some embodiments, a model is used to attribute blame to different factors. However, if one group has statistically worse performance than another, this is not cause for an alert. Instead, in one embodiment, an alert should occur when a group's contribution to quality changes.

For example, similarly to group-wise average aggregate quality metrics, quality contributions will fluctuate randomly over time. In one embodiment, when performing anomaly detection, changes in quality contributions are determined, such as those changes that are not due to random noise (that is, detecting true changes in quality contributions in a noisy time series).

In some embodiments, the above described techniques for anomaly detection, such as baseline/threshold and HMIS/I are adapted to detect anomalies based on quality contributions instead of averages of the QoE metrics.

For example, a quality contribution baseline and deviation threshold may be determined, where if the quality contribution for a group exceeds the deviation threshold above the baseline quality contribution, then the group is determined as anomalous. Similarly, the HMM-based technique described above may be adapted to make predictions based on quality contributions instead of (and/or in addition to) aggregate metric values. An outlier area model may also be used.

In some embodiments, a further criterion for determining whether a group is anomalous is whether the quality contribution also exceeds a threshold value. For example, if the contribution to buffering ratio (measure of quality) for the current minute exceeds the deviation threshold above the baseline buffering ratio quality contribution, but the contribution to buffering ratio for the current minute is less than a threshold value (e.g., is close to 0 contribution), then the group is not marked as anomalous (that is, even though there may be a spike in the quality contribution of a group, the spike has little impact on the observed session quality). In another embodiment, anomaly detection is not performed on groups whose contribution to the QoE metric are negligible or below some threshold. In this way, groups that have little impact or contribution to quality can be eliminated from processing. This reduces the computing resources used to perform anomaly detection.

Such groups that have little to no contribution to quality may also be excluded from being included in a diagnosis graph, as they are unlikely to be a root cause due to their minimal impact on/contribution to quality. Thus, groups/dimensions that have little to no contribution on quality may be eliminated from consideration in diagnosis as well.

Variability of Quality Contribution Estimates

In some embodiments, the variability of the estimated quality contribution of each group is estimated in each minute. The variability of estimates may be based on the session data that is observed. For example, different people may decide to watch videos, network timings may be slightly different, etc. While these conditions may be deterministic, they may have a minimal relationship to the underlying quality contribution of different factors. Thus, the data may be considered as being partly influenced by "random" events. Since, in this example, the estimates of quality contributions are functions of the session data, these quality contribution estimates may also be considered to be "random." Thus, a quantitative determination of how the quality contribution estimates vary by random chance is also performed, which in some embodiments is a separate estimation task.

In the above example techniques, group means were used, which are approximately normally distributed regardless of the underlying randomness in the session data. The standard deviation of that normal distribution for the metric may be estimated as the group standard deviation divided by the square root of the group size.

With respect to quality impacts, several approaches may be used to estimate the distribution of the estimate (of quality contributions of groups, estimated, for example, using the linear regression machine learning model, as described above).

Closed-form estimates: For certain forms of linear regressions, the contributions may be approximately normally distributed, and a matrix formula such as the "sandwich estimator" may be used to determine the standard deviation of each contribution. This example formula requires that the inverse of a d-by-d matrix be computed, where "d" is the number of groups. Inverting large matrices may be challenging, but may be done quickly, for example, in Java with d<1,000 or in native code with d<10,000. In some embodiments, the number of groups that are supported per customer is limited (e.g., between 1,000-10,000). This approach may be applicable to certain types of modeling.

Bootstrap estimates: In some embodiments, bootstrapping includes randomly resampling data (e.g., for each original session, replace it with a randomly-chosen session) and computing an estimate. This is repeated (e.g., 100-10,000 times), providing many copies of the estimate. These numbers are representative of the estimate's true variability. The bootstrap approach is applicable to any type of modeling. Certain implementations may be used that are less expensive (e.g., only tens of times more expensive than running a single linear regression).

Estimates from historical variability: In this approach, after several estimates are available (e.g., after several dozen estimates are available, e.g., 30-60 minutes), the variability of recent estimates is used as an estimate of the variability of the current estimate. Similar to bootstrapping, this approach is applicable to any modeling, and has a low cost. This approach may increase the warmup time for each group.

Figure 12A:
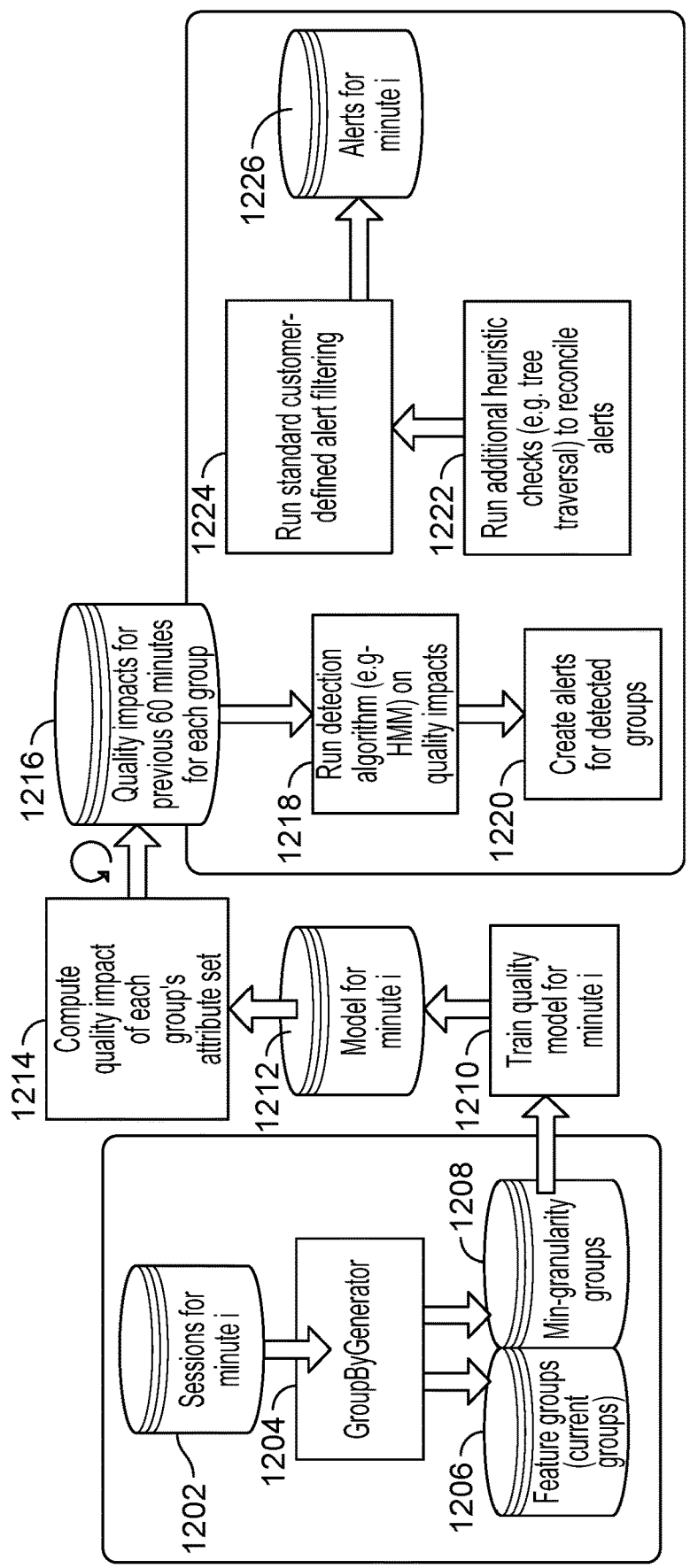
FIG. 12A illustrates an embodiment of a workflow for detection and diagnosis using model-estimated quality impacts of groups.

FIG. 12A illustrates an embodiment of a workflow for detection and diagnosis. In some embodiments, the process shown in FIG. 12A is executed by an embodiment of automatic alerts engine 220 that is adapted to perform detection and diagnosis on model-estimated quality impacts of groups.

As shown in this example, sessions per minute i (1202) (or any other time interval, as appropriate) are grouped by group by generator 1204. In this example, group by generator 1204 generates feature groups 1206 and min-granularity groups 1208. At 1210, at least some of the groups are used to train a quality model for minute i. For example, the sessions for a current minute may be used to train a linear regression model to obtain coefficients for each group for the buffering equation above. The coefficients may be directly mapped to the contribution of each group.

In this example, the trained model for minute i (1212) is then used, at 1214, to compute the quality impact of each group's attribute set. Quality impacts for a previous interval (e.g., 60 minutes) for each group are determined at 1216. For example, a time series of quality impacts for each group for a previous period of time is generated. At 1218, anomaly detection is then run on the quality impact time series. For example, the baseline/threshold and HMM anomaly detection techniques are adapted, as described above, to detect anomalies based on the model-estimated quality impact of each group. At 1220, alerts are created for detected (anomalous) groups. Root cause diagnosis, as described above, is also run at 1222. This may include constructing and evaluating a diagnosis graph, the evaluation of which reconciles alerts detected in many groups into a single root cause group. Customer-defined alert filtering may also be performed at 1224, where the alerts for minute i are stored (1226).

Figure 12B:
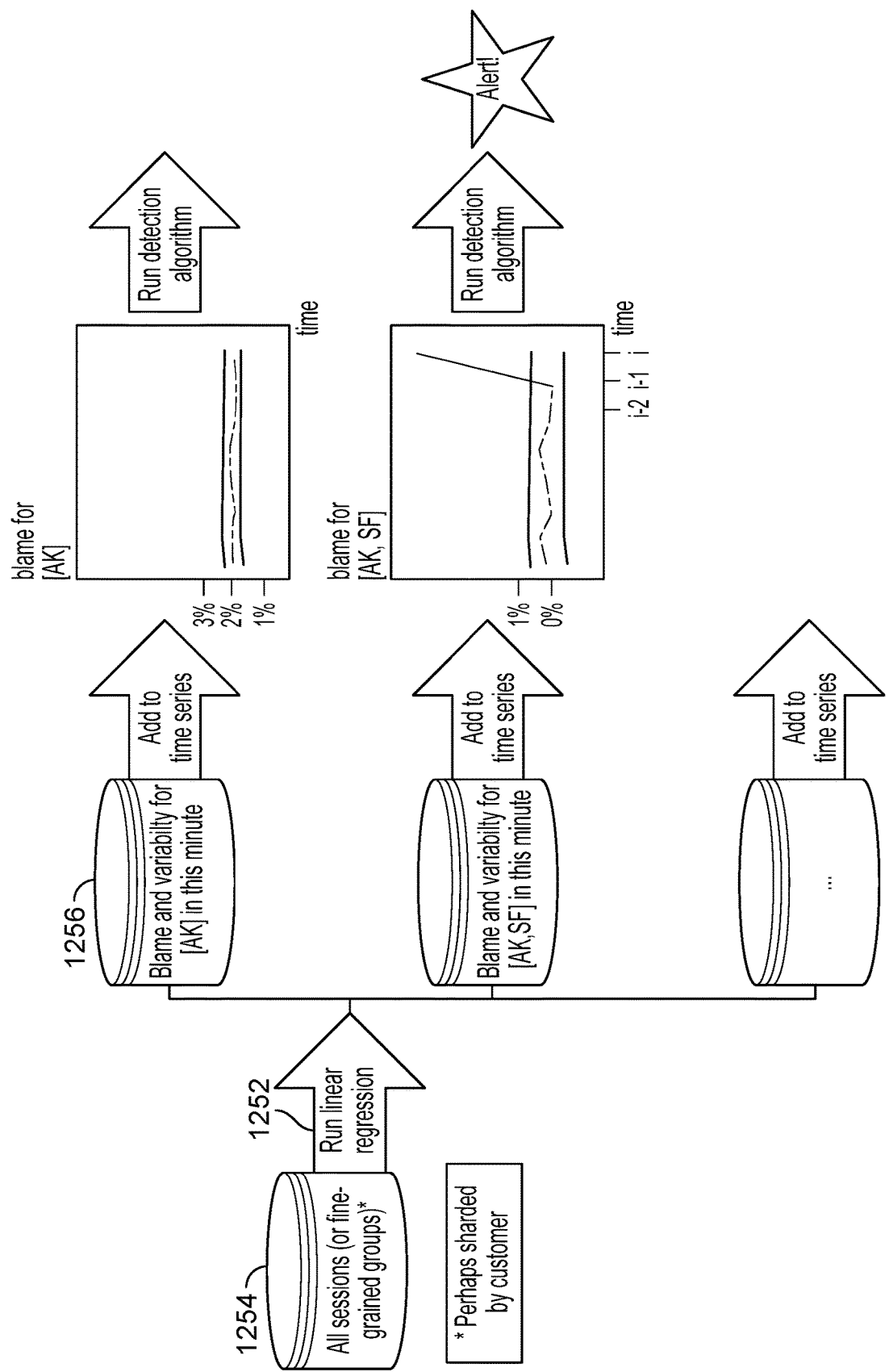
FIG. 12B illustrates an embodiment of computing the impact on quality of groups.

FIG. 12B illustrates an embodiment of computing the impact on quality of groups. As shown in this example, at 1252, linear regression is run on sessions 1254. Blame and variability for each group for the current minute is determined. For a given group, the blame/variability estimated for the group is added to a corresponding time series, as shown at 1256. For example, a time series of blame/quality contributions for a given group is constructed/updated. Anomaly detection, as described above, is then performed on each per-group time series. In some embodiments, the steps of 1252 and 1256 of FIG. 12B are an example of process steps 1210-1216 of FIG. 12A.

Figure 13:
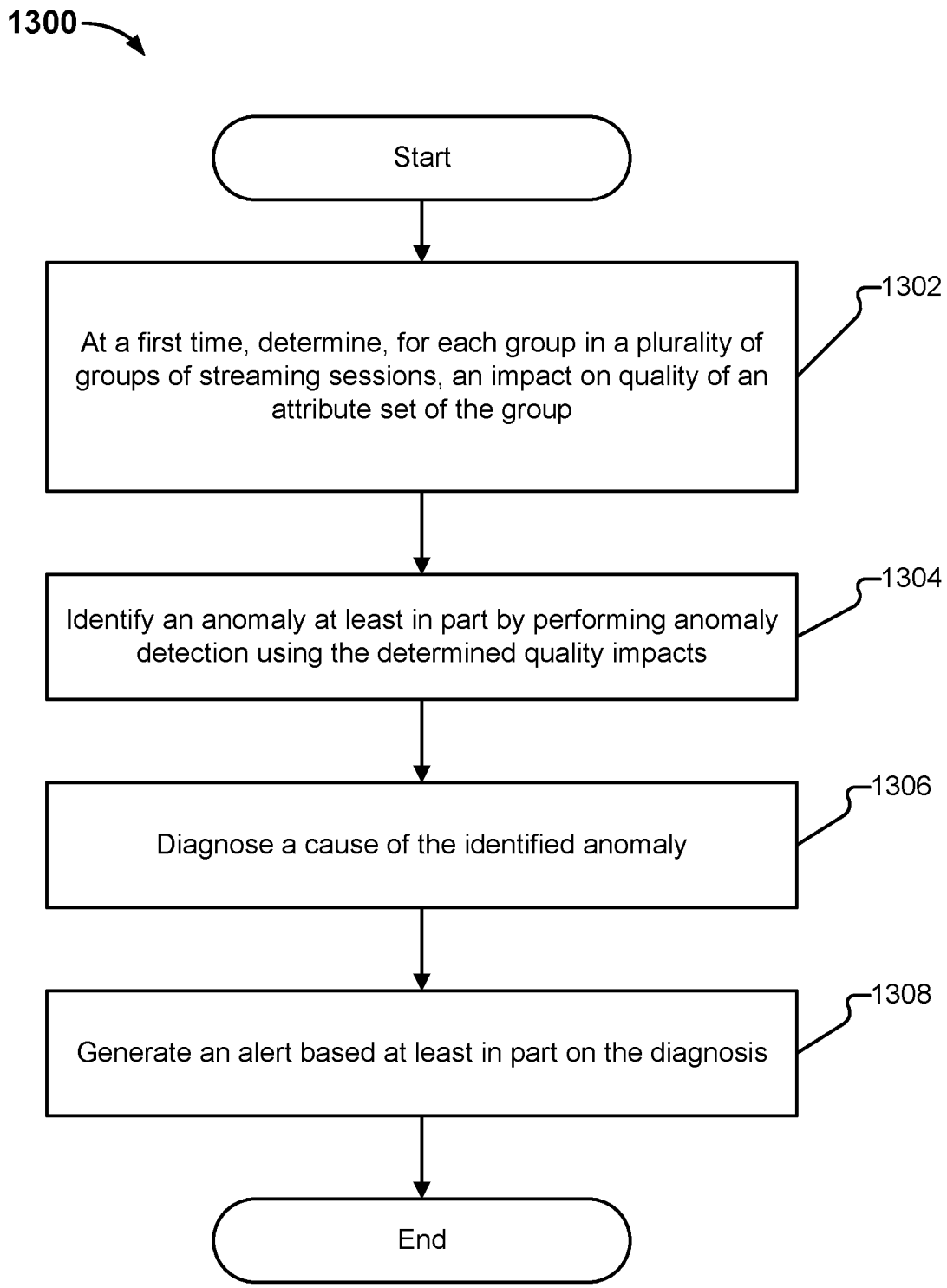
FIG. 13 illustrates an embodiment of a process for performing anomaly detection and root cause analysis for audiovisual content based on model-estimated quality impacts of groups.

FIG. 13 illustrates an embodiment of a process for performing anomaly detection and root cause analysis for audiovisual content based on model-estimated quality impacts of groups. In some embodiments, process 1300 is executed by an embodiment of automatic alerts engine 220 that is adapted to perform detection and diagnosis on model-estimated quality impacts of groups, such as that described in conjunction with FIG. 12A. The process begins at 1302 where it is determined, for each group in a plurality of groups of streaming sessions, an impact of quality of each group's attribute set. At 1304, an anomaly is detected at least in part by performing anomaly detection using the determined quality impacts. At 1306, a cause of the identified anomaly is diagnosed. At 1308, an alert is generated based at least in part on the diagnosis.

Automatic Alerts for Advertisements

In the above, anomaly detection and root cause diagnosis were performed to assist content publishers in determining the causes of anomalies in the quality of viewers' experiences when streaming content provided by the content publishers.

When a user streams requested content, a content player may play both the content requested by the viewer, as well as content that was not requested by the viewer, but was inserted into the viewing stream. This may include content encoded or otherwise provided by different entities. For example, while a viewer may observe a single stream of content being played, the observed single stream may include chunks encoded by two different entities, where, during the streaming, the client swaps between playing chunks encoded by the two different entities, but where one entity does not have control over the chunks encoded by the other entity. One example of such a scenario is the playing of advertisements in conjunction with streaming of content requested by the viewer. In this scenario, what appears to the viewer to be a single video session includes not only the content requested by the viewer from the content publisher, but also advertisement content that is encoded by a different entity than the content publisher, where such advertisements are typically not under the control of the content publisher. For example, the content publisher may sell advertising slots that are purchased by brands. Although an advertisement and content are both played on the client device and presented together to the viewer (as if part of a single session), they may come from different sources (although the viewer may not be aware of this) and be encoded differently (e.g., with different bitrates, resolution, volume, etc.).

Although the advertisements and content are controlled by different entities, the performance of the advertisements can impact the viewer's experience of watching the content. For example, even if the content provided by the content publisher performs well, if an advertisement fails or performs poorly, the viewer may feel disappointed with the viewing experience and attribute the poor ad performance to the content publisher, even though the content publisher is not in control of the advertisement.

Thus, although the content publisher is not in control of advertisements, they may be concerned with their performance and wish to be alerted to any issues that arise in the playing of advertisements, as well as gain insight into what is causing the detected issues. Described below are further details in which the automatic alerts techniques described above are adapted to perform anomaly detection and root cause analysis for advertisements.

While example embodiments involving anomaly detection and root cause diagnosis of advertisements played in conjunction with streaming content are described herein for illustrative purposes, the techniques described herein may be variously adapted to accommodate anomaly detection and root cause analysis for monitoring any pieces of content that are streamed together (e.g., one type of content is inserted into the other) but are encoded by, or otherwise under the control of, different entities. The techniques may also be variously adapted to accommodate anomaly detection and root cause analysis for monitoring pieces of content that are not requested by a viewer, but are nevertheless presented to the viewer along with the content the viewer did request to stream. This includes slate content (which may be played by default during an ad break when an advertisement is unable to be played), details of which will be described in further detail below. Further, while example embodiments in a video streaming (e.g., live and on-demand streaming) ecosystem are described below, the techniques described herein can variously be adapted to accommodate any type of multimedia/audiovisual content distribution, as applicable.

Ad Insertion Overview

Ads may be inserted into the streaming of user-requested content in a variety of ways, two of which are referred to as "client-side" and "server-side" ad insertion. An overview of these two types of ad insertion are provided below.

Client-Side Ad Insertion

Figure 14A:
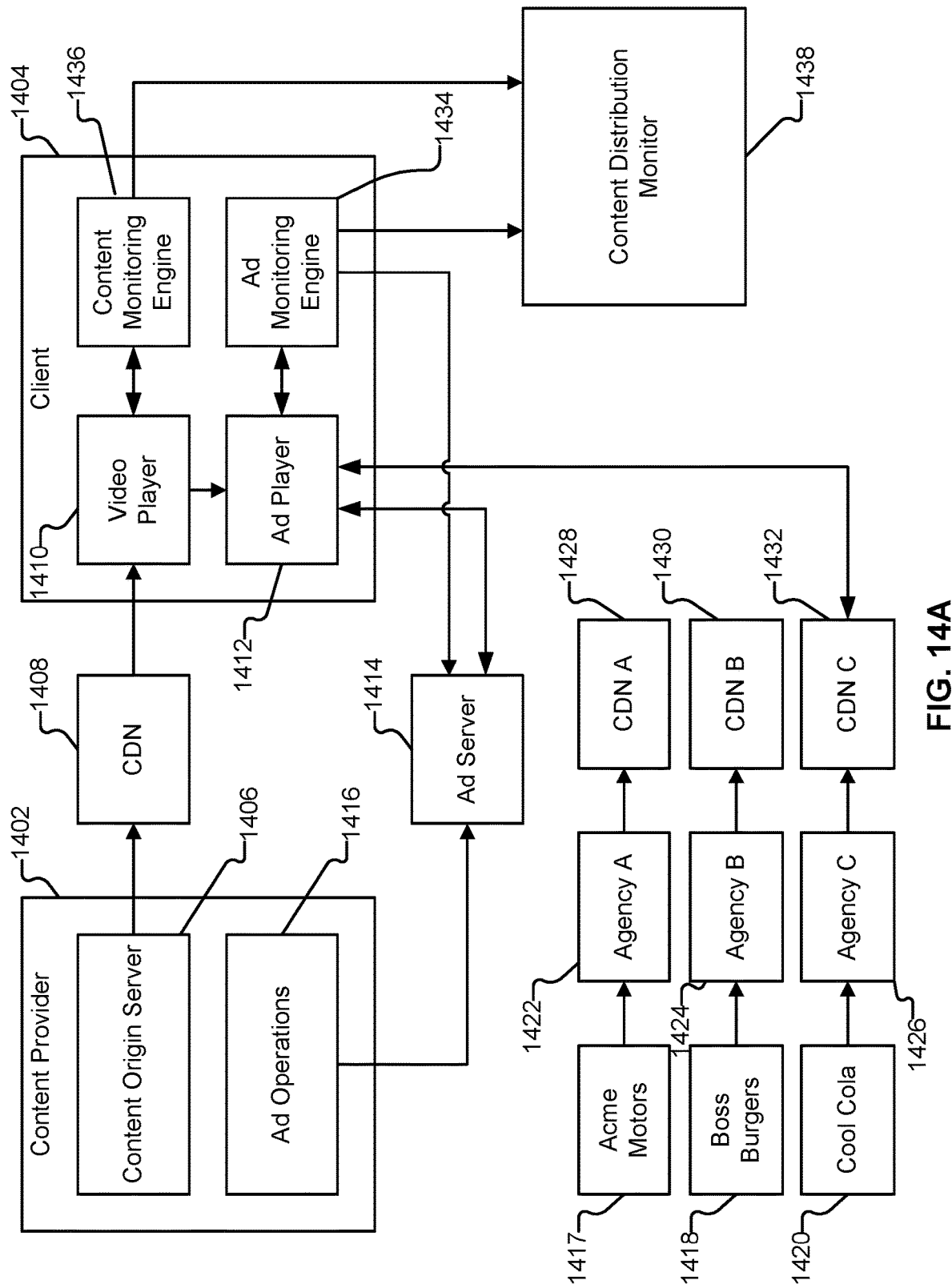
FIG. 14A illustrates an embodiment of client-side ad insertion.

FIG. 14A illustrates an embodiment of client-side ad insertion. In client-side ad insertion, ads are delivered to a client video content player, which is configured to insert the ads (e.g., obtained from an entity external to the content player) into a video session that is used to stream content.

In the example shown, client 1404 (such as clients 202-206 as shown in FIG. 2A) is used to access content, such as audiovisual content (e.g., movies, songs, television shows, sporting events, games, images, etc.) that is owned by content owners. The content is stored (or captured) at origin servers such as origin server 1406, then distributed via other servers, caches, content distribution networks (CDNs), proxies, etc. (collectively, "content sources"). Content sources employ a variety of technologies and include HTTP, Adobe Flash Media, and Microsoft Internet Information Service servers.

As described above in conjunction with FIG. 2A, examples of clients include personal computers, laptops, cellular phones/personal digital assistants, and other types of information appliances such as set-top boxes, game consoles, broadband routers, file servers, video servers, and digital video recorders, as applicable.

In the example shown, a television network ("XYZ") (content provider 1402) has contracted with content distributor 1408 to provide viewers with access to live streams of its broadcasts as well as streams of television show episodes and sporting events. In some cases, the content distributor is owned/operated by the content owner.

Content may be delivered/provided to clients based on various protocols. As one example, online video is delivered to clients via chunk-based protocols, in which a video player on a client fetches a manifest file (e.g., metadata configuration file) that lists a sequence of location information (e.g., HTTP URLs) that points to chunks/segments of video content (e.g., 2-10 second ".ts" transport segment chunks stored on the CDNs) that together constitute a full video. The video player may then fetch the chunks/segments/components one by one according to the manifest file, which indicates how the chunks may be retrieved from the CDNs so that they can be stitched together by the client media player to render a video asset as a smooth stream.

In this example, suppose that a user of client 1404 would like to watch, using a player application, a television (TV) show owned by content provider 1402. For example, the user begins a video streaming session (e.g., by hitting "play" on a selected video). As used herein, a session refers to an entity representing an instance of playback of a content asset (whether the asset is one requested by the user or another type of asset such as an advertisement). The session may begin with a request for the particular content or when it is determined that the advertisement is being played/to be played, and end when the playing of the content is ceased (e.g., the user stops watching a requested video, or an advertisement finishes playing).

In the example shown, when the user hits play and starts a session, the client is directed to a portal owned by the content provider (e.g., by using a web browser application, mobile app, etc.), causing client 1404 to connect to a content management system (CMS), which may be operated by the content provider and used by the content provider to manage its media assets.

Continuing with the example of a chunk-based protocol, the requested TV show may be stored as a set of video chunks/segments that together constitute the full video asset. The generated chunks may be published to various CDNs such as CDN 1408, with corresponding manifest files generated that indicate the location (e.g., URLs) of the chunks for a content item.

In this example, client 1404 is directed by the CMS to CDN 1408 to obtain a manifest file (e.g., HLS manifest file) for the requested TV show. The content player 1410 on client 1404 then uses the obtained manifest file to begin streaming content from CDN 1408 (e.g., requesting, fetching, and playing chunks of the TV show that was requested).

In the example environment of FIG. 14A, in which client-side ad insertion is performed, advertisements are served and played as follows. In this example, client 1404 includes ad player 1412. In some embodiments, ad player 1412 and video player 1410 are components or modules of the same player application (but may be parts of separate applications in other embodiments). The player application may be a dedicated application or an application provided by a web browser application. In this example, video player 1410 and ad player 1412 are two different players, where the players are switched between whether content is to be shown, or an ad is to be displayed.

In this example, ad player 1412 communicates with ad server 1414. Ad server 1414 is configured to serve ads. In some embodiments, the ad server is associated with its own CDN to deliver ads. The ad server has stored ad content. In some embodiments, ad player 1412 is implemented as a player side plugin. Ad player 1412 is configured to communicate with ad server 1414 and request an ad to play. In some embodiments, the ad server and the ad player are provided or supplied by a same vendor (e.g., FreeWheel), where the vendor may work with content provider 1402, with the ad server operating on behalf of the content provider to manage campaigns and rules for placing ads in the vendor's ad players.

In this example, video player 1410 is playing the requested TV show. Ad(s) are to be played at a particular point (or points) of the video. The video player communicates with the ad player, instructing the ad player to play an ad when the video reaches the particular point in the video. The ad player then communicates with the ad server, requesting that the ad server provide the ad player with an ad to play. In some embodiments, additional information such as ad playing criteria is provided by the ad player to the ad server, such as an amount of time to be filled with ads (e.g., length of an ad break).

Ad server 1414 receives the request for an ad (and any other criteria or parameters, as appropriate) from ad player 1412. In the example shown, the ad server is programmed or configured with a set of campaigns, policies, and/or rules for ad insertion. The campaigns, policies, and/or rules may be configured, for example, by an ad operations team (1416) associated with the content provider (e.g., using tools to set up and campaigns and rules for ad insertion with the ad server). Based on the campaigns, policies, and rules, the ad server is configured to determine and provide a location (e.g., a reference to a uniform resource locator (URL)) of an ad (or ads) in response to the request for the ad.

Suppose, in this example, that television network XYZ has made direct sales (e.g., sold portions of its ad inventory or ad slots) to a number of advertisers/brands, such as Acme Motors (1417), Boss Burgers (1418), and Cool Cola (1420). Viewers of content provided by network XYZ will receive ads from either Acme Motors, Boss Burgers, or Cool Cola. In this example, the advertisers are represented by respective ad agencies 1422, 1424, and 1426. As shown in this example, each ad agency is associated with a CDN (respective CDNs 1428, 1430, and 1432) with which they serve the ads for the respective represented brands.

In this example, the ad server is configured to use the programmed campaign criteria, rules, and policies when processing requests for ads from client 1404. For example, when ad player 1412 requests an ad to play from ad server 1414, ad server 1414 is configured to use the campaign and rules with which it was programmed to determine or select an ad (or ads) for the ad player to play. In the example shown, the ad server responds to the ad player's ad request with a URL (or URLs) to the ads the ad server has selected based on the campaign and rules.

For example, suppose that in response to ad player 1412's request for an ad, ad server 1414 selects a set of Cool Cola ads for the ad player to play. Ad server 1414 returns to the ad player a set of URLs corresponding to the selected ads. These URLs point to CDN C (1432) which holds the actual ads to be played (i.e., the URLs point to the location of the actual ads). The ad player, using the set of URLs, is redirected to CDN C, which delivers the corresponding selected ads to the ad player. While a single redirect of the ad player is shown (e.g., redirection from ad server to CDN C), multiple levels of redirection may occur.

In the example shown, client 1404 includes ad monitoring engine 1434 and content monitoring engine 1436. Content monitoring engine 1436 is configured to measure performance and quality of experience of content playback using video player 1410. In some embodiments, the content monitoring engine is integrated with the video player. Various examples of quality of experience measurements include measures/metrics associated with bitrate, average bitrate (e.g., average bitrate sustained over the lifetime of a session during which the video is played), startup time (measures of how long the content took to start playing), failure events (e.g., failure to start), buffering ratio (which indicates, for example, a percentage of time or how often a stream is being buffered or interrupted), the number of buffering events (if any), the length of a buffering event, the number of frames per second rendered by a video/ad player, failed connection attempts, premature connection terminations, etc.

In some embodiments, information pertaining to user behavior/engagement is obtained for ads and/or content. Examples of user behavior/events include: starting and stopping playing a video or audio stream, seeking within the stream, skipping through the stream, abandoning the streaming session (e.g., by closing the player application), switching the player to full screen mode, minimizing/restoring the player, a change in the volume level of the player, and clicking on an advertisement. Other examples of information about the content playback include engagement metrics as well as local state information. Examples of local state information include current measurements of the client, such as a content player's current bitrate, current CDN, current player state (e.g., playing, buffering, paused, stopped), current player buffer length, current play head time/position, current bandwidth measurement estimations, current frame rate, etc. Other state information may include events such as error events. Examples of engagement information or measures include a length of time that the video segment has been playing, a length of time that the client has been connected to a content distribution network, an amount of data associated with a download of the video segment, a display mode of a video screen, a viewer interaction with at least one player control, and a viewer interaction with the video segment. In some embodiments, the measurements performed by content monitoring engine 1436 are collected on a per-session basis, where as described in further detail below, the content player is configured to create a content session entity for the streaming of the instance of the TV show.

In this example, the content monitoring engine is configured to provide the measurements to content distribution monitor 1438, which is an example of content distribution monitor 210. In some embodiments, the measurements made by the content monitoring engine are associated with metadata about the content (e.g., name of the content, genre, etc.). The content information may also be associated with an identifier of the session in which the content was played.

Ad monitoring engine 1434 is configured to measure quality of experience of ad playback using ad player 1412. In some embodiments, the ad monitoring engine is integrated with the ad player. In some embodiments, the same experience measurements and metrics made for content played using the video player (e.g., performance metrics, engagement metrics, local state information), as described above, are also made for the ads that are played with the content. For example, ad quality playback information such as buffering events, bitrates, startup times, playing times, etc. with respect to the playing of an ad may be measured. Summary/aggregate information based on the ad quality playback measurements may also be computed, such as rebuffering ratios, average bitrates, etc. In some embodiments, other event information, such as ad requests, ad failures, ad abandonments (e.g., a user closed the player application during the ad), ad skips, ad blocks, ad completes, etc. are also detected and recorded or otherwise obtained. Other examples of information include volume and ad interactivity. Yet another example of information includes whether a piece of content (that was not the user-requested content) that was played during an ad slot/break was a "slate" content item that had been played in lieu of an actual advertisement, where a "slate" content item refers to a piece of content (typically provided by the publisher of the requested content) that is played by default in an ad slot or ad break when an actual ad (e.g., one provided by an advertiser after buying an ad slot) is not available to be played (e.g., because the ad slot was not purchased by an advertiser, an ad could not be delivered due to infrastructure issues, etc.). The slate content item may be a default advertisement, but need not be. For example, when streaming a live sporting event, the publisher could present an informational notice (example of slate content) indicating that a commercial break is occurring (without showing an actual commercial), and that coverage of the sporting event will resume after the break. In some embodiments, if the monitoring engine detects that slate content is being played, measurements specific to slate content may be determined. As one example, the monitoring engine may monitor when a slate is played and how long the slate content was played for. The monitoring engine may also compute the duration/percentage of time that a slate content item was played during an ad break (e.g., during a 3 minute ad break during which real ads were supposed to be played, slate content was played for 1 minute).

In some embodiments, the measurements performed by ad monitoring engine 1434 are collected on a per-session basis, where as described in further detail below, the content player is configured to create an advertisement session entity for the streaming of the instance of the advertisement (or slate content item if one was played in lieu of a real advertisement), where, although the advertisement was played in conjunction with the requested TV show, a session entity separate from the content session entity is created. In this example, the ad monitoring engine is configured to provide the measurements made with respect to ads played by the ad player to content distribution monitor 1438. Further details regarding the information collected by the ad monitoring engine are described below.

In addition to measuring the playback experience and engagement for the ad, the ad monitoring engine may also obtain other measurements about the ads that were played, such as ad load information, including the length of an ad break, the position of the ad break (e.g., pre-roll or mid-roll), etc. Measurements associated with pods (which may include multiple ads) may also be determined, such as pod duration, the position of the pod relative to content (e.g., pre-roll or mid-roll), etc.

In some embodiments, client attributes/parameters are also obtained, such as device type (e.g., desktop, mobile device, etc.), operating system (e.g., iOS, Android, Windows, etc.), user agent, Internet Protocol (IP) address, geo-location, etc. Such client attribute information may be associated with the ad/content measurement information (e.g., added to the information or otherwise linked to it, for example, via a client application identifier, session identifier, and/or ad identifier). Such client attribute information may be used to further segment measurement data and computed metrics (e.g., breaking out ad failures by the attribute of device type or other dimensions/attributes), as will be described in further detail below.

In this example, the ad player has knowledge of the ad that was played by the ad player (e.g., has access to information identifying the ad that was played) for the requested content. In some embodiments, the ad player is also configured to obtain metadata associated with the ad that it is playing. For example, when the ad player communicates with ad server 1414 to obtain the URLs for a set of ads to be played, the ad player also obtains, from the ad server, metadata about the ads, such as an identifier of an ad (e.g., unique identifier), the creative name of the ad, the agency that served the ad, the campaign that the ad was a part of, rules associated with the ad, etc. Such information associated with an ad is referred to herein as "ad metadata." Metadata information about the ad may also be derived. For example, in client-side ad insertion, the client is configured to insert ads into the stream of video presented to the viewer. The ad player may derive or extract the identifier of the ad from the URL for the ad (e.g., the URL string may include the identifier for the ad, and the ad player is configured to extract the identifier from the URL string). In some embodiments, the extracted identifier is then used to query the ad server, which returns additional corresponding metadata information about the identified ad.

In some embodiments, the playback experience measurements for an ad are associated with the additional metadata information about the ad collected from the ad server. The combined information is then sent to content distribution monitor 1438. In some embodiments, as will be described in further detail below, an advertisement session entity is generated for each playing of an instance of an advertisement, where the advertisement session entity is associated with its own corresponding advertisement session identifier. In some embodiments, the metadata and monitored information determined for an advertisement are tied to the advertisement session entity. Content session entities are also generated for the streaming of an instance of the user-requested content, as will also be described in further detail below.

Content distribution monitor 1438 is configured to ingest the collected information and perform anomaly detection and root cause diagnosis. In particular, content distribution monitor 1438 further includes logic for performing anomaly detection and root cause diagnosis for instances of advertisements played on the client. Further details regarding content distribution monitor 1438 will be described below in conjunction with FIG. 15.

In some embodiments, the various example entities shown in the example environment of FIG. 14A, such as content provider 1402, CDN 1408, ad server 1414, CDNs 1428-1432, client 1404, and content distribution monitor 1438 communicate with each other over a network such as the Internet.

Server Side Ad Insertion

Figure 14B:
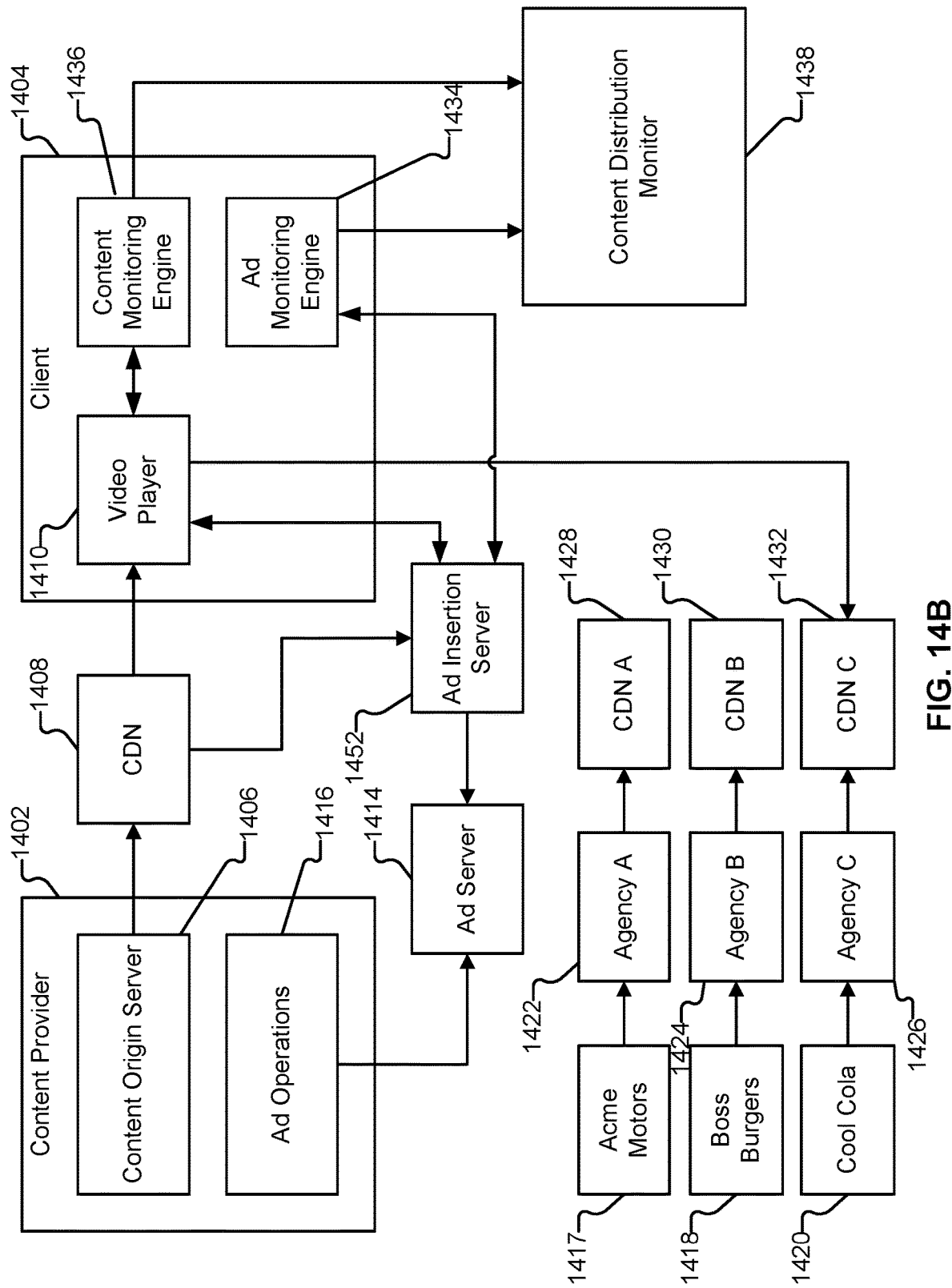
FIG. 14B illustrates an example embodiment of an environment in which server-side ad insertion is performed.

FIG. 14B illustrates an example embodiment of an environment in which server-side ad insertion is performed. In server side ad insertion, in contrast to the client-side ad insertion scenario described above in conjunction with FIG. 14A, ads are pre-inserted into the content by an entity external to the client content player.

In the example of FIG. 14A, the client includes an ad player configured to manage requesting and playing of ads. One example challenge of having ad players installed on clients is that it may be difficult to maintain those client players, such as fixing bugs, improving the ad players, etc., which is compounded by the disparate type of client devices that may be in use.

In the example server side ad insertion as shown in FIG. 14B, the functionality provided by the ad player of client 1404 is moved out of the client and instead included in a new component, ad insertion server 1452. In some embodiments, the ad insertion server is configured to communicate with ad server 1414 and the video player 1410 at client 1404.

In this example, when the video player of client 1404 requests a manifest file to play a requested video (e.g., an HLS manifest file), instead of the video player being directed (e.g., by a CMS) to CDN 1408 to obtain the video manifest file, the video player is instead directed to server side ad insertion server 1452.

The ad insertion server is configured to obtain the appropriate manifest file (i.e., the manifest file for the requested content) from CDN 1408. In some embodiments, a manifest file includes a list that is a series of URLs to chunks to be played (e.g., where the chunks, when played sequentially, form the entire content). The ad server is configured to determine where an ad should be played, and then dynamically modify/rewrite the original manifest file by replacing or inserting URLs to the ads (or slate content if an actual ad is not available to be played for some reason) among the content chunk URLs at appropriate locations among the content chunks (e.g., at the time locations where ads are to be played such as at the beginning or during the content). The original content chunks (the URLs to the content chunks) are not modified.

Ad insertion server 1452 then provides the video player the modified manifest file, which includes the locations (e.g., URLs) of the video chunks that together constitute the requested content.

The revised manifest file, with ad chunks dynamically included/inserted among the original content chunks, is then provided to the video player. The video player is then configured to obtain the chunks using their corresponding URLs listed in the manifest file, and sequentially play the chunks. In this example, from the video player's perspective, it is playing a series of video chunks, irrespective of whether the chunk being played is for an ad or for the content requested by the user of the client. This is in contrast to the example of FIG. 14A, where an ad player is configured to play chunks belonging to ads, and the video player is configured to play chunks belonging to content (because the ad playing is separated from the content playing). In the example of FIG. 14B, the video player plays both ad and content, without switching to a different player to play ads, as in the example of FIG. 14A.

In some embodiments, the video player is configured to identify when an ad (or slate content item in lieu of an ad) is played. For example, an identifier or tag indicating that an ad chunk is being played may be used to allow the video player to determine that an ad is being played. As one example, a marker in an HLS manifest file called a "discontinuity tag" indicates to the player when the next chunk will be from a different video, such as an ad. Based on the indication of an ad being played, the video player may prevent a viewer from skipping the ad (e.g., by disabling the ability to perform skipping when playing an ad chunk). In some embodiments, similar to as described above in conjunction with FIG. 14A, and as will be described in further detail below, based on the knowledge of when an ad is being played/to be played, an advertisement session entity is created for the playing of the instance of the advertisement. Information about the advertisement (or slate content) determined by the monitoring library during the streaming of the advertisement is then tied to that created advertisement session entity (e.g., via a corresponding advertisement session identifier). A separate content session entity is generated for the streaming of the instance of the user-requested content.

In some embodiments, the ad monitoring engine is configured to collect quality and event information associated with playback of an ad (or slate content) as described above. For example, the video player may determine when an ad (or default slate content) is playing, and the ad monitoring engine is configured to measure ad quality of experience metrics (e.g., when ad started or ended, buffering, startup time, pod metrics, etc.).

While the client may know that an ad is being played and be able to measure quality/performance information for what the client knows to be an ad, in this example, additional metadata information about the ad (e.g., ad creative name, campaign, rules/policies associated with campaign, upstream CDN, agency CDN, etc.) may not be available to the video player. However, such metadata about the advertisement that was played may be obtained via various mechanisms. As one example, unique content/session identifiers (e.g., where the client/application session identifier may be embedded in the manifest file and/or obtained from the client player application) and unique ad identifiers (e.g., where the ad identifier may be extracted from a URL to an ad chunk in the obtained manifest file) can be used to obtain ad metadata information. As one example communication protocol, from the client, an identifier of an ad may be included in a cue point. In some embodiments, a cue point is a metadata element that contains a timestamp at which the switching between two video chunks should occur. The ad identifier may then be used (e.g., by the client or the content distribution monitor) to perform a look up (e.g., by performing a query using the ad identifier) of the ad server 1414 and/or ad insertion server 1452 and retrieve the relevant metadata associated with the queried-for ad identifier. In other embodiments, the ad monitoring engine is configured to communicate with and query one or both of ad server 1414 and ad insertion server 1452 to obtain the additional ad metadata information. As another example, the unique content/session identifier embedded in the manifest file may also be used to query the ad insertion server to determine what ads were inserted by the ad insertion server for the video playback session. The ad metadata may then be associated with the advertisement session entity created for the playing of the instance of the advertisement.

In some cases in the server-side ad insertion scenario, the content player on the client may not have knowledge of what ads were played during the session (e.g., the client may not have access to the ad identifiers of the ads that were played). However, such knowledge may be available to the ad insertion server, which knows what ad segments it inserted into the content video stream for a playback session. In some embodiments, in order to determine what ads were played for a session, the content session identifier (e.g., of the content session entity generated for streaming the instance of the TV show requested by the viewer) is obtained. The ad insertion server is queried using the content session identifier. Based on the query, the ad insertion server returns the ad identifiers of the ads that it inserted into the content for that session. Thus, the ads that were played for a content session may be identified. In some embodiments, ad metadata associated with the ads is also returned by the ad insertion server. If ad metadata is not returned by the ad insertion server (but the ad identifiers are returned), the ad identifiers returned by the ad insertion server may be used to make additional network requests/remote queries for ad metadata (e.g., by querying the ad server). These additional calls are used to obtain the ad metadata, which can then be correlated or otherwise associated to ad playback quality. For example, similarly to as described above in conjunction with FIG. 14A, and as will be described in further detail below, the ad metadata and information collected via monitoring may be associated with the ad session entity generated for streaming the instance of the advertisement.

Figure 15:
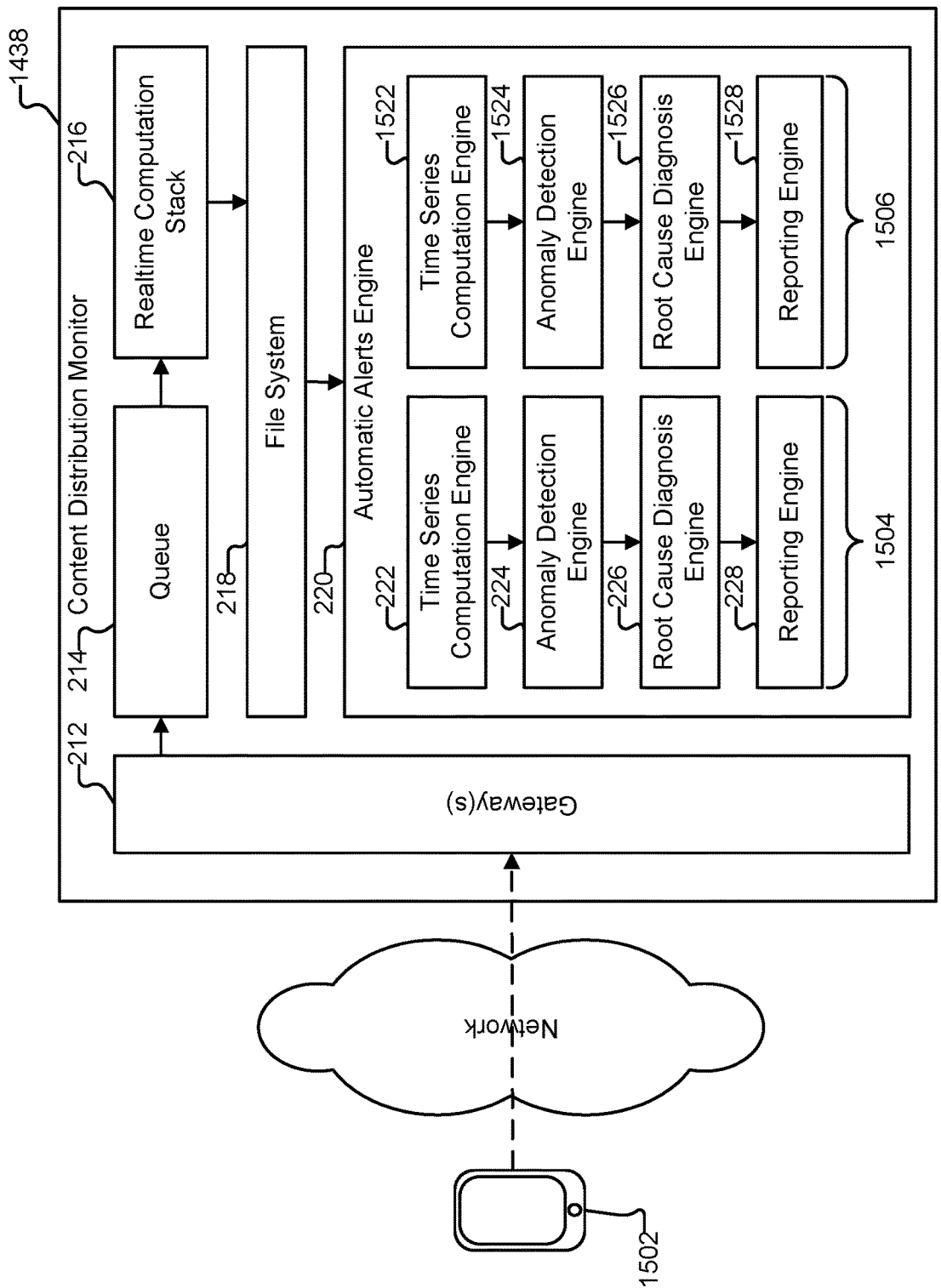
FIG. 15 illustrates an embodiment in which anomaly detection and root cause diagnosis for advertisements is performed.

FIG. 15 illustrates an embodiment in which anomaly detection and root cause diagnosis for advertisements is performed. In this example, suppose that the user of client device 1502 would like to stream a show published by publisher/studio "XYZ." In this example, client device 1502 is a mobile device such as a smartphone. The user requests the content via the dedicated video player application for publisher XYZ. The video player application provides an interface to a content management system (CMS) for the publisher's content, where the content management system is used to manage the indexing, searching/retrieval, format management, revision control, and publishing of XYZ's content.

Via the graphical user interface of the video player application, the user searches for and selects the content they wish to watch. For example, after finding the content item, the user clicks "play." The client is provided a manifest file that includes a listing of video chunks or segments and their locations, which the player uses to obtain chunks to play to form the stream. Clicking "play" causes a streaming session to start, where the requested content is streamed during the session. In this example, a monitoring library of the player application includes a content monitoring engine (such as content monitoring engine 1436, which is configured to monitor events and metrics associated with the content streaming session, as described above). In this example, the content monitoring engine creates a content session entity for the playing of the requested content, and assigns the content session in which the content is streamed with a content session identifier.

Now suppose that an advertisement is to be played in conjunction with the streaming of the requested content. For example, as described above, XYZ has sold an advertisement slot to a brand. The advertisement may be played before, during, or after the content. As described above, the advertisement may be inserted into the streaming session of the content in various ways.

For example, in client-side ad insertion, as described above, the player of the ad (which may be the same as the player of the content or a different player used to specifically play advertisements) separately communicates with an ad server to request an advertisement to play. The ad server is part of a control/management plane that acts as a controller that directs the player to the advertisement to be played. The indication of what ad (or ads) to be played may be provided to the ad player in the form of a manifest file as well (with a listing of the locations of the chunks of the advertisements to be played), similar to the manifest file provided for the content directly requested by the user.

The ad player then stitches/inserts the advertisement into the streaming of the content by stitching the ad chunks into the content stream, thereby providing what appears, to the viewer, to be a single video stream in which content encoded by different entities (in this example, the content publisher and the ad publisher) is played (which the viewer may not be aware of).

As described above, another example way by which advertisements are provided to the client is server-side ad insertion. In this scenario, the ad is inserted into the content by an entity external to the client (in contrast to the client-side ad insertion scenario, where the client stitches/inserts the ad and the content together into a single stream that is viewed by the viewer). For example, the ad is stitched/ inserted into the content by XYZ's content delivery network (which includes, for example, an ad stitcher), which communicates with the ad server to obtain the ads that are to be played in conjunction with the content. As one example, the ad stitcher (e.g., ad insertion server 1452) stitches the ads together with the content by creating a manifest file that includes both chunks for advertisements along with chunks for the content requested by the user. The manifest file is then returned to the client, where the video player plays through and renders the chunks listed in the manifest file (which includes URLs for chunks of the requested content and the URLs for ads to be played). In this case, in contrast to the client-side ad insertion scenario, the client does not need to separately communicate with the ad server.

At the client, the advertisements may be played by a dedicated ad player that is separate from the player of the content (e.g., as shown in FIG. 14A), or the same player used to play the content (e.g., as shown in FIG. 14B). In either case, the user sees a single stream of ads inter-mixed with content, and may be unaware that the content and ads being streamed together are coming from/encoded by different entities.

In some embodiments, regardless of how the ads were delivered to the client (either via client-side or server-side ad insertion), mechanisms are provided that allow the client to recognize when an advertisement is being played (versus the content requested by the viewer). As one example, the chunks/segments of advertisements provided to the client are associated with metadata indicating whether a chunk being played is an advertisement (e.g., via a marker such as the discontinuity tag described above). Other mechanisms may also be used to determine when an advertisement is being played/distinguish between playing content versus ads. For example, the detection that an ad is being played may be triggered by the action of communicating with an ad server (e.g., during client-side ad insertion). Those chunks provided by the ad server may be labeled as advertisements by the client. Other markers that may be used to detect when an advertisement is being played are described above. As will be described in further detail below, this ad-indicating metadata will be used to drive and affect various types of processing behavior, both on the client side and on the backend (e.g., at the content distribution monitor).

As one example in which the ad-indicating metadata affects or changes client player behavior, when the player determines that an ad is being played, operations such as skipping may be prohibited by the player, as described above.

The behavior of the monitoring library is also affected based on the determination that an advertisement is being played. For example, compared to the content, different events and/or metrics may be recorded/computed by the monitoring library. Further, in some embodiments, the playing of the advertisement is provided its own session identifier (where the playing of the advertisement is treated as having played in its own viewing session). If the monitoring library includes separate content and ad monitoring engines, the selection of which monitoring engine to be used to collect information is determined based on a determination of whether the content being streamed is an advertisement or the content requested by the viewer.

Details regarding the types of information collected by the content/ad monitoring engines are described above. Selected examples will be described in further detail below for illustrative purposes.

In some embodiments, the playback experience measurements for an ad are associated with the additional metadata information about the ad (which may be obtained in a variety of ways, as described above). The combined ad metadata/monitored information is then sent to platform 1438 (which in some embodiments, is a version of content distribution monitor 210 adapted to perform anomaly detection and root cause diagnosis for advertisements as well as content). In some embodiments, as described above, an advertisement session entity for the playing of the instance of the advertisement is created, where the advertisement session is accorded its own corresponding, unique advertisement session identifier. The information obtained about the advertisement (e.g., the measurement data and ad metadata) is tied to the advertisement session. For example, when a heartbeat including information about the advertisement is sent to the backend, the heartbeat includes the advertisement session identifier. The heartbeat may also include an indicator of whether the heartbeat includes information for an advertisement or for user-requested content (content provided by the content publisher that is requested by a viewer).

Further details regarding the carving of content playback sessions and assignment of session entities to different portions of a media stream presented to a viewer are described below.

Carving the Stream of Media Presented to Viewers

Figure 16:
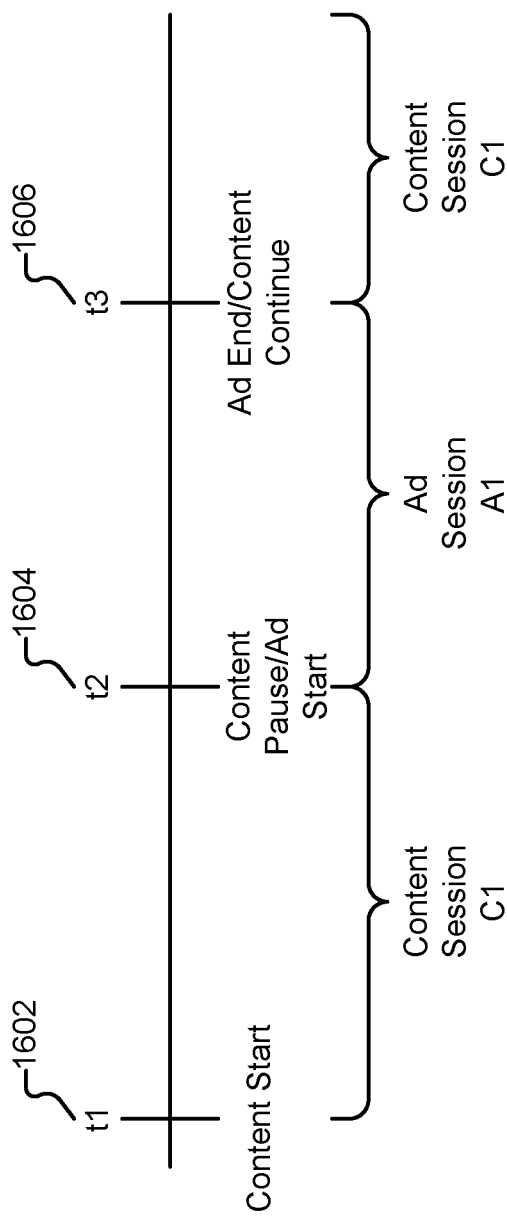
FIG. 16 illustrates an embodiment of streaming content encoded by different entities.

FIG. 16 illustrates an embodiment of streaming content encoded by different entities. In this example, an advertisement is played in the middle of the requested content.

For example, at time t1 (1602), the content requested by the viewer begins playing. The monitoring library creates a session entity for playing of the content, and assigns the streaming content session entity with a session identifier, "C1." Metrics, metadata, and events collected by the monitoring library during playing of the content are assigned the session identifier "C1." Any heartbeats that include information about the requested content are tagged with the content session identifier "C1." At time t2 (1604), after a portion of the content has been played (e.g., several chunks of the requested content), an advertisement is played. Based on various mechanisms such as those described above, the monitoring library determines that an advertisement is being played, and treats the advertisement as being streamed in its own session (or as a sub-session of the overall/content session in which both the content and ad/slate are being played), for example, by creating a new advertisement session entity representing the playing of the advertisement (or slate content), and assigns the streaming of the advertisement its own session identifier, "A1." Metrics, metadata, and events collected by the monitoring library during playing of the advertisement are assigned the session identifier "A1." As the advertisement was also played in conjunction with the content, a pointer to the session "C1" is also included in the session information about the advertisement collected by the monitoring library. In some embodiments, heartbeats containing data about the playing of the advertisement are assigned the advertisement session identifier "A1," where the heartbeat also includes a pointer to "C1." At time t3 (1606), playing of the advertisement completes, and the client resumes playing of the content. The monitoring library determines that playing of the advertisement is over, and that playing of the requested content is being continued, and the monitoring library reverts to collecting metrics and events for the requested content, which are again assigned the session identifier "C1" (since the playing of the requested content is being resumed).

Thus, the monitoring library has isolated and carved out, from a single stream of video being presented/rendered, those portions of the stream in which ads were played, as well as those portions of the session in which the requested content was played, and created individual advertisement session entities for those carved-out advertisement portions that are assigned their own advertisement identifiers, such that the metrics and events collected for advertisements are contained within their own advertisement session that is uniquely identifiable. As will be described in further detail below, such partitioning of metrics and events by type of content being played (requested content versus advertisement), where playing of an ad is treated as its own session within the larger overall stream in which both the content and advertisement are played, allows for a separation between content and ad telemetry data that further allows anomaly detection and root cause analysis to be performed specifically on ads. That is, such partitioning allows the content distribution monitor to determine whether a set of measurements pertains to an advertisement session entity or a content session entity, such that the backend can determine whether to perform content-specific or ad-specific processing on the measurement data.

Returning to the example of FIG. 15, based on the determination of whether an advertisement is being played or requested content is being played, the monitoring library performs, respectively, ad-specific monitoring or content-specific monitoring. That is, because the client is aware of when ads or requested content are being played, the monitoring library performs various measurements based on the type of content being played (requested content or advertisement content).

The following are example types of metrics, values, and events recorded for advertisement content that is streamed.

Ad start failure: The ad start failure is an event indicating whether an advertisement played or failed to play.

Volume: Volume that the ad was played at.

Bitrate: Bitrate that the ad was played at.

Ad interactivity: For example, user interactions with the advertisement, such as a click or selection of an ad (e.g., such as with respect to pop-up advertisements that appear in a user interface before a user can watch their requested content). An advertisement may also have various options/multiple choices for a user to click on, such as a link to more information, a button to skip the ad, etc. In some embodiments, the monitoring engine monitors what selection was made by the user with respect to the options associated with advertisement.

Slate content?: This metadata indicates whether or not a slate content item was played during an ad slot/ad break in lieu of an advertisement. In some embodiments, slate content chunks may include metadata indicating that the content is slate-type content.

Anomaly detection and root cause analysis based on such types of measurements and events will be described in further detail below.

As described above, in addition to the playing of the requested content item being accorded its own content session entity, the playing of each individual advertisement instance is also accorded its own advertisement session entity with its own session identifier. The monitoring library is configured to continuously monitor each individual video session (whether content session or advertisement session) and collect data on a per-session basis and then transmit that collected information to content distribution monitor 1438, for example, in the form of heartbeat messages. That is, in some embodiments, each advertisement session has its own set of heartbeats with information about a given advertisement session.

In one embodiment, a heartbeat for an advertisement that was played includes the following information: an indication that the heartbeat is for advertisement-type content (versus content requested by the viewer to watch); the session identifier for the advertisement session in which the advertisement was played; a pointer to the session identifier for the content session that the advertisement session is/was a part of (which allows the advertisement session and its corresponding content session to be correlated); and raw measurement data such as metrics and events calculated and collected/observed by the monitoring library. The heartbeat also includes metadata about the session, such as the client device type (e.g., iPhone, Android, desktop, laptop, etc.), the operating system of the client device, the version of the operating system, the asset being played during the session, whether the content is live or VoD, the CDN (e.g., Akamai, Level3, etc.) from which the asset is being streamed, and an Internet Protocol (IP) address of the client device. In some embodiments, the Internet service provider (ISP) (e.g., Comcast, AT&T, Verizon, etc.) used by the client device is derived from the IP address of the client device.

The heartbeats may be sent periodically to the content distribution monitor (e.g., every 20 seconds) over a network such as the Internet.

Content Distribution Monitor 1438 is configured to perform anomaly detection and root cause diagnosis. In this example, content distribution monitor 1438 is an embodiment of content distribution monitor 210 of FIG. 2A in which the content distribution monitor is extended or otherwise adapted to perform anomaly detection and root cause analysis in sessions in which content encoded by multiple entities is streamed.

In this example, a heartbeat for a session (whether content session or advertisement session) is received via gateway 212, as described above in conjunction with FIG. 2A. The heartbeat is placed in queue 214. Realtime computation stack 216 is configured to generate, in real time, a session summary using the heartbeat. The session summary is persisted to file system 218.

The session summaries are then processed by automatic alerts engine 220, which is configured to perform anomaly detection and root cause analysis. In this example, the automatic alerts engine is shown to have two tracks, one for processing content sessions, and one for processing advertisement sessions. Those session summaries that are for content sessions are processed using track 1504, as described above, while those session summaries that are for advertisement sessions are processed using track 1506. The session summaries are funneled to the appropriate track using a type identifier that indicates whether a session summary was for an advertisement session or a content session. Different algorithms for anomaly detection and root cause diagnosis may be applied depending on whether a session summary is for an advertisement session or a content session. In this way, ad specific processing may be performed on advertisement sessions.

While parallel systems track for processing content encoded by different entities (e.g., content sessions and advertisement sessions, which may have different metrics, groupings, etc., despite being shown as part of the same streaming session), the parallel systems may also be combined into a single system such that the functionality is combined, where the same engine can utilize different algorithms depending on what type of session (content session or advertisement session) for which data is being processed by the engine.

In some embodiments, track 1504 for processing content session summaries utilizes the same logic as described above in conjunction with automatic alerts engine 220 of FIG. 2A.

Continuing with track 1506 for processing advertisement session summaries, time series computation engine 1522, similar to time series computation engine 222, is configured to use the individual session summaries to generate, for each recorded metric, a time series of values of the metric for different groupings of sessions.

The dimensions by which advertisement sessions are grouped may be different from those described above that are used to group or segment content sessions. Examples of dimensions/group-bys used to partition or otherwise group advertisement sessions include the following. In some embodiments, the groupings of sessions are done on a per-ad id basis.

Advertisement Identifier: the identifier of the ad. This grouping corresponds to all advertisement sessions in which a given advertisement (identified by its advertisement identifier) was played. For example, the time series computation engine may collect together all sessions in which instances pertaining to a specific ad id were played.

Content identifier: the identifier of the content with which the advertisement was played. The same advertisement may be played multiple times with different content items. Thus, for example, for a specific piece of content, all sessions in which an instance of the ad id was played in conjunction with that piece of content are grouped together.

Viewer identifier: the identifier of the viewer that an advertisement was shown to. The same advertisement may be played multiple times for the same viewer. Thus, for example, for a specific viewer, all sessions in which an instance of the ad id was viewed by that viewer are grouped together.

Ad agency: identifier of the advertisement agency the advertisement came from.

Ad insertion mechanism: indicates whether advertisement was added via client-side ad insertion or server-side ad insertion. Instances of the same ad (identified by its ad identifier) may have been inserted via either client-side ad insertion or server-side ad insertion. Thus, for example, all sessions in which an instance of the ad id was inserted by client-side ad insertion are placed into one grouping, while all sessions in which an instance of the ad id was inserted by server-side ad insertion are placed in another grouping.

Geo-location: indicates the geo-location (e.g., geographical region) of the device on which the advertisement was played. Thus, for example, for a specific geo-location, all sessions in which an instance of the ad id was played in are grouped together.

Device type: indicates type of device that advertisement was played on, such as iPhone, Pixel, Galaxy, etc. Instances of the same ad may be played on various types of devices. Thus, for example, for a specific device type, all sessions in which an instance of the ad id was played on a device of that device type are grouped together.

Player: indicates what player application (e.g., built by the publisher) was used to play the advertisement. Instances of the same ad may be played on various types of players. Thus, for example, for a specific player, all sessions in which an instance of the ad id was played on that player are grouped together.

Operating system: indicates what operating system was used by the device that played the advertisement (e.g., iOS, Android, Windows, etc.). Instances of the same ad may be played on devices running various types of operating systems. Thus, for example, for a specific operating system, all sessions in which an instance of the ad id was played on a device using that operating system are grouped together.

Ad server: indicates which ad server hosted the advertisement that was played in the advertisement session. The same ad id may be served from multiple ad servers. Thus, for example, for a specific ad server, all sessions in which an instance of the ad id was played on that ad server are grouped together.

Creative: ad creative refers to the actual video object rendered for a specific advertisement. The same ad id may have multiple creatives, where each creative has its own unique identifier (creative id). Thus, for example, for a specific ad creative object, all sessions in which an instance of the ad id was presented in the form of that creative object are grouped together.

Slate Content: With respect to sessions in which slate content was played in lieu of advertisements, these sessions may also be grouped according to various dimensions such as those above. However, while sessions in which instances of a specific ad id are played are grouped along various dimensions, slate content may be grouped in a more global manner, even though there may be different types of slate content that are shown. For example, rather than having a group of all sessions in which instances of a specific ad id were played, there may be a group of all sessions in which any slate content was played (regardless of what specific pieces of slate content were played). For example, the time series computation engine may collect together all sessions in which any slate content had been played (based on metadata indicating that slate content had been played during those sessions). That grouping of all sessions in which slate content was played may be further divided according to various dimensions such as those described above. For example, for a specific video asset (identified by a unique content identifier), all sessions for which any slate content was played in conjunction with that content identifier are grouped together. Similarly, any sessions in which slate content was played on a specific type of device are grouped together. The techniques described herein may also be variously adapted to track anomalies in individual/specific slate content items.

The following are examples of aggregate metrics computed for an advertisement that are generated for a specific partition/grouping of advertisement sessions in which the advertisement was played. The following examples correspond to the metrics and events that are recorded by a monitoring library for advertisements, as described above.

Volume: Determine the average volume that instances of the advertisement were played at across the advertisement sessions in a group defined by a corresponding set of attributes. For example, the average volume that an advertisement was played at during advertisement sessions in which the advertisement was incorporated with user-requested content via client-side ad insertion may be computed. As another example, the average volume that the advertisement was played at for advertisement sessions played on XYZ's player (versus the player application of other publishers) may be computed. An average is but one example of a statistical aggregation that may be used.

Ad Frequency: For a given advertisement and a given grouping of advertisement sessions in which the given advertisement was played, determine the count or number of times that the given advertisement was repeated in the sessions belonging to the group. As one example, for a given viewer identifier, determine a count of the number of times the advertisement was played (e.g., the number of advertisement sessions for the given viewer identifier for which the advertisement was played).

Play Time: As another example, the play time of an advertisement is recorded by the monitoring library of the client. Advertisements may have various lengths (e.g., 10 seconds, 15 seconds, 30 seconds, etc.), and the play time refers to the amount of time the ad was played for.

Ad start failure: As one example, determine the percentage of sessions in a group of sessions that attempted to play the ad, but for which there was a failure to start. For example, determine that for the ad sessions where the ad was received from a specific ad server (where instances of the same ad id may be provided by different ad servers, the percentage of ad sessions that failed to start, etc.

Bitrate: As one example, determine the average bitrate that the advertisement was played at across the advertisement sessions in a group. For example, the average bitrate that an advertisement was played at during advertisement sessions in which the advertisement was incorporated with user-requested content via client-side ad insertion is determined. As another example, the average bitrate volume that the advertisement was played at for advertisement sessions played on XYZ's player (versus the player application of other publishers) is determined. An average is but one example of a statistical aggregation that may be used.

Ad interactivity: As one example, determine, for a grouping of sessions in which an interactive ad was played, the number of times users of those sessions skipped the ad or clicked a link embedded in the ad, or otherwise performed a given action with respect to the interactive ad. As another example, the ratio of sessions in the grouping in which a given action was taken may be determined (e.g., users skipped the ad in 20% of the sessions in which the ad was played in a certain geo-location).

Slate Content: For slate content, which are played in lieu of advertisements, other aggregate metrics may be computed. For example, as described above, the monitoring library indicates (e.g., using metadata) whether content played during an ad slot or ad break was slate content. As described above, slate content is content that is played in lieu of a real advertisement, and is inserted into an ad break to fill the gap where an advertisement could not be played, which could be due to various reasons (e.g., no brand purchased an ad slot for the ad break, there was an issue in delivering the advertisement and a piece of slate content needed to be played, etc.). Also, as described above, sessions in which (any) slate content was played may be grouped together by various dimensions. Aggregate slate metrics may be computed for each grouping, as described above. For example, the number of sessions in a grouping pertaining to a specific content identifier is an aggregate metric that may be determined that indicates the number of times slate content was played for a specific video asset. Further, for a grouping of sessions in which slate content was played, the aggregate (e.g., average) duration of time the slates were played per ad break may be determined. As another example, for some specific grouping of sessions in which slate content was played, the aggregate (e.g., total) number of times that slates are played over the total number of attempts for playing ads may also be determined.

After generating the aggregate metrics for various groupings of sessions, the generated time series for each group are evaluated by anomaly detection engine 1524, which is configured to determine if there is anomalous behavior detected in the playing of the ad with respect to the various session groupings. That is, for each group in the plurality of groups, the presence of an anomaly in a given grouping of ad sessions (for a specific ad) is determined.

In this example, rather than building a baseline and threshold for detecting an anomaly in a metric as described above in conjunction with FIG. 2A, the publisher provides a threshold or KPI (key performance indicator) for a metric. That is, XYZ is a publisher of content and is a subscriber to the services provided by the content distribution monitor. While XYZ did not encode the advertisements that were played, XYZ may have certain expectations as to how the ads should perform, where XYZ defines (and provides to the content distribution monitor) the threshold by which issues are detected.

In one embodiment, the content distribution monitor provides an interface by which a user, such as an operator-user associated with XYZ, may define or configure a threshold that is used by anomaly detection engine 1524 to determine whether an anomaly has occurred for an ad in some grouping of sessions.

One example of using the thresholds to detect the presence of anomalous behavior in the playing of an ad in a particular grouping of sessions is as follows. The anomaly detection engine (or the time series metric computation engine), using historical information about metrics, generates statistical models of the distribution of metrics for various groupings. As one example, suppose an advertisement for Cool Cola is used. The advertisement is identified by its advertisement identifier, 1234. Now consider the metric, volume. In this example, historical information is evaluated to determine a statistical model of the volume for advertisement sessions (in which advertisement 1234 was played) that occurred on devices running the iOS operating system (an example of an attribute used to define a grouping). As one example, advertisement session summaries for a sliding window of 48 hours, or any other time period, as appropriate, are obtained, and the volume for advertisement sessions played on iOS devices in that time period is modeled as a distribution, such as a Gaussian distribution. As part of modeling the distribution of the metric for sessions involving ad 1234 that were played on iOS devices, various statistical measures are determined, one example of which is as confidence intervals (e.g., 95%, 99%, etc.).

In one example, when determining whether there is anomalous behavior for a metric in a group of sessions, the confidence interval determined for the metric for the group is compared against the threshold provided by the content publisher, XYZ. A 95% confidence interval indicates that with 95% certainty, the average value for the metric is within a certain range of values. In this example, this would indicate that with 95% certainty, the average volume (e.g., for the particular group of sessions in which the ad id 1234 was played on iOS devices) would fall within the range of values in the confidence interval. If that XYZ has provided a threshold volume, and if the threshold is exceeded, then the volume of the ad sessions for the group is anomalous.

As one example of comparing the confidence interval against the predefined threshold, if the lowest value in the confidence interval exceeds the threshold, then an anomaly is flagged (alternatively, if going below a threshold triggers detection of an anomaly, then an anomaly is detected if it is determined if the highest value in the range falls below the threshold).

The use of the confidence interval helps to prevent false positives in anomaly detection for metrics that fluctuate a great deal. For example, for metrics that vary a great deal, their confidence intervals will be larger, and it is unlikely that the lower end of the range of the confidence interval would exceed the threshold (even though the computed average value may exceed the threshold). In this way, statistical noise in metrics time series can be eliminated (by ensuring that the crossing of the threshold is not due to noise, and is statistically significant). Further variation due to low traffic (e.g., small number of sessions in a grouping) may be addressed by using the confidence interval.

The following are additional examples of how anomalies are detected for different types of ad-related metrics.

Volume Anomaly: XYZ may wish to be alerted when the volume of the ad was too high (or too low) relative to the volume of the content, affecting user experience.

Bitrate Anomaly: XYZ may wish to be alerted when the bitrate is too high or too low relative to a threshold, affecting user experience.

Ad Start Failure Anomaly: XYZ may wish to be alerted when the percentage of ad start failures for a given ad exceeds a threshold. For example, if, for a certain group of sessions, the ad failed to start in more than 5% of the sessions, then an anomaly is detected.

Frequency Anomaly: XYZ may wish to know when the frequency of the advertisement is above a threshold, as this indicates that the ad was repeated multiple times over a period of time. For example, a threshold of 10 could be set, where if any given viewer sees an ad with a particular ad identifier more than 10 times, XYZ is notified.

Ad Interactivity Anomaly: XYZ may wish to be alerted when the ratio of sessions in which given ad was skipped exceeds a threshold. For example, if, for a certain group of sessions, the ad was skipped more than 50% of the time, then an anomaly is detected in that group of sessions.

As described above, anomalies in groupings of sessions pertaining to a specific ad id may be detected. The techniques described above may be variously adapted to accommodate detecting anomalous behavior in groupings of sessions in which slate content had been played instead of a real advertisement.

Slate Content Anomaly: As a slate content item is default content that is played during an ad break in lieu of an actual advertisement (and therefore playing of the slate content did not bring in revenue for XYZ), XYZ may be interested in being alerted when slate content was played a threshold number of times (or threshold frequency over the window/period of time of the time series). For example, for a certain content item that slate content was played in conjunction with, whether slates content was played more than a threshold number of times (or frequency given the period of time), or for a threshold percentage of time. As one example, suppose that XYZ is interested in the percentage of time that slate content is played for a specific content asset. The process for detecting anomalous behavior would be to first compute slate percentage of time per ad break for each individual video content session. Next, the average percentage of time (or confidence interval) across all individual percentage of time per asset group (corresponding to different content identifiers) is computed. Finally, if the average slate percentage time (or confidence interval) is above a given threshold, the asset group is marked as anomalous for the metric of slate percentage time.

In some embodiments, after it is determined that the confidence interval has exceeded (or falls below) a threshold, other criteria are used to confirm that an anomaly has been detected and that further steps should be taken to address the anomaly, or if the anomaly should be ignored. For example, the number/percentage of viewers/sessions that are affected, and the period of the anomaly (whether it was a short-lived anomaly, for example) are used to determine whether to escalate the processing of the anomaly (e.g., to perform root cause diagnosis, notifying the publisher of the anomaly, etc.). These factors may prevent the notification of false positives, or allow issues that affect only a small number of viewers to be ignored.

After an anomaly has been detected, root cause diagnosis engine 1526, similar to root cause diagnosis engine 226, is configured to determine the root cause of the anomaly detected in the advertisement's metric for a group. Diagnosing the detected issue and identifying a root cause of the issue allows publishers to understand the anomalies and be proactive in handling them.

As described above, in one embodiment, a diagnosis graph is generated, where the graph is generated/constructed using nodes corresponding to group-bys and dimensions (which include those that may be specific to advertisements, such as the ad server).

Figure 17:
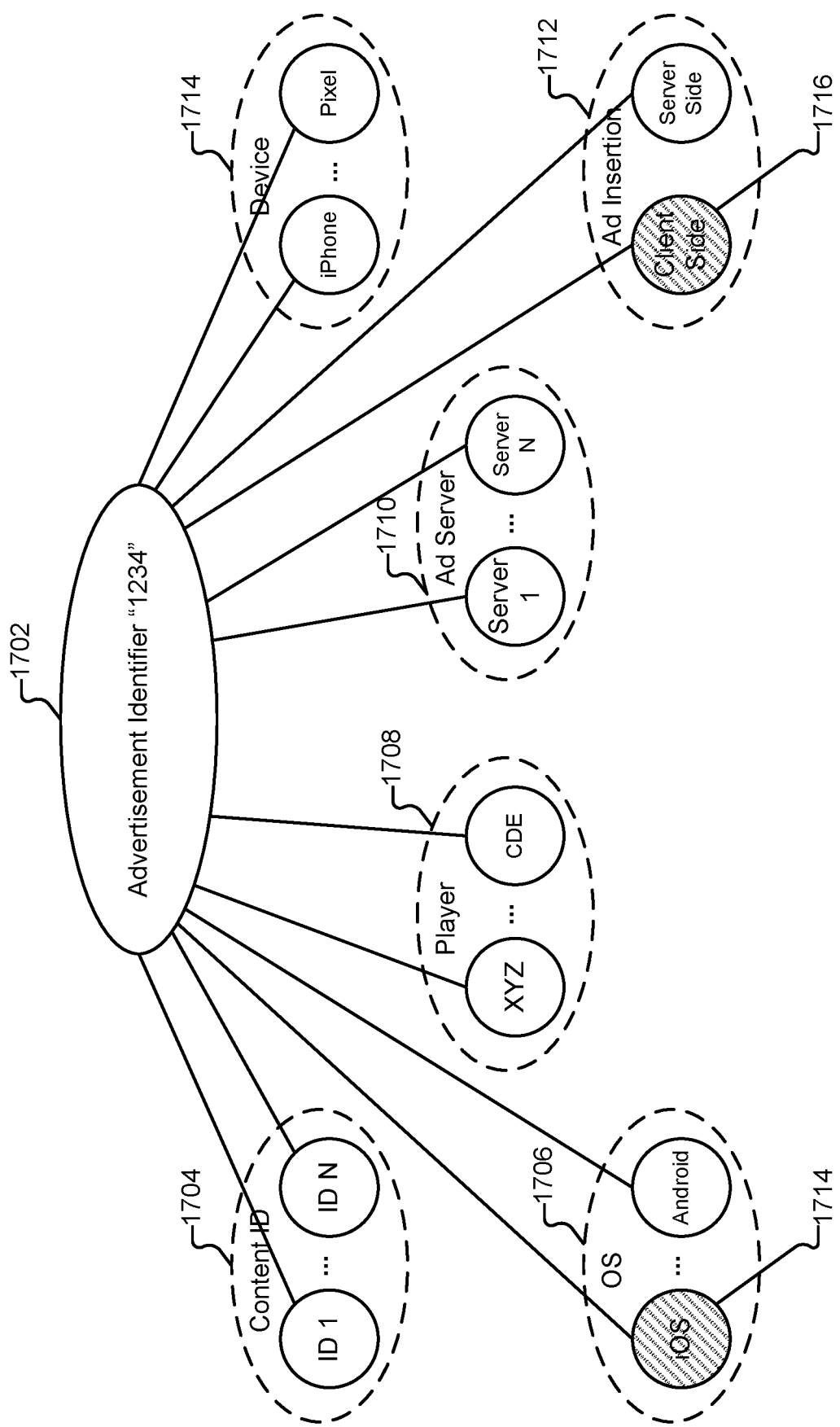
FIG. 17 illustrates an embodiment of a diagnosis graph.

FIG. 17 illustrates an embodiment of a diagnosis graph. In this example, suppose that anomaly detection/root cause diagnosis is to be performed for sessions in which a particular Cool Cola ad, with the unique ad identifier 1234, was played. Shown in this example is a two level graph with the ad identifier (e.g., 1234) as a root (1702) (while a two-level hierarchy is shown in this example for illustrative purposes, the graph may have any number of hierarchical levels, with further levels including various tuples of dimensional groupings, as described above). The child dimensions in this example are content identifier (1704), operating system (1706), player (1708), ad server (1710) (where instances of the same ad identifier may be delivered by different ad servers), ad insertion type (1712), and device (1714). In some embodiments, as described above, the diagnosis graph is traversed in order to identify a root cause. Within each dimension are groupings corresponding to each of the possible dimension values. For each grouping, a set of aggregate metrics have been computed for the sessions belonging to the grouping. While a two-level diagnosis graph is shown, with single dimension groupings, in the example of FIG. 17, groupings may be constructed based on combinations of dimensions (as described above), resulting in graphs of varying levels.

In some embodiments, the contribution/impact on a session metric of the set of attributes of a grouping are computed using the techniques described above. The contributions may be used in various ways as part of the diagnosis processing. For example, those groupings that have a low contribution may be excluded from the graph (even if they are determined to be anomalous, as it is unlikely they would be the cause of anomalies due to their low impact on the metric value). This reduces the number of nodes that are traversed when performing root cause diagnosis.

As another example, the contributions can be used to isolate whether there is a single root cause for a detected anomaly or whether there are many factors that contribute to an anomaly occurring. For example, if all children of a problematic node contribute equally to the session metric, then it is likely that the parent is a root cause. But if one dimension is largely contributing to the majority of the issue, then that particular grouping may be identified as the root cause of the detected anomaly.

As one example, suppose that the group for ad id "1234" (parent node 1702) was detected as anomalous due to high ad-start failure (aggregate ad-start failure metric for that grouping exceeded a threshold). To find the contributors of this anomaly, the graph is traversed (e.g., using BFS). In this example, a search is started from the dimension "Content ID" (1704). Within this dimension, every group is evaluated for their contribution to the parent anomaly and is labelled as a candidate contribution to the parent anomaly and is labelled as a candidate contributor if their contribution is high enough. One example of determining the contribution of a group to the anomaly is to remove the sessions belonging to the group and recomputing the aggregate metric for the parent, without the removed group. If the change in the aggregate metric for the parent is significant (e.g., beyond a threshold), then that group is designated as a candidate contributor. If multiple groups are labelled as candidates, then no contributor is found within the dimension (e.g., because all groups are determined to have contributed to the parent group anomaly, so a single root cause group could not be identified), and the next dimension (in this example, "OS" 1706) will be processed in the same way. If only one candidate is identified, that candidate is returned as a contribution. Thus, within each dimension, 0 or 1 contributors may be returned. In this example, the contributors are the groupings of "iOS" (1714) and "server-side ad insertion" (1716). In this way, XYZ can gain insight and see that playing of the ad id on iOS devices or having instances of the ad id inserted via server-side ad insertion are the main culprits causing the anomalies seen in the ad id with respect to the ad-start failure metric.

In this example, the parent group was the group of all sessions in which instances of a specific ad identifier were played. The graph may be variously adapted to accommodate performing root cause diagnosis for slate content. For example, rather than the root node corresponding to grouping of all sessions pertaining to a specific ad identifier, the root node would be all sessions in which (any) slate content was played. Those sessions would then be further similarly grouped by dimensions such as content identifier, geolocation, device-type, etc. For example, suppose that the duration of slates per ad break across all slate sessions is anomalous (i.e., an anomaly is detected in the root node grouping of all sessions in which slate content was played). If a child grouping with respect to a specific content identifier was returned as a contributor, XYZ could use this diagnosis information to determine that advertisers do not wish to buy ad slots for that specific content. As another example, if there is an abnormally high number of slate content items being played in a certain/specific geo-location, this may indicate to XYZ an infrastructure issue with delivering advertisements in that particular geo-location.

Reporting engine 1528, similar to reporting engine 228, is configured to provide notification about anomalies and the diagnosed root cause(s) of the detected anomalies. If a single root cause grouping/dimensions are determined, then the root cause grouping is outputted. If contributions have been calculated, the groupings that contributed to the detected anomalies are outputted. Thus, either a single root cause may be presented, or multiple causes may be presented based on the determined contributions.

In some embodiments, a sample of affected advertisement sessions is presented. Time series for those sessions may also be shown. Thus, although publisher XYZ is not in control of advertisements that are played with their content, the publisher may be alerted to issues with those advertisements. Other dashboards, similar to those as described above, may also be shown.

Figure 18:
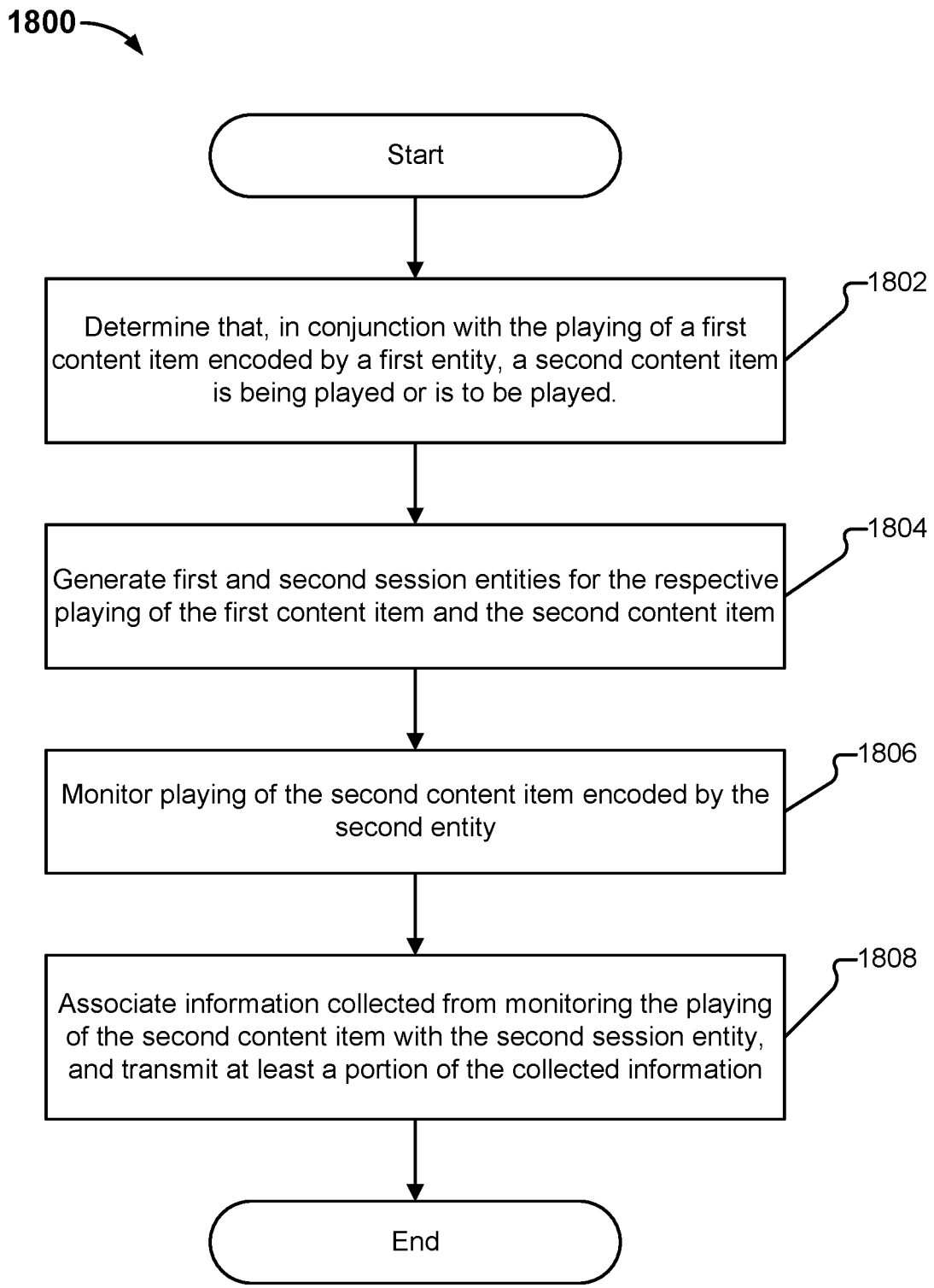
FIG. 18 is a flow diagram illustrating an embodiment of a process for creating session entities for different types of content presented together in a stream.

FIG. 18 is a flow diagram illustrating an embodiment of a process for creating session entities for different types of content presented together in a stream. In some embodiments, process 1800 is executed by a client device, such as client 1502 of FIG. 15. The process begins at 1802 where it is determined that, in conjunction with the playing of a first content item encoded by a first entity, a second content item is being played or is to be played. As one example, the first content item is content requested to be played by a user. The second content item may be encoded by a second entity different from the first entity. As one example, the second content item is an advertisement, encoded by a second entity different from the first entity, that is played in conjunction with the requested content. The second content item being played/to be played in conjunction with the first content item may also be other content not requested by the viewer, such as slate content (which may also be encoded by the first entity), that is played in conjunction with the first item in lieu of an advertisement. The determination that an ad/slate content is being played instead of the requested content may be made in a variety of ways, as described above. For example, discontinuity tags, communication with an ad server, cue points, etc. may be used to determine that an (chunk of) advertisement (or inserted slate content instead of ad during ad break) is being played (or to be played).

At 1804, a first session entity is created for the playing of the first content item encoded by the first entity, and a second session entity is created for the playing of the second content item. In some embodiments, the second session entity is created in response to the determination made at 1804. In some embodiments, the second session entity includes a pointer to the first session entity. As one example, each session entity is associated with a corresponding session identifier, and the pointer comprises the session identifier for the first session entity. As one example, the advertisement session entity includes a pointer to the content session entity created for the content for which the advertisement (or slate content) was streamed.

At 1806, playing of the second content item is monitored. Information obtained as part of the monitoring is associated with the second session entity. In some embodiments, the type of information that is collected is based on the determination of the type of content that is being played. For example, different types of information may be monitored for depending on whether the segment being played is a portion of the requested content or a portion of an advertisement (or slate content played in lieu of a real advertisement). Examples of monitored measurements/events, as well as metadata for advertisements/slate content, are described above.

At 1808, the information collected from monitoring the playing of the second content item is associated with the second session entity. The collected information is also transmitted. As one example, heartbeat messages including the collected information are sent out to a remote content distribution monitor that obtains monitoring information from numerous clients. Example contents of heartbeat messages are described above, such as metadata indicating a type of the session to which the heartbeat data belongs (e.g., user-requested content versus advertisement (or slate content played in lieu of an ad)). Examples of information included in heartbeats for user-requested content and advertisements (or slate content) are described above.

Figure 19:
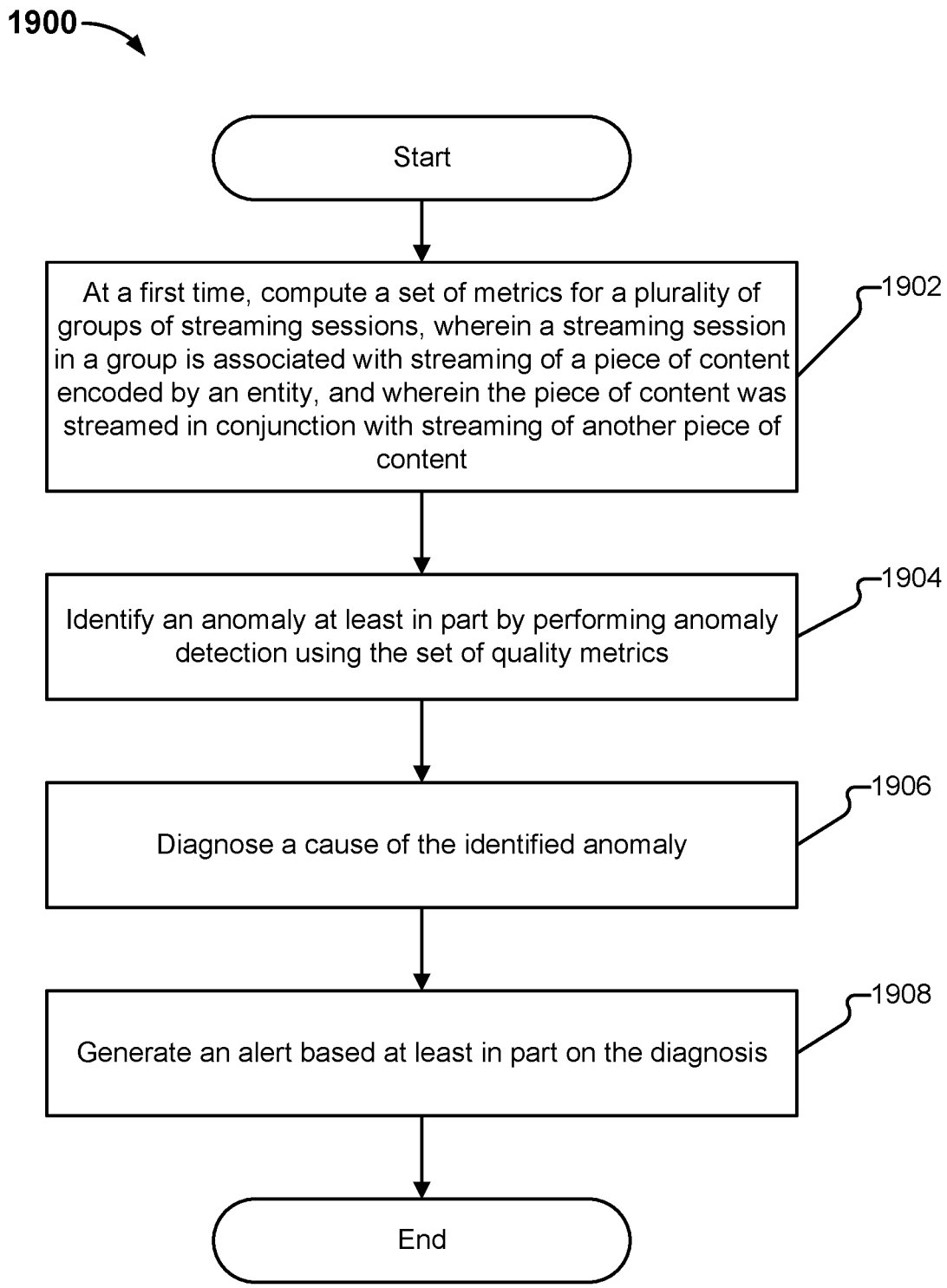
FIG. 19 is a flow diagram illustrating an embodiment of a process for performing anomaly detection and root cause analysis for streaming sessions involving multiple types of content.

FIG. 19 is a flow diagram illustrating an embodiment of a process for performing anomaly detection and root cause analysis for streaming sessions involving multiple types of content. In some embodiments, process 1900 is executed by content distribution monitor 1438. The process begins at 1902 when, at a first time, a set of metrics for a plurality of groups of sessions is computed. A first streaming session included in a group is associated with streaming of a first piece of content encoded by a first entity. The first piece of content encoded by the first entity was streamed in conjunction with streaming of a second piece of content. The streaming of the second piece of content is associated with a different, second streaming session. In some embodiments, the first streaming session associated with streaming of the first piece of content includes a pointer to the second streaming session associated with streaming of the second piece of content.

The first and second pieces of content may be encoded by different entities, but need not be. For example, the first streaming session is associated with streaming of an advertisement encoded by a first entity (or slate content that was played during an ad break instead of an advertisement), and the second streaming session is associated with streaming of content requested by a user, where the second content item (requested by the user) is encoded by a different, second entity. The content requested by the user is provided by a content provider such as a content publisher. However, the advertisement played in conjunction with streaming of the user-requested content is provided by a third-party that is different from the content publisher that provided the user-requested content. As another example, the first content item is slate content that is played in conjunction with the user requested content (where both are encoded or otherwise provided by the content publisher). Although the advertisement (or slate content) was presented along with the user-requested content in what appears to be a single stream to the viewer, as described above, the content player (used to play the advertisement and content provided by different entities) creates separate session entities for the advertisement (or slate content) and the user-requested content, such that any information collected as part of the rendered stream determined to be part of an advertisement (or slate content) is encapsulated/partitioned into the advertisement session entity (which includes sessions created for playing slate content), while information collected as part of streaming a portion of content (e.g., video chunk) determined to be what was requested by the user is partitioned into the content session entity. As described above, the content player creates the separate session entities based on distinguishing the type of content that it is streaming (e.g., advertisement (or slate content) versus user-requested content). For example, the content player creates a content session entity for the streaming of the user-requested content item, and separately creates an advertisement session entity for each advertisement or slate content item that is played in conjunction with the streaming of the user-requested content. Various examples of how a content player distinguishes between advertisements and user-requested content are described above.

In one embodiment, the plurality of groups of streaming sessions for which the set of metrics is computed includes sessions in which a particular advertisement was played (that is, the sessions in the groupings are sessions in which instances of a particular advertisement, identified by an ad identifier, were played). The various groups in the plurality of groups include different groupings of advertisement sessions in which the advertisement was played. For example, a group of streaming sessions represents a set of streaming sessions defined by a set of dimensions comprising at least one of: an identifier of the content with which the advertisement was streamed, the manner in which the ad was inserted at the client (i.e., client-side ad insertion or server-side ad insertion), the device, operating system, ad server (where instances of the same ad identifier may be delivered via multiple ad servers), etc.

As one example of grouping streaming sessions, all streaming sessions (in a window of time) in which a particular advertisement was played are obtained. For example, for a given ad identifier, 1234, one group is the group of all advertisement sessions (in some period of time) for which instances of the ad identifier were streamed. The group of all streaming sessions in which the advertisement was played may be further divided/segmented into various other groupings, where each grouping corresponds to some set of dimensions. One example dimension is ad insertion mechanism. There are two example values for this dimension: client-side ad insertion or server-side ad insertion. The advertisement 1234, which could have been played numerous times, could have been integrated with the user-requested content. Thus, sessions in which the advertisement 1234 was inserted via client-side ad insertion are grouped together, and sessions in which the advertisement 1234 was inserted via server-side ad insertion are grouped together. The same set of metrics (e.g., average volume, average bitrate, frequency, ad start failure percentage, etc., as described above) are determined for the different groupings of sessions in which the instance of ad 1234 was played.

As described above, the techniques described herein may also be variously adapted to accommodate slate content that is played during ad breaks in lieu of advertisements. For example, groupings of sessions in which (any) slate content was played may be formed along various dimensions. Metrics specific to slate content, such as slate percentage of time during an ad break may be computed.

At 1904, an anomaly is identified at least in part by performing anomaly detection using the computed set of metrics. For example, anomalies in the streaming of the first content item (e.g., advertisement or slate content) are detected in one or more groupings of sessions in which the advertisement (or slate content) was played. Historical information may also be used. For example, a metric computed for the current minute is joined with historical aggregate values for the metric to construct a time series, where the time series per metric per grouping is evaluated to detect anomalies in the behavior of the time series. Anomalies may be identified in the time series of multiple groups. In some embodiments, an anomaly is determined to be detected by comparing a confidence interval of the metric values for a grouping to a threshold. For example, in some embodiments, a pre-configured threshold is received. For a given metric computed for a given grouping of sessions, various statistics are generated. For example, consider the volume metric computed for the grouping of advertisement sessions in which a particular Cool Cola ad was played in conjunction with a movie (with a corresponding content identifier). A confidence interval for the volume across the sessions in the grouping is determined. A preconfigured volume threshold is received, for example, from the publisher of the movie, who wishes to be alerted anytime the ad's volume exceeds the threshold. In this example, an anomaly is determined to be detected if the lowest volume in the confidence interval/range exceeds the threshold. Thus, anomalies are detected in various groupings of sessions in which the Cool Cola ad was played. In some embodiments, additional criteria, such as a number of affected sessions (e.g., number of sessions in a group for which an anomaly was detected) or the duration of the affect, are used to determine whether to further process the anomaly (e.g., perform root cause diagnosis, generate an alert for the detected anomaly). For example, if only a small number of sessions (e.g., below some threshold) are impacted, then the anomaly may be ignored.

As described above, the anomaly detection techniques described herein may also be variously adapted to accommodate slate content that is played during ad breaks in lieu of advertisements. For example, anomalous behavior in aggregate metrics for the various groupings of sessions in which slate content had been played may be detected.

At 1906, a cause of the identified anomaly is diagnosed. As one example, a diagnosis graph is generated. In one embodiment, a directed acyclic graph (DAG) is constructed based on the relationships of the groups. The graph is then searched to identify the root cause of detected anomalous behavior. An example of such a diagnosis graph generated for groupings of advertisement sessions is shown in FIG. 17. In some embodiments, each node of the graph corresponds to a particular grouping. As described above, groups are designated to be candidate contributors to a detected anomaly in a parent group if the contribution of the child grouping has a significant impact on the aggregate metric for the parent group in which the anomaly is detected. The contribution of the group may be determined by removing that grouping of sessions from the parent group aggregate metric calculation, and determining the change in the aggregate metric value for the parent group. If the contribution exceeds a threshold, then the group is determined to be a candidate contributor. If multiple groups in a dimension are labelled as candidates, then no contributor is found within the dimension, and the next dimension is similarly processed. Thus, within each dimension (or grouping of dimensions), 0 or 1 contributors may be returned as causes of the detected anomalies.

As described above, the root cause diagnosis techniques described herein may also be variously adapted to accommodate slate content that is played during ad breaks in lieu of advertisements. For example, the root cause(s) for anomalous behavior detected in aggregate metrics for the various groupings of sessions in which slate content had been played may be diagnosed.

At 1908, an alert is generated based at least in part on the diagnosis. As one example, if a single grouping is identified as the root cause of the anomalies seen (which may be detected in multiple groupings), the root cause group (represented by the set of dimensional values that define the grouping) is provided as the root cause. If multiple groups are determined to contribute to the anomalies, then the multiple groups are provided. A list of impacted video sessions may also be provided. Other examples of alerts and reports are described above.

Thus, using the techniques described herein, content publishers (or any other entity in the OTT ecosystem/pipeline, as appropriate) may be automatically alerted, in real-time and near real-time, to any issues in the streaming of advertisements, as well as be provided the root causes of the detected issues. This provides automatic alerting on problems with advertisements, which are typically not under the control of content publishers, but which may affect the viewing experience of user-requested content that is provided by the content publishers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
at a first time, compute a set of metrics for a plurality of groups of streaming sessions;
wherein a streaming session in a group is associated with streaming of slate content;
wherein streaming of the slate content is associated with streaming of a content asset;
wherein the streaming session is determined to be associated with streaming of the slate content based at least in part on recorded metadata indicating that slate content had been played by default during an ad slot in lieu of an advertisement;
wherein the set of metrics is computed at least in part by determining, for a window of time, a number of times that the slate content was played in conjunction with the content asset, or a percentage of time that the slate content was played for the content asset;
based at least in part on the set of metrics, identify an anomaly with respect to the streaming of the slate content;
wherein identifying the anomaly comprises determining that, for the window of time, the number of times that the slate content was played in conjunction with the content asset exceeds a threshold number of times, or that the percentage of time that the slate content was played for the content asset exceeds a threshold percentage of time;
diagnose a cause of the identified anomaly with respect to the streaming of the slate content; and
generate an alert based at least in part on the diagnosing; and
a memory coupled to the processor and configured to provide the processor with instructions.

2. The system recited in claim 1, wherein a content player streamed the slate content in conjunction with streaming of the content asset, wherein the content player generated a first session entity associated with streaming of the slate content and a second session entity associated with streaming of the content asset, and wherein the content player generated a first heartbeat comprising streaming information associated with the first session entity and a second heartbeat comprising streaming information associated with the second session entity.

3. The system recited in claim 2, wherein the content player included, in the first heartbeat, a pointer to the second session entity.

4. The system recited in claim 1, wherein the processor is further configured to receive a preconfigured threshold for a metric.

5. The system recited in claim 4, wherein the processor is further configured to determine, fora group of sessions in which the slate content was streamed, a confidence interval with respect to the metric.

6. The system recited in claim 5, wherein the processor is configured to identify anomalous behavior in the group of sessions with respect to the metric at least in part by comparing the confidence interval to the preconfigured threshold.

7. The system recited in claim 1, wherein the processor is configured to perform the diagnosing at least in part by generating a diagnosis graph, wherein nodes of the diagnosis graph correspond to groups of streaming sessions in which the slate content was played.

8. The system recited in claim 7, wherein the groups of streaming sessions are associated with corresponding sets of attributes, a corresponding set of attributes comprising at least one of content identifier, advertisement server, or type of advertisement insertion.

9. A method, comprising:
at a first time, computing a set of metrics for a plurality of groups of streaming sessions;

wherein a streaming session in a group is associated with streaming of slate content;

wherein streaming of the slate content is associated with streaming of a content asset;

wherein the streaming session is determined to be associated with streaming of the slate content based at least in part on recorded metadata indicating that slate content had been played by default during an ad slot in lieu of an advertisement;

wherein the set of metrics is computed at least in part by determining, for a window of time, a number of times that the slate content was played in conjunction with the content asset, or a percentage of time that the slate content was played for the content asset;

based at least in part on the set of metrics, identifying an anomaly with respect to the streaming of the slate content;

wherein identifying the anomaly comprises determining that, for the window of time, the number of times that the slate content was played in conjunction with the content asset exceeds a threshold number of times, or that the percentage of time that the slate content was played for the content asset exceeds a threshold percentage of time;

diagnosing a cause of the identified anomaly with respect to the streaming of the slate content; and generating an alert based at least in part on the diagnosing.

10. The method of claim 9, wherein a content player streamed the slate content in conjunction with streaming of the content asset, wherein the content player generated a first session entity associated with streaming of the slate content and a second session entity associated with streaming of the content asset, and wherein the content player generated a first heartbeat comprising streaming information associated with the first session entity and a second heartbeat comprising streaming information associated with the second session entity.

11. The method of claim 10, wherein the content player included, in the first heartbeat, a pointer to the second session entity.

12. The method of claim 9, further comprising receiving a preconfigured threshold for a metric.

13. The method of claim 12, further comprising determining, for a group of sessions in which the slate content was streamed, a confidence interval with respect to the metric.

14. The method of claim 13, further comprising identifying anomalous behavior in the group of sessions with respect to the metric at least in part by comparing the confidence interval to the preconfigured threshold.

15. The method of claim 9, further comprising performing the diagnosing at least in part by generating a diagnosis graph, wherein nodes of the diagnosis graph correspond to groups of streaming sessions in which the slate content was played.

16. The method of claim 15, wherein the groups of streaming sessions are associated with corresponding sets of attributes, a corresponding set of attributes comprising at least one of content identifier, advertisement server, or type of advertisement insertion.

* * * * *

UNITED STATES PATENT AND TRADEMARK OFFICE
CERTIFICATE OF CORRECTION

| | | |
|---|---|---|
| PATENT NO. | : 12,250,108 B2 | Page 1 of 2 |
| APPLICATION NO. | : 17/687469 | |
| DATED | : March 11, 2025 | |
| INVENTOR(S) | : Yan Li et al. | |

It is certified that error appears in the above-identified patent and that said Letters Patent is hereby corrected as shown below:

In the Drawings

In sheet 7 of 26, figure 6A, block 612, Executor1, after "(c1, Desktop, L3)", delete ",".

In sheet 7 of 26, figure 6A, block 612, Executor2, after "(c2, Desktop, L3)", delete ",".

In sheet 8 of 26, figure 6B, block 654, Partition1, before "merged_BufferingRatio2, merged_VST2)", delete "(".

In sheet 8 of 26, figure 6B, block 654, Partition2, before "merged_BufferingRatio1, merged_VST1)", delete "(".

In the Specification

In Column 4, Line(s) 62, delete "has" and insert --is--, therefor.

In Column 10, Line(s) 11, after "anomalous", delete "," and insert --.--, therefor.

In Column 19, Line(s) 56, after "examples", delete "of".

In Column 29, Line(s) 12, delete "HMIS/I" and insert --HMM--, therefor.

In the Claims

In Column 55, Line(s) 65, Claim 1, after "sessions", delete ";" and insert --,--, therefor.

In Column 55, Line(s) 67, Claim 1, after "content", delete ";" and insert --,--, therefor.

In Column 56, Line(s) 2, Claim 1, after "asset", delete ";" and insert --,--, therefor.

Signed and Sealed this
Seventeenth Day of June, 2025

Coke Morgan Stewart
*Acting Director of the United States Patent and Trademark Office*

CERTIFICATE OF CORRECTION (continued)
U.S. Pat. No. 12,250,108 B2

In Column 56, Line(s) 47, Claim 5, delete "fora" and insert --for a--, therefor.

In Column 56, Line(s) 67, Claim 9, after "sessions", delete ";" and insert --,--, therefor.

In Column 57, Line(s) 2, Claim 9, after "content", delete ";" and insert --,--, therefor.

In Column 57, Line(s) 4, Claim 9, after "asset", delete ";" and insert --,--, therefor.